US012762752B2

United States Patent

(12) United States Patent
Boule et al.

(10) Patent No.: US 12,762,752 B2
(45) Date of Patent: *Oct. 13, 2026

(54) SYNCHRONIZED RENDERING

(71) Applicant: Apple Inc., Cupertino, CA (US)

(72) Inventors: Andre M. Boule, San Jose, CA (US); Bartosz Ciechanowski, Woodside, CA (US); Eldad Eilam, San Jose, CA (US); Vikrant Kasarabada, Los Altos, CA (US); Michael L. Knippers, Pleasanton, CA (US); Sylvain P. Rebaud, San Francisco, CA (US); Gennadiy Shekhtman, Campbell, CA (US); Mark J. Van Belleghem, Los Gatos, CA (US); Francesco Zuliani, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 17/952,143

(22) Filed: Sep. 23, 2022

(65) Prior Publication Data

US 2023/0391190 A1 Dec. 7, 2023

Related U.S. Application Data

(60) Provisional application No. 63/349,063, filed on Jun. 4, 2022.

(51) Int. Cl.
*B60K 35/00* (2024.01)
*B60K 35/10* (2024.01)
(Continued)

(52) U.S. Cl.
CPC .............. *G06T 11/00* (2013.01); *B60K 35/10* (2024.01); *B60K 35/215* (2024.01); *B60K 35/22* (2024.01); *B60K 35/23* (2024.01); *B60K 35/25* (2024.01); *B60K 35/29* (2024.01); *B60K 35/60* (2024.01); *B60K 35/80* (2024.01); *B60K 37/00* (2013.01); *G06F 3/1462* (2013.01); *G06T 11/60* (2013.01);
(Continued)

(58) Field of Classification Search
CPC ........ B60K 35/00; G06F 3/1462; G06T 11/60
See application file for complete search history.

(56) References Cited

U.S. PATENT DOCUMENTS

| | | | |
|---|---|---|---|
| 8,732,611 | B2 | 5/2014 | Bull et al. |
| 9,378,601 | B2 | 6/2016 | Ricci |

(Continued)

FOREIGN PATENT DOCUMENTS

| | | | |
|---|---|---|---|
| AU | 2014-100585 | B4 | 3/2015 |

OTHER PUBLICATIONS

Invitation to Pay Additional Fees from PCT/US2023/024064, dated Oct. 5, 2023, 10 pages.

(Continued)

*Primary Examiner* — Yi Yang
(74) *Attorney, Agent, or Firm* — Kyle B. Morse; BAKERHOSTETLER

(57) ABSTRACT

Current techniques for rendering content using data on multiple devices are generally ineffective and/or inefficient. This disclosure provides more effective and/or efficient techniques for rendering such content. The techniques optionally complement or replace other methods for rendering content.

42 Claims, 25 Drawing Sheets

(51) Int. Cl.

| | |
|---|---|
| ***B60K 35/215*** | (2024.01) |
| ***B60K 35/22*** | (2024.01) |
| ***B60K 35/23*** | (2024.01) |
| ***B60K 35/25*** | (2024.01) |
| ***B60K 35/29*** | (2024.01) |
| ***B60K 35/60*** | (2024.01) |
| ***B60K 35/80*** | (2024.01) |
| ***B60K 37/00*** | (2006.01) |
| ***G06F 3/14*** | (2006.01) |
| ***G06T 11/00*** | (2006.01) |
| ***G06T 11/60*** | (2026.01) |
| ***G06T 11/65*** | (2026.01) |
| ***G06T 13/80*** | (2011.01) |
| *B60K 35/21* | (2024.01) |

(52) U.S. Cl.

CPC .............. *G06T 11/65* (2026.01); *G06T 13/80* (2013.01); *B60K 35/211* (2024.01); *G06T 2200/24* (2013.01)

(56) References Cited

U.S. PATENT DOCUMENTS

| | | | | |
|---|---|---|---|---|
| 2001/0018769 | A1 | 8/2001 | Matsui | |
| 2010/0217477 | A1 | 8/2010 | Brody | |
| 2014/0111323 | A1 | 4/2014 | Strout et al. | |
| 2014/0309861 | A1 | 10/2014 | Lind et al. | |
| 2016/0334238 | A1 | 11/2016 | Harayama | |
| 2017/0286047 | A1 | 10/2017 | Patil et al. | |
| 2017/0289615 | A1 | 10/2017 | Kobayashi | |
| 2018/0334175 | A1 | 11/2018 | Boule | |
| 2018/0337870 | A1 | 11/2018 | Schubert | |
| 2019/0180705 | A1* | 6/2019 | Choudha | G06F 3/0485 |
| 2019/0261054 | A1* | 8/2019 | Souche | H04N 21/4318 |
| 2019/0265884 | A1* | 8/2019 | Penilla | G06Q 20/3274 |
| 2019/0334782 | A1 | 10/2019 | Dellinger | |
| 2019/0339918 | A1* | 11/2019 | Boule | G06F 3/0481 |
| 2020/0090510 | A1* | 3/2020 | Nagarajan | G08G 1/096716 |
| 2020/0257756 | A1* | 8/2020 | Sheng | G06F 40/197 |
| 2020/0356388 | A1 | 11/2020 | Holt et al. | |
| 2021/0156705 | A1* | 5/2021 | Pietryka | B60K 35/80 |
| 2022/0032775 | A1 | 2/2022 | Tanibata | |
| 2022/0050656 | A1 | 2/2022 | Fan et al. | |
| 2022/0092889 | A1 | 3/2022 | Liu et al. | |
| 2022/0255995 | A1 | 8/2022 | Berliner et al. | |
| 2022/0327986 | A1 | 10/2022 | Jang et al. | |

OTHER PUBLICATIONS

International Search Report and Written Opinion from PCT/US2023/024064, dated Nov. 27, 2023, 15 pages.

U.S. Appl. No. 17/952,060; Non-Final Office Action; dated Feb. 21, 2025; 17 pages.

U.S. Appl. No. 17/952,060; Final Office Action; dated Feb. 13, 2024; 6 pages.

* cited by examiner

SYNCHRONIZED RENDERING

CROSS-REFERENCE TO RELATED APPLICATIONS

This application claims the benefit of priority of U.S. Provisional Application Ser. No. 63/349,063, "SYNCHRONIZED RENDERING," filed Jun. 4, 2022. The content of this application is hereby incorporated by reference in its entirety for all purposes.

BACKGROUND

Today, rendering content is often performed by a single device and then whatever is rendered is displayed by that device or another. Such architecture takes advantage of processing power of the device to provide a curated experience. However, data needed for rendering is not always on a single device and ensuring such can be inefficient. Accordingly, there is a need to improve rendering techniques for systems with multiple devices.

SUMMARY

Current techniques for rendering content using data on multiple devices are generally ineffective and/or inefficient. This disclosure provides more effective and/or efficient techniques for rendering such content. The techniques optionally complement or replace other methods for rendering content.

DESCRIPTION OF THE FIGURES

For a better understanding of the various described examples, reference should be made to the Detailed Description below, in conjunction with the following drawings in which like reference numerals refer to corresponding parts throughout the figures.

DETAILED DESCRIPTION

Figure 1:
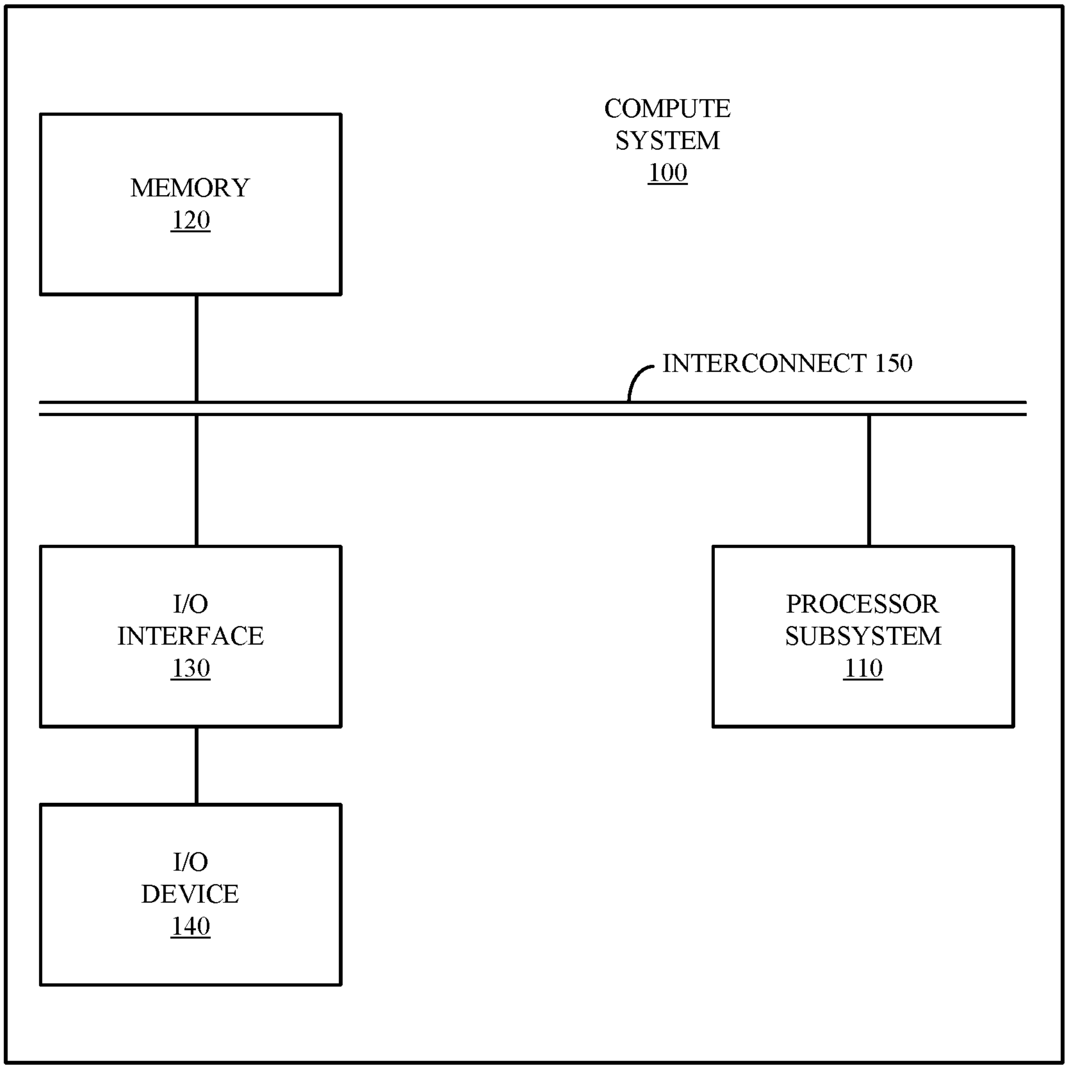
FIG. 1 is a block diagram illustrating a compute system.

The following description sets forth exemplary methods, parameters, and the like. It should be recognized, however, that such description is not intended as a limitation on the scope of the present disclosure but is instead provided as a description of examples.

In methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some examples, these terms are used to distinguish one element from another. For example, a first device could be termed a second device, and, similarly, a second device could be termed a first device, without departing from the scope of the various described examples. In some examples, the first device and the second device are two separate references to the same device. In some examples, the first device and the second device are both devices, but they are not the same device or the same type of device.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Turning now to FIG. 1, a block diagram of compute system 100 is depicted. Compute system 100 is a non-limiting example of a compute system that may be used to perform functionality described herein. It should be recognized that other computer architectures of a compute system may be used to perform functionality described herein.

In the illustrated example, compute system 100 includes processor subsystem 110 coupled (e.g., wired or wirelessly) to memory 120 (e.g., a system memory) and I/O interface 130 via interconnect 150 (e.g., a system bus, one or more memory locations, or other communication channel for connecting multiple components of compute system 100). In addition, I/O interface 130 is coupled (e.g., wired or wirelessly) to I/O device 140. In some examples, I/O interface 130 is included with I/O device 140 such that the two are a single component. It should be recognized that there may be one or more I/O interfaces, with each I/O interface coupled to one or more I/O devices. In some examples, multiple instances of processor subsystem 110 may be coupled to interconnect 150.

Compute system 100 may be any of various types of devices, including, but not limited to, a system on a chip, a server system, a personal computer system (e.g., an iPhone, iPad, or MacBook), a sensor, or the like. In some examples, compute system 100 is included with or coupled to a physical component for the purpose of modifying the physical component in response to an instruction (e.g., compute system 100 receives an instruction to modify a physical component and, in response to the instruction, causes the physical component to be modified (e.g., through an actuator)). Examples of such physical components include an acceleration control, a break, a gear box, a motor, a pump, a refrigeration system, a suspension system, a steering control, a vacuum system, and a valve. As used herein, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. Although a single compute system is shown in FIG. 1, compute system 100 may also be implemented as two or more compute systems operating together.

In some examples, processor subsystem 110 includes one or more processors or processing units configured to execute program instructions to perform functionality described herein. For example, processor subsystem 110 may execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that are to be executed by processor subsystem 110. In such examples, the priority assigned to a task is used to identify a next task to execute. In some examples, the priority-based scheduler identifies a next task to execute when a previous task finishes executing (e.g., the highest priority task runs to completion unless another higher priority task is made ready).

In some examples, the middleware system provides one or more services and/or capabilities to applications (e.g., the one or more applications running on processor subsystem 110) outside of what is offered by the operating system (e.g., data management, application services, messaging, authentication, API management, or the like). In some examples, the middleware system is designed for a heterogeneous computer cluster, to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that may receive, post, and multiplex sensor data, control, state, planning, actuator, and other messages. In such examples, an application (e.g., an application executing on processor subsystem 110 as described above) may be defined using the graph architecture such that different operations of the application are included with different nodes in the graph architecture.

In some examples, a message sent from a first node in a graph architecture to a second node in the graph architecture is performed using a publish-subscribe model, where the first node publishes data on a channel in which the second node is able to subscribe. In such examples, the first node may store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 may include a computer readable medium (e.g., non-transitory or transitory computer readable medium) usable to store program instructions executable by processor subsystem 110 to cause compute system 100 to perform various operations described herein. For example, memory 120 may store program instructions to implement the functionality associated with any or all of the flows described in FIGS. 4A-4H, FIGS. 5A-5H, and FIGS. 6-11.

Memory 120 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Rather, compute system 100 may also include other forms of storage such as cache memory in processor subsystem 110 and secondary storage on I/O device 140 (e.g., a hard drive, storage array, etc.). In some examples, these other forms of storage may also store program instructions executable by processor subsystem 110 to perform operations described herein. In some examples, processor subsystem 110 (or each processor within processor subsystem 110) contains a cache or other form of on-board memory.

I/O interface 130 may be any of various types of interfaces configured to couple to and communicate with other devices. In some examples, I/O interface 130 includes a bridge chip (e.g., Southbridge) from a front-side bus to one or more back-side buses. I/O interface 130 may be coupled to one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is coupled to a network via a network interface device (e.g., configured to communicate over Wi-Fi, Bluetooth, Ethernet, or the like).

Figure 2:
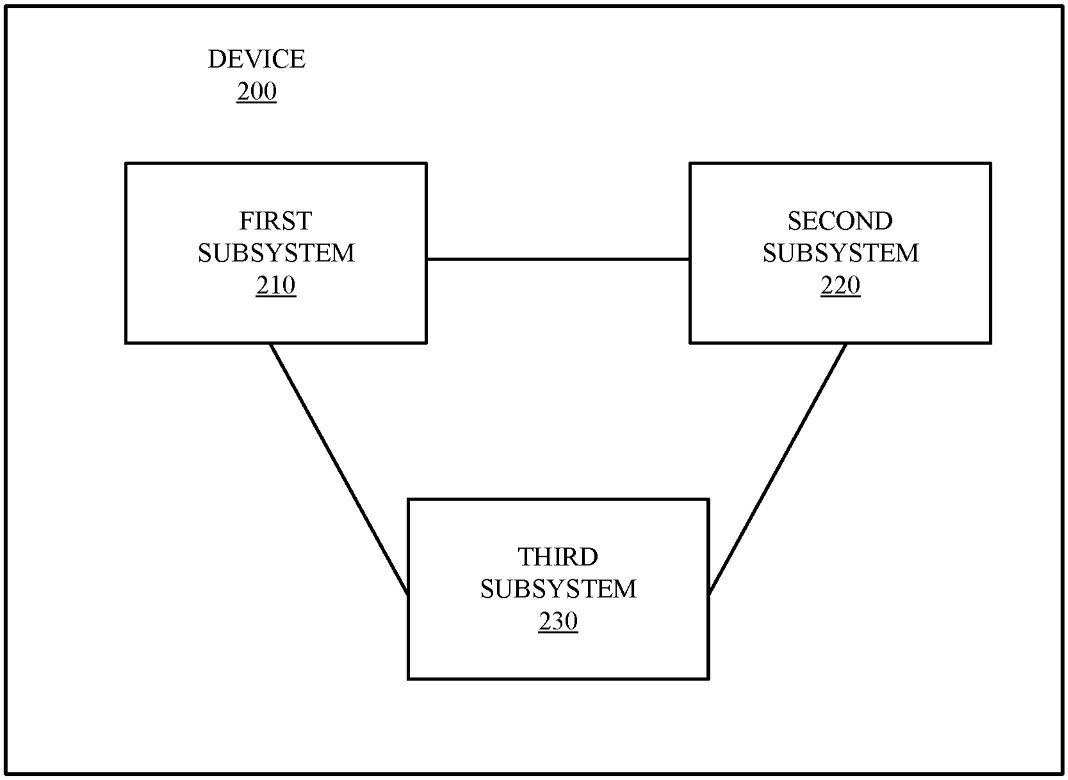
FIG. 2 is a block diagram illustrating a device with interconnected subsystems.

FIG. 2 depicts a block diagram of device 200 with interconnected subsystems. In the illustrated example, device 200 includes three different subsystems (i.e., first subsystem 210, second subsystem 220, and third subsystem 230) coupled (e.g., wired or wirelessly) to each other. An example of a possible computer architecture of a subsystem as included in FIG. 2 is described in FIG. 1 (i.e., compute system 100). Although three subsystems are shown in FIG. 2, device 200 may include more or fewer subsystems.

In some examples, some subsystems are not connected to another subsystem (e.g., first subsystem 210 may be connected to second subsystem 220 and third subsystem 230 but second subsystem 220 may not be connected to third subsystem 230). In some examples, some subsystems are connected via one or more wires while other subsystems are wirelessly connected. In some examples, one or more subsystems are wirelessly connected to one or more compute systems outside of device 200, such as a server system. In such examples, the subsystem may be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate device 200 (with or without direct user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 may each be a camera that is capturing images for third subsystem 230 to use to make a decision. In some examples, at least a portion of device 200 functions as a distributed compute system. For example, a task may be split into different portions, where a first portion is executed by first subsystem 210 and a second portion is executed by second subsystem 220.

Attention is now directed towards techniques for rendering content using multiple devices. An example of a vehicle and a user device is used for discussion purposes, though it should be understood that other types of devices and more devices (i.e., 3 or more) are within scope of this disclosure and may benefit from techniques described herein. For example, two different user devices (instead of a vehicle and a user device) may be used with techniques described herein.

Figure 3:
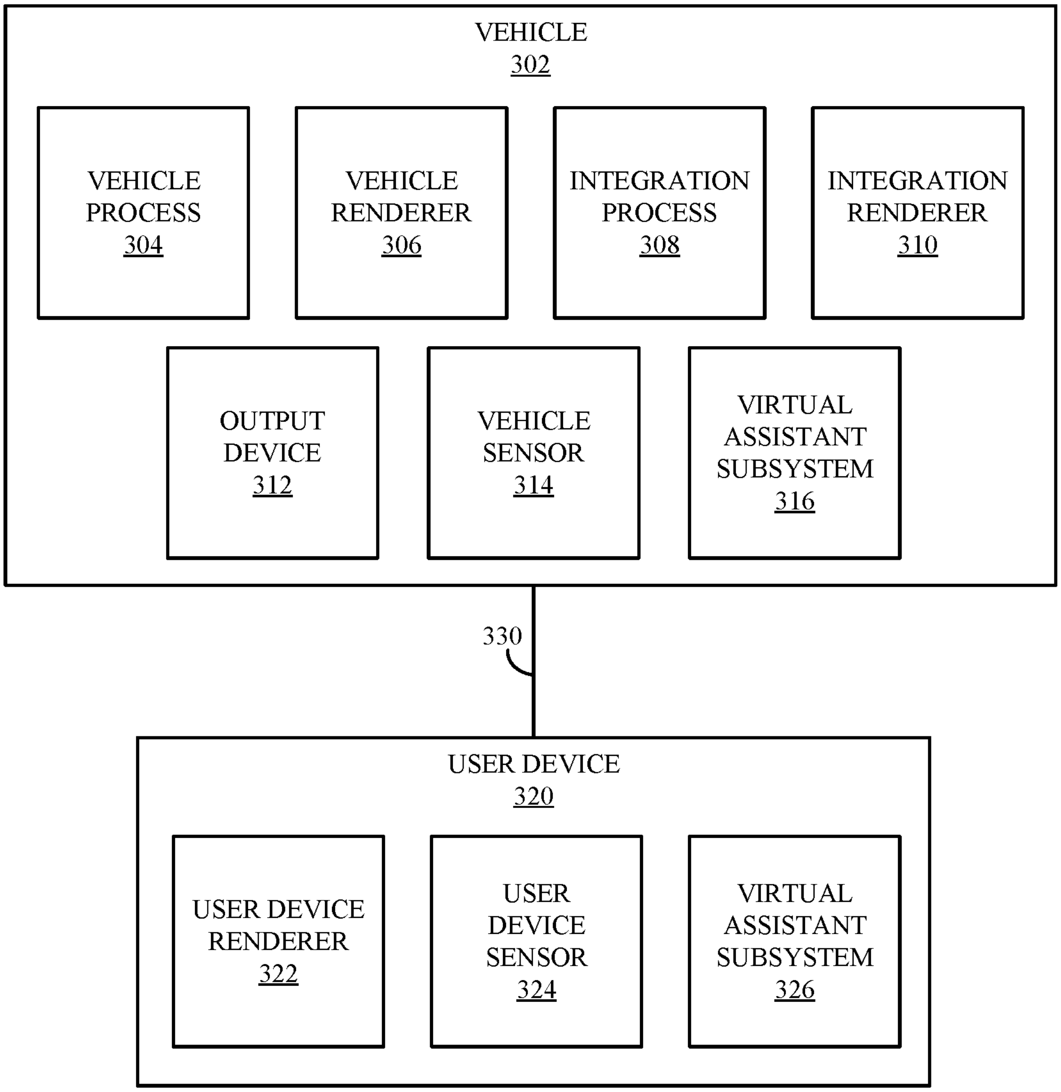
FIG. 3 is a block diagram illustrating a vehicle connected to a user device via a transport.

FIG. 3 is a block diagram illustrating vehicle 302 connected to user device 320 via transport 330. Such a configuration may allow for a unified experience, bringing together user interface elements from both vehicle 302 and user device 320. For example, user device 320 may be able to drive an experience through and integrate with vehicle 302.

As depicted in FIG. 3, vehicle 302 includes vehicle process 304, vehicle renderer 306, integration process 308, integration renderer 310, output device 312, vehicle sensor 314, and virtual assistant subsystem 316. The components of vehicle 302 are meant for explanatory purposes and not intended to be limiting. Vehicle 302 may include more or fewer components, including the combination of depicted components or other components described for compute system 100 or device 200.

As mentioned above, vehicle 302 includes vehicle process 304. In some examples, vehicle process 304 is a software program (e.g., one or more instructions executing by one or more processors) of vehicle 302 that is configured to manage operations performed by vehicle 302. In such examples, vehicle process 304 may be isolated from one or more other processes of vehicle 302 (e.g., integration process 308) such that at least some of its associated memory may only be accessed by vehicle process 304 and communications to and/or from vehicle process 304 are through a structured process of interfaces (e.g., application programming interfaces (APIs)) defined for vehicle process 304.

Vehicle 302 further includes vehicle renderer 306. In some examples, vehicle renderer 306 is any hardware or software of vehicle 302 used to generate (sometimes referred to as render) visual content (e.g., an image (sometimes referred to as a frame) or a video) from a model and/or one or more instructions. In such examples, vehicle renderer 306 may be configured to only be used by vehicle process 304 to generate visual content from data detected and/or determined by vehicle 302. In some examples, vehicle renderer 306 is configured to render content associated with an ecosystem of vehicle 302, such as content only stored locally by vehicle 302. For example, vehicle renderer 306 may render content associated with a first set of vehicle instruments (e.g., a speed of the vehicle in a heads-up display). The first set of vehicle instruments may be those that do not interact with content rendered remote from vehicle renderer 306 (e.g., remote from vehicle 302), such as content that is visually independent and always appears in a fixed position (e.g., turn signal indicators and check engine indicator). In some example, vehicle renderer 306 renders content from processes executing on vehicle 302, such as a driver assistance system of vehicle 302 (e.g., a video from a backup camera).

Vehicle 302 further includes integration process 308. In some examples, integration process 308 is a software program (e.g., one or more instructions executing by one or more processors) of vehicle 302 that is configured to manage operations based on data received from devices separate from vehicle 302 (e.g., user device 320). In such examples, integration process 308 may be isolated from one or more other processes of vehicle 302 (e.g., vehicle process 304) such that at least some of its associated memory may only be accessed by integration process 308 and communications to and/or from integration process 308 are through a structured process of interfaces (e.g., APIs) defined for integration process 308.

Vehicle 302 further includes integration renderer 310. In some examples, integration renderer 310 is any hardware or software of vehicle 302 used to generate (sometimes referred to as render) visual content (e.g., an image or a video) from a model and/or one or more instructions. In such examples, integration renderer 310 may be configured to be used by integration process 308 to generate and/or combine visual content from (1) data detected, determined, and/or generated by vehicle 302 (e.g., vehicle renderer 306 or integration renderer 310), (2) data detected by, determined by, and/or received from user device 320 (e.g., user device renderer 322), or (3) any combination thereof. In some examples, integration renderer 310 renders content associated with a second set of vehicle instruments, different from the first set of vehicle instruments rendered by vehicle renderer 306. The second set of vehicle instruments may be those that interact with content rendered remote from vehicle renderer 306 (e.g., remote from vehicle 302), such as content that is visually integrated or closely associated with content rendered by user device renderer 322 (e.g., a speedometer, a gear position, or a cruise control indicator in a main display of vehicle 302). In some examples, integration renderer 310 renders notifications received from processes executing on vehicle 302 (e.g., vehicle process 304), such notifications may be a first set (e.g., a first type) of notifications associated with vehicle 302 (e.g., check control messages).

In some examples, vehicle 302 includes a system for verifying information included with content not rendered by vehicle renderer 306 (e.g., content rendered by integration renderer 310 or user device renderer 322) to make sure what is to be displayed is correct. The system may compare one or more values included in such content with data detected by a sensor of vehicle 302 (e.g., vehicle sensor 314).

Vehicle 302 further includes output device 312. In some examples, output device 312 is any hardware or software of vehicle 302 used to output (e.g., send, display, emit, or produce) data (e.g., visual, audio, or haptic) from vehicle 302. Examples of output device 312 include a display screen, a touch-sensitive surface, a projector, and a speaker. In one example, output device 312 is a display screen that displays content rendered by each of vehicle renderer 306, integration renderer 310, and user device renderer 322.

Vehicle 302 further includes vehicle sensor 314. In some examples, vehicle sensor 314 is any hardware or software of vehicle 302 used to detect data about a physical environment in proximity to (e.g., surrounding) vehicle sensor 314, similar to as discussed above for compute system 100). Examples of vehicle sensor 314 include a rotary knob, a steering wheel button, a touch-sensitive surface, a camera, a microphone, and any other sensor discussed with respect to compute system 100. In some examples, vehicle sensor 314 detects user input. In such examples, user input detected by vehicle sensor 314 is sent to vehicle process 304 and/or integration process 308, as further discussed below.

In some examples, the user input may be sent to vehicle process 304 when the user input corresponds to content rendered by vehicle renderer 306 or relates to a process of vehicle 302 (e.g., cruise control, driver assistance system, or volume control). When the user input is sent to vehicle process 304, vehicle process 304 may determine what is the result of the user input and instruct a change in display through vehicle renderer 306 or integration process 308. In some examples, when the user input is handled by vehicle process 304, the user input may not be sent to integration process 308 and instead vehicle process 304 notifies integration process 308 of any state (e.g., display) changes resulting from the user input being detected.

In some examples, the user input may be sent to integration process 308 when the user input relates to content rendered by integration renderer 310 or user device renderer 322 (e.g., voice recognition activation, instrument cluster user interface controls, media, and actions related to a telephone call). When the user input is sent to integration process 308, integration process 308 may send the user input to (1) user device 320 to determine how to respond to the user input or (2) vehicle process 304. In some examples, the user input is not sent to vehicle process 304 at all when the user input is sent to integration process 308, and any state changes resulting from the user input are also not sent to vehicle process 304.

Vehicle 302 further includes virtual assistant subsystem 316 (sometimes referred to as artificial intelligent assistant or digital assistant). In some examples, virtual assistant subsystem 316 is a software program that performs one or more operations based on data detected by a sensor, such as a natural language voice command detected by a microphone of vehicle 302 or user device 320. In such examples, vehicle 302 may include the software program (i.e., the software program is executing on one or more processors of vehicle 302) or an interface to the software program (e.g., the interface allows for communication with one or more remote devices executing the software program). In some examples, vehicle 302 does not include virtual assistant subsystem 316. In such examples, audio detected by a microphone of vehicle 302 may be sent or transcribed and sent to user device 320 to handle by a virtual assistant subsystem (e.g., virtual assistant sub system 326).

Referring to FIG. 3, user device 320 is depicted as including user device renderer 322, user device sensor 324, and virtual assistant subsystem 326. The components of user device 320 are meant for explanatory purposes and not intended to be limiting. User device 320 may include more or fewer components, including the combination of depicted components or other components described for compute system 100 or device 200.

As mentioned above, user device 320 includes user device renderer 322. In some examples, user device renderer 322 is any hardware or software of user device 320 used to generate (sometimes referred to as render) visual content (e.g., an image or a video) from a model and/or one or more instructions. In such examples, user device renderer 322 may be configured to generate visual content from data detected and/or determined by vehicle 302, user device 320, or any combination thereof for display by vehicle 302 or user device 320. User device renderer 322 may also be configured to generate visual content for display by user device 320 and not vehicle 302.

In some examples, user device renderer 322 renders content associated with applications executing on user device 320 (e.g., a map from a maps application for a main display of vehicle 302 or map routing instructions for a heads-up display of vehicle 302). In some examples, user device renderer 322 renders a third set (e.g., a different type) of vehicle instruments (different from the first set rendered by vehicle renderer 306 and the second set rendered by integration renderer 310). In some examples, user device renderer 322 renders notifications associated with user device 320 (such as notifications issued by an operating system of user device 320 or applications executing on user device 320) and a second set of notifications associated with vehicle 302 (different from the first set of notifications rendered by integration renderer 310, such as notifications received by user device 320 from vehicle 302 (e.g., low tire pressure)). In some examples, a notification received by user device 320 from vehicle 302 includes content for user device 320 to use when rendering a representation of the notification (e.g., a notification message, an icon, and optional parameters that may be associated with a notification, such as a format for presenting number of miles (% d miles)).

User device 320 further includes user device sensor 324. In some examples, user device sensor 324 is any hardware or software of user device 320 used to detect data about a physical environment in proximity to (e.g., surrounding) user device sensor 324, similar to as discussed above for compute system 100. Examples of user device sensor 324 include a touch-sensitive surface, a camera, a microphone, and any other sensor discussed with respect to compute system 100. In some examples, user device sensor 324 detects user input. In such examples, user input detected by user device sensor 324 is received by a process executing on one or more processors of user device 320 that determines an operation to perform, such as what content to render and send for display by vehicle 302.

User device 320 further includes virtual assistant subsystem 328 (sometimes referred to as artificial intelligent assistant or digital assistant). In some examples, virtual assistant subsystem 328 is a software program that performs one or more operations based on data detected by a sensor, such as a natural language voice command detected by a microphone of user device 320 or vehicle 302. In such examples, user device 320 may include the software program (i.e., the software program is executing on one or more processors of user device 320) or an interface to the software program (e.g., the interface allows for communication with one or more remote devices executing the software program).

In some examples, virtual assistant subsystem 328 receives audio and/or transcribed content from vehicle 302 to act upon, such as when vehicle 302 does not include a virtual assistant subsystem (e.g., virtual assistant subsystem 318). In other examples, virtual assistant subsystem 328 of user device 320 works in tandem (e.g., in concert or together) with virtual assistant subsystem 318 of vehicle 302 such that some operations are handled by virtual assistant subsystem 318 of vehicle 302 (e.g., such as operations based on data from vehicle 302, operations that are more time-sensitive, or operations that require less processing) and other operations or portions of operations are handled by virtual assistant subsystem 328 of user device 320 (such as operations based on data from user device 320 or data from a device connected to user device 320 other than vehicle 302).

Referring to FIG. 3, vehicle 302 is depicted as communicating with user device 320 via transport 330. In some examples, transport 330 is a communication channel between two or more devices to convey data between the devices. Examples of transport 330 include wired (e.g., physically connected via one or more cables, such as USB or Lightning cable) or wireless (e.g., an Internet connection, a WiFi connection, a cellular connection, a short-range communication, a radio signal, and any other wireless data connection or network so as to communicate data between devices) channels that connect, for example, vehicle 302 and user device 320. Transport 330 may enable (1) vehicle 302 to communicate information to user device 320 to be used by user device 320 to render content and (2) user device 320 to communicate such rendered content, information, layout packages, or other data to vehicle 302.

In some examples, there are multiple different communication channels between vehicle 302 and user device 320, each communication channel for a different type of data. For example, a first communication channel may stream content (e.g., images or video) from user device 320 to be displayed by vehicle 302 (e.g., the content is encrypted by user device 320 and decrypted by vehicle 302), a second communication channel to send metadata and/or control information related to the streaming content (in some examples, the metadata and/or control information is sent via the first communication channel embedded in the content or along with the content), a third communication channel to send vehicle information to user device 320 (e.g., vehicle information related to data detected by a sensor of vehicle 302), and a fourth communication channel to send data and information to setup vehicle 302 for displaying content received from user device 320 (e.g., a layout package with layouts used by user device 320 and rendered content that is preinstalled on vehicle 302 that may be modified by vehicle 302 when needed to be displayed by vehicle 302).

In some examples, vehicle 302 is paired to user device 320 via transport 330. In such examples, vehicle 302 may be paired to user device 320 when establishing a key on user device 320 to control (e.g., unlock, lock, or start) vehicle 302. However, vehicle 302 can be paired to user device 320 in any suitable manner. In examples in which vehicle 302 is paired to user device 320 via transport 330 when establishing a key on user device 320, the pairing may be performed before establishing the key and the key is established in response to the pairing. In other examples, the pairing may be performed without or after establishing the key on user device 320, such as when the key is established through a connection between user device 320 and a device other than vehicle 302. In some examples, establishing the key includes a pairing process that is different from a pairing process for the integration features described herein. In such examples, the two pairing processes are used to establish secure communications between vehicle 302 and user device 320 using different key material and may be performed in any order (e.g., key pairing may occur before integration pairing). In some examples, the key pairing and the integration pairing are included in a single pairing. In other examples, vehicle 302 is paired to user device 320 without establishing a key on user device 320.

In some examples, the pairing may allow for vehicle 302 to identify user device 320 before establishing a wireless connection between the two devices (e.g., through a Bluetooth beacon, through a key fob, or some data transmitted by user device 320 before establishing a wireless connection with vehicle 302). By identifying user device 320 before establishing a wireless connection, vehicle 302 may display content either (1) received by user device 320 during a previous connection or (2) based on instructions received by user device 320 during a previous connection. In some examples, vehicle 302 defaults to a particular frame and/or layout based on a previous connection.

In some examples, vehicle 302 prioritizes establishing a first connection with a first wireless technology (e.g., Bluetooth) so that communication may occur quicker and then use the first connection to establish a second connection with a second wireless technology (e.g., WiFi) to increase bandwidth for communicating. In such examples, the second wireless technology may have more bandwidth and/or use more power than the first wireless technology. In one example, vehicle 302 may perform one or more operations using the first connection, before or while the second connection is established, such as vehicle 302 may receive an instruction from user device 320 through the first connection to display content already stored and/or rendered by vehicle 302 and/or to start an engine of vehicle 302 when detecting a door has opened or closed.

FIGS. 4A-4H are block diagrams illustrating exemplary user interfaces in accordance with some examples described herein. The user interfaces in these figures are used to illustrate the processes described below, including the processes in FIGS. 5A-5H and 6-11.

Each of FIGS. 4A-4H depict a frame (i.e., frames 400*a*-400*h*) that is displayed on a display (e.g., a touch-sensitive display, a heads-up display, or a display screen) of a vehicle (e.g., vehicle 302). The frame may include zero or more user interface elements rendered by the vehicle (e.g., some user interface elements rendered by vehicle renderer 306 and some user interface elements rendered by integration renderer 310) and zero or more user interface elements rendered by one or more devices other than the vehicle (e.g., a user device (such as by user device renderer 322), a server, or any device separate from the vehicle). It should be understood that more or fewer user interface elements may be included with the frames depicted in FIGS. 4A-4H.

In some examples, locations and/or characteristics of user interface elements and/or what content is included in a frame is based on a layout (e.g., a definition including a location, such as an initial location, of user interface elements within the frame). In such examples, a device rendering at least a portion of the frame (e.g., one or more user interface elements or combining already-rendered user interface elements) may use the layout to determine where, what, and how to render particular user interface elements. In some examples, the vehicle stores one or more layouts and selects between the one or more layouts based on information known by the vehicle. In such examples, another device (e.g., a user device) may control the selection process and select a layout for the vehicle to use.

Figure 4A:
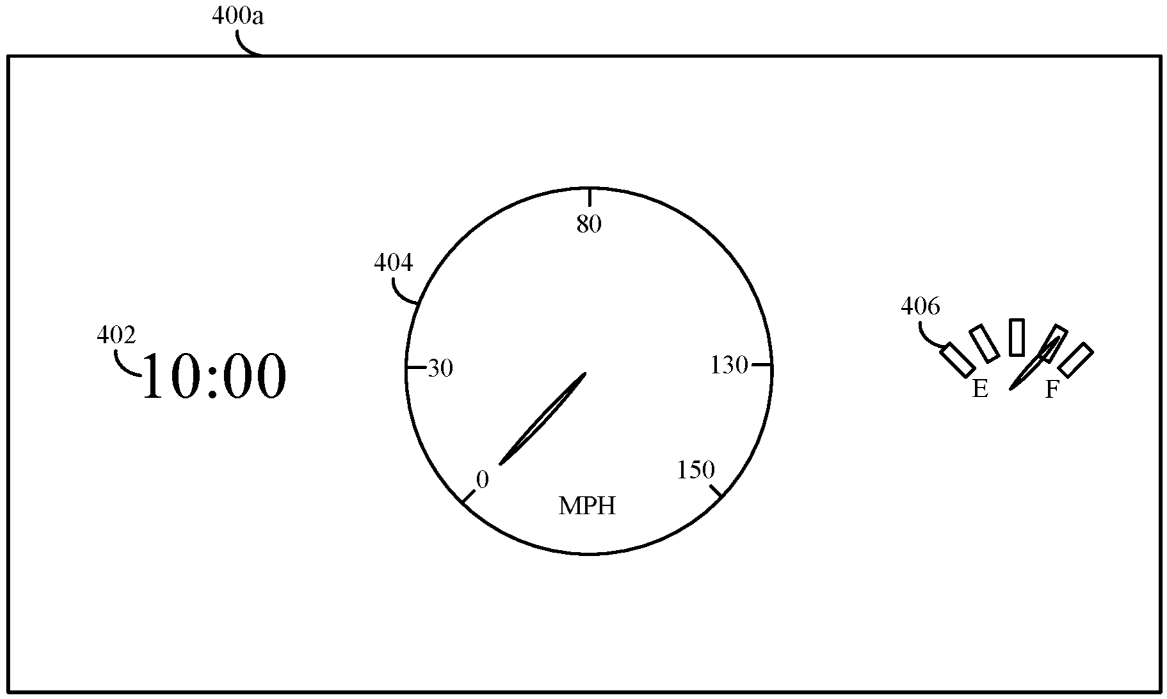
FIGS. 4A-4H are block diagrams illustrating content being displayed on a display of a vehicle.
Figure 4B:
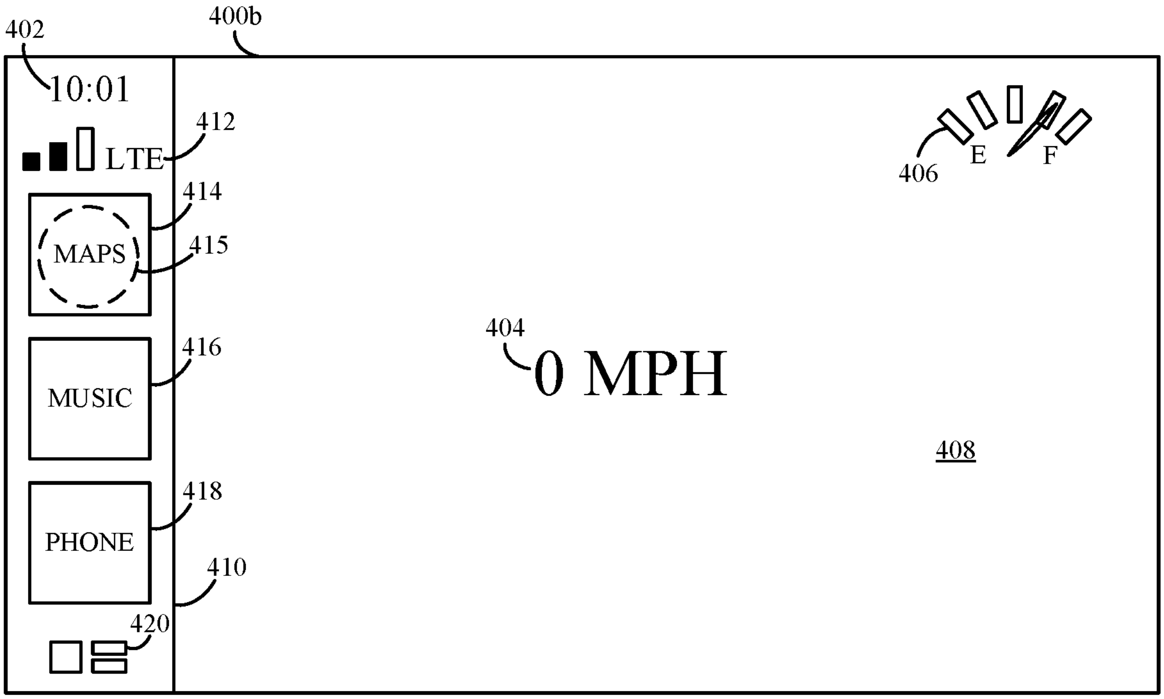

FIGS. 4A-4B illustrate a process of transitioning from a frame rendered without input from a user device to a frame rendered with input from the user device. Referring to FIG. 4A, frame 400*a* is displayed at a first time, before the vehicle is connected to the user device (e.g., user device 320). In some examples, frame 400*a* is rendered (e.g., different user interface elements are rendered in particular locations and/or different rendered user interface elements are combined to create frame 400*a*) by the vehicle (e.g., by vehicle renderer 306 or integration renderer 310).

As depicted in FIG. 4A, frame 400*a* includes multiple user interface elements, including current time 402, speedometer 404, and fuel gauge 406. Such user interface elements may be individually rendered by the vehicle, the user device, another device (e.g., a different user device, a device associated with manufacture of the vehicle, a server, or any device separate from the vehicle), or some combination thereof. For example, components of speedometer 404 (e.g., numbers and the hand) may have been rendered by a previously-connected user device and stored by the vehicle so that the vehicle may construct speedometer 404 to reflect current data detected by the vehicle (e.g., that the speed is 0). In such an example, the vehicle would use the individual components to render a current state of speedometer 404 to reflect that the speed is 0 and then combine speedometer 404 with other user interface elements included within frame 400*a* to produce frame 400*a*. It should be understood that frame 400*a* may include more or fewer user interface elements, including, for example, a background or other content.

Frame 400*a* is in accordance with a first layout such that a position of current time 402, speedometer 404, and fuel gauge 406 within frame 400*a* is determined using the first layout. In some examples, the first layout is selected to be used by the vehicle, such as based on what layout was most recently used or a current context of the vehicle. In such examples, the first layout may be configured to be used when starting up the vehicle and the decision to use the first layout is based on information installed on the vehicle before connecting to any user device.

As mentioned above, frame 400*a* includes current time 402, indicating a current time as determined by a software or hardware component of the vehicle. Current time 402 is displayed at a particular size in a digital format and updates as time passes. It should be understood that current time 402 could indicate the current time using a different format, such as analog.

Frame 400*a* further includes multiple vehicle instruments, including speedometer 404 and fuel gauge 406. In some examples, a vehicle instrument is a user interface element reflecting data detected by a sensor (e.g., a sensor of the vehicle). Speedometer 404 indicates a current speed of the vehicle and is depicted in an analog form with a gauge that includes a hand pointing to the current speed. It should be understood that speedometer 404 could indicate the current speed using a different format, such as digital with numbers indicating the current speed rather than a hand. Fuel gauge 406 indicates a current amount of fuel remaining for the vehicle and is depicted in an analog form with a hand pointing to the current amount. It should be understood that fuel gauge 406 could indicate the current amount of fuel using a different format, such as digital with numbers indicating a percentage remaining rather than a hand.

FIG. 4B depicts frame 400*b* and is displayed after the first time of FIG. 4A (i.e., a second time). In some examples, frame 400*b* is displayed after a user device (e.g., user device 320) connects with the vehicle. In such examples, frame 400*b* may be displayed in response to the user device connecting to the vehicle, such that no user input is received by the user device or the vehicle after connecting and before displaying frame 400*b*.

In some examples, frame 400*b* is rendered (e.g., different user interface elements are rendered in particular locations and/or different rendered user interface elements are combined to create frame 400*b*) by the vehicle. In such examples, different user interface elements may have been received by the vehicle from the user device and then combined with other user interface elements by the vehicle to generate frame 400*b*, as further discussed below.

Frame 400*b* is in accordance with a different layout than the first layout (i.e., a second layout). In some examples, the second layout, unlike the first layout, is selected by the user device. In such examples, the second layout may be selected based on a state of the vehicle that was communicated from the vehicle to the user device. In other examples, the second layout may be selected based on a previous layout used by the user device (e.g., a previous layout used by the user device with the vehicle or another vehicle). As depicted in FIG. 3, the second layout includes two areas: main area 408 and side area 410. In some examples, the second layout may only include main area 408 (not illustrated), with one or more user interface elements rendered by the vehicle and one or more user interface elements rendered by the user device. For example, the second layout may correspond to an instrument cluster of the vehicle, with a user interface element that displays data that is more critical (such as the current speed of the vehicle) being rendered by the vehicle and a user interface element that displays data that is less critical (such as the current time) being rendered by the user device. For another example, the second layout may correspond to a center console of the vehicle, with a user interface element that displays data detected by a sensor of the vehicle (such as a current gas level of the vehicle) and a user interface element that displays data detected by a sensor of the user device (such as a signal level of the user device).

As depicted in FIG. 4B, main area 408 includes speedometer 404 and fuel gauge 406. As compared to frame 400*a* in FIG. 4A, speedometer 404 in frame 400*b* is in a digital format (as opposed to an analog format) at the same location and fuel gauge 406 is in the same format but at a different location. In addition, FIG. 4B depicts fuel gauge 406 as the same size as in FIG. 4A. It should be understood that the format of either speedometer 404 or fuel gauge 406 may be different than depicted in FIG. 4B (e.g., speedometer 404 may have still been in an analog format) and the size, opacity, or location of either could be different than depicted in FIG. 4B.

FIG. 4B depicts side area 410 including current time 402. Current time 402 in frame 400*b* is depicted as a smaller font size from current time 402 in FIG. 4A. It should be recognized that there may be other differences, such as a different type of font (e.g., Times New Roman or Arial) or a different format (e.g., a 24-hour clock rather than a 12-hour clock). In addition, current time 402 may be rendered by the vehicle or the user device.

In some examples, content in a frame (e.g., current time 402) is in a language specified by the user device, such as a language used for content displayed via a display of the user device. In other examples, content in a frame is in a language specified for such content and may be different from a language used by the user device for displaying content on a display of the user device. For example, the differences in current time 402 may be based on a preference associated with an application executing on the user device, such as a preference selected by a user of the user device. The preference may be provided to the vehicle with or separate from the second layout.

Side area 410 of frame 400*b* further includes multiple user interface elements, including signal affordance 412, multiple application affordances corresponding to different applications of the user device (i.e., maps affordance 414, music affordance 416, phone affordance 418), and dashboard affordance 420. It should be recognized that more or fewer user interface elements may be included in side area 410.

Signal affordance 412 indicates a communication technology (i.e., LTE) used by the user device and a signal strength (i.e., 2 of 3 bars) of the user device for the communication technology. It should be understood that different ways to represent such information may be used and that, instead of or in addition to, signal affordance 412, side area 410 may include a representation of a connection between the vehicle and the user device (e.g., wired, WiFi, or BLTE).

As mentioned above, side area 410 includes multiple application affordances corresponding to different applications of the user device. In some examples, an application affordance is configured to, when selected, cause display of a user interface associated with a corresponding application. In such examples, the selection may cause the application to be executed by the user device when the application is not already executing. For examples, maps affordance 414 may correspond to a maps application of the user device. The maps application may chart physical locations in a representation of at least a portion of the world for identification and navigation. In such an example, selection of maps affordance may cause a map to be displayed. Similarly, music affordance 416 may correspond to a music application of the user device for searching and playing audio files and phone affordance 418 may correspond to a phone application of the user device for searching contacts of the user device, initiating communication sessions with other devices, reviewing messages from contacts, or any combination thereof. It should be understood that such functionality of the applications may be different and that other applications may be represented in side area 410.

In some examples, side area 410 may include one or more application affordances corresponding to different applications of the vehicle (not illustrated). Such application affordances may operate similarly to the application affordances associated with the user device except that the application is executing by the vehicle rather than the user device. In some examples, side area 410 may be configured by a user to include particular application affordances corresponding to particular applications. In such examples, the particular affordances may be selected by the user using the vehicle or the user device.

As mentioned above, side area 410 also includes dashboard affordance 420. Dashboard affordance 420 may be configured to, when selected, cause display of a different user interface, such as a dashboard associated with the user device or the vehicle. The dashboard may include affordances for other applications not included in side area 410. In some examples, dashboard affordance 420 is configured to, when selected, exit out of a user interface corresponding to a particular application and allow to navigate to a different application.

In some examples, the content of main area 408 and side area 410 are rendered by the user device and sent to the vehicle for the vehicle to display. In such examples, some user interface elements of frame 400*b* might have not been included in what was sent from the user device to the vehicle and instead are rendered by the vehicle and combined with the content received from the user device (e.g., rendered on top of what was received from the user device). For example, speedometer 404 and fuel gauge 406 may have been rendered by the vehicle and the application affordances may have been rendered by the user device.

Figure 4C:
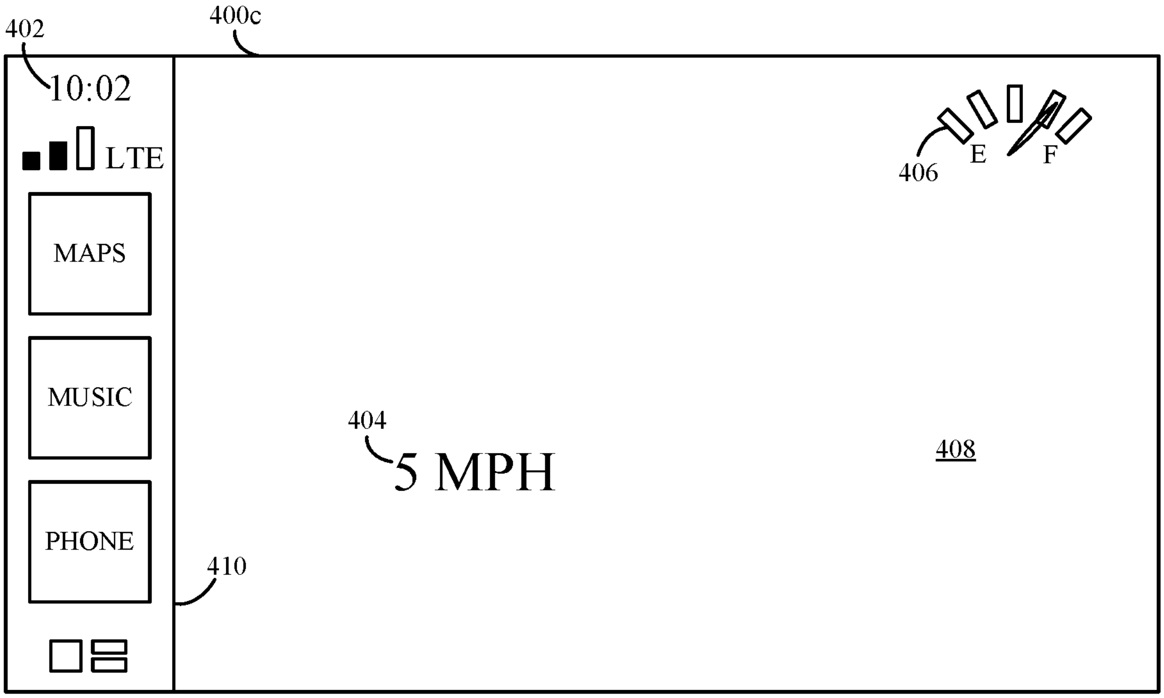
Figure 4D:
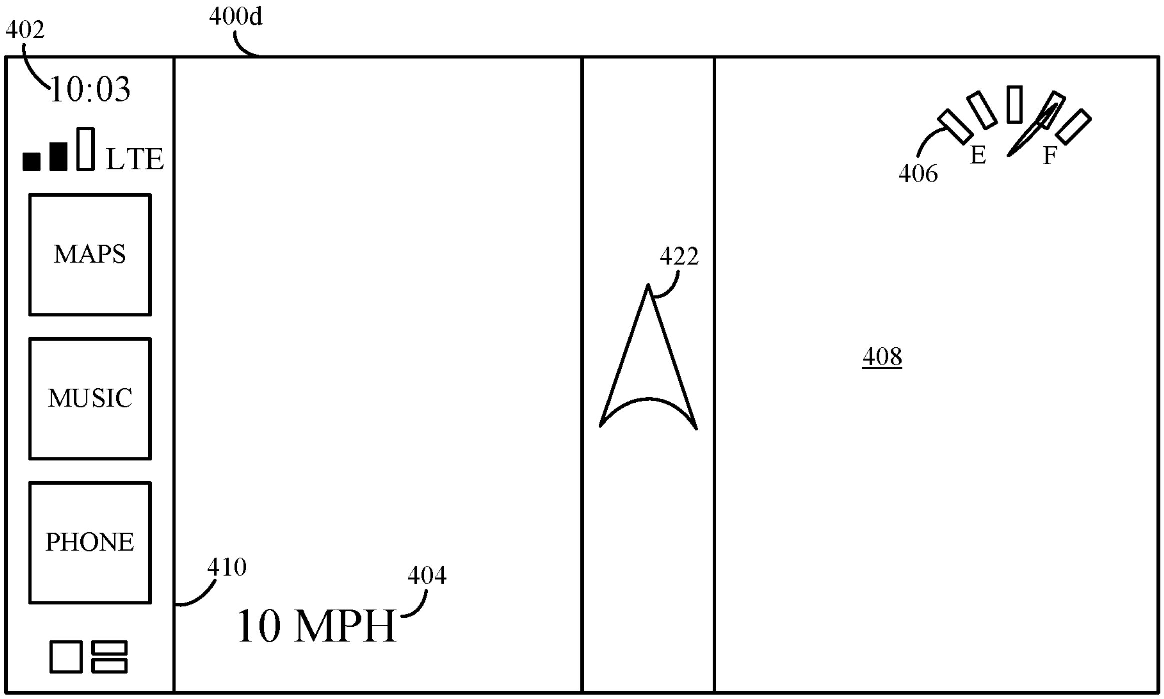

FIG. 4B depicts user input 415 at a location corresponding to maps affordance 414 (e.g., user input 415 corresponding to selection of maps affordance 414). The user input 415 may include any type of user input, including a tap on a location of a touch-sensitive display corresponding to maps affordance 414, a push of a physical button of the vehicle while maps affordance 414 is focused upon, a speech request by a user, or any other type of user input signaling selection of maps affordance 414. In response to user input 415, a signal indicating user input 415 may be sent to the user device. Based on the signal, the user device may determine an animation to be displayed by the vehicle to transition from what is displayed in frame 400*b* to a user interface for a maps application (e.g., main area 408 in frame 400*d* of FIG. 4D). The animation may include modifications to a current layout, causing changes to what is being displayed, as depicted in FIG. 4C and discussed below. In some examples, no animation may be used and frame 400*d* of FIG. 4D is displayed in response to user input 415, such as after sending the signal and receiving a frame corresponding to frame 400*d* from the user device.

FIG. 4C depicts frame 400*c* and is displayed after the second time of FIG. 4B (i.e., a third time). Frame 400*b* is displayed after receiving user selection of maps affordance 414. Frame 400*b* maintains the layout from frame 400*b* of FIG. 4B (i.e., the second layout) and still includes main area 408 and side area 410. In particular, main area 408 and side area 410 in frame 400*c* are located in the same locations as in frame 400*b*.

As depicted in FIG. 4C, the only change to side area 410 is that current time 402 has been updated based on time passing (i.e., from 10:01 to 10:02). Side area 410 in frame 400*c* still includes the other user interface elements described in FIG. 4B. It should be understood that more changes could occur to side area 410 in response to user selection of maps affordance 414. Such changes may be determined by the vehicle and/or the user device.

As depicted in FIG. 4C, main area 408 still includes speedometer 404 and fuel gauge 406, though speedometer 404 has been modified. As compared to frame 400*b* in FIG. 4B, speedometer 404 is at a different location with a different size. In particular, speedometer 404 has moved down and to the left and become smaller. In some examples, the different location is a change to the second layout, in that the second layout identifies the previous location as where speedometer 404 is located. In other examples, the second layout defines that speedometer 404 can be in either the location as depicted in FIG. 4B or the location as depicted in FIG. 4C and the content received from the user device identifies the location for the third time (i.e., FIG. 4C). It should be recognized that other types of movement, size, and or other changes may have been applied to speedometer 404 between frame 400*b* and frame 400*c*.

In some examples, the parameters of speedometer 404 (e.g., size, font, format, and location) were determined by the user device and at least the changes were sent to the vehicle for rendering by the vehicle. In such examples, the changes may be sent to the vehicle before, with, or after sending a frame (e.g., a frame corresponding to frame 400*c*, the frame without speedometer 404 and fuel gauge 406) from the user device to the vehicle. Based on the changes, the vehicle may render speedometer 404 and place speedometer 404 at the location depicted in frame 400*c*. In other examples, the vehicle may not receive a new frame to be displayed at the third time. Instead, the vehicle receives instructions for how to modify a previous frame received and performs such modifications locally without needing to receive a frame from the vehicle.

FIG. 4D depicts frame 400*d* and is displayed after the second time of FIG. 4B and, optionally, the third time of FIG. 4C (i.e., a fourth time). Frame 400*d* is displayed after receiving user selection of maps affordance 414 and optionally after one or more frames included in an animation between frame 400*b* and frame 400*d* (e.g., frame 400*d* may be displayed after frame 400*b* when frame 400*c* is not displayed).

Frame 400*d* is in accordance with a different layout than the second layout (i.e., a third layout). In some examples, the third layout, similar to the second layout, is selected by the user device. As depicted in FIG. 4D, the third layout, similar to the second layout, includes two areas: main area 408 and side area 410. In the third layout, side area 410 includes the same user interface elements as side area 410 in the second layout. The only change to side area 410 is that current time 402 has been updated based on time passing (i.e., from 10:02 to 10:03). Side area 410 in frame 400*d* still includes the other user interface elements described in FIG. 4B and FIG. 4C. It should be understood that more changes could occur to side area 410 in frame 400*d*. Such changes may be determined by the vehicle and/or the user device.

As depicted in FIG. 4D, main area 408 includes a map with current location indicator 422. In some examples, the map and current location indicator 422 are determined and rendered by the user device, and then sent to the vehicle. In such examples, the map and current location indicator 422 may be determined by a maps application executing on the user device.

In addition to the map, main area 408 of frame 400*d* still includes speedometer 404 and fuel gauge 406, though speedometer 404 has again been modified. As compared to frame 400*c* in FIG. 4C, speedometer 404 in frame 400*d* is at a different location with a different size. In particular, speedometer 404 has moved down and to the left and become smaller. In some examples, the different location is defined in the third layout, in that the third layout identifies the location of speedometer 404 in frame 400*d* as where speedometer 404 is located. It should be recognized that other types of movement, size, and or other changes may have been applied to speedometer 404 between frame 400*c* and frame 400*d*. Similar to above, in some examples, the parameters of speedometer 404 (e.g., size, font, format, and location) were determined by the user device and at least the changes were sent to the vehicle for rendering by the vehicle. As depicted in FIG. 4D, both speedometer 404 and fuel gauge 406 are overlapping the map in main area 408 and, in some examples, were rendered on top of the map by the vehicle.

Figure 4E:
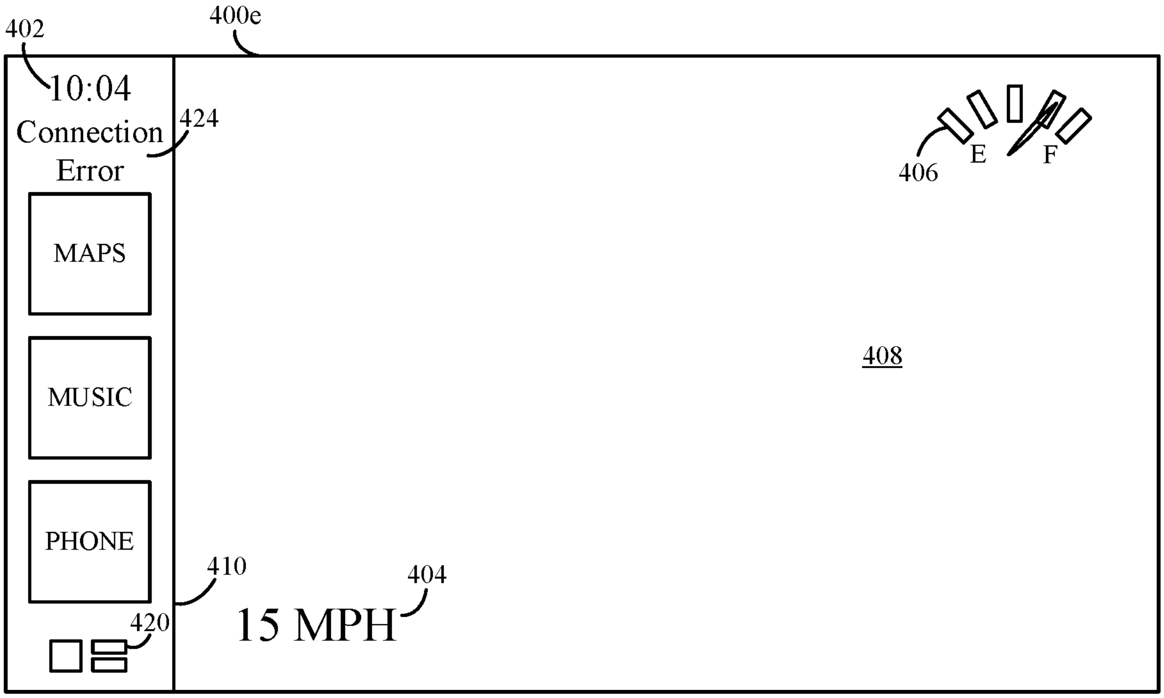

FIG. 4E depicts frame 400*e* and is displayed after the fourth time of FIG. 4D (i.e., a fifth time). Frame 400*e* is displayed after the vehicle detects an error in the connection between the vehicle and the user device. Frame 400*e* maintains the layout from frame 400*d* of FIG. 4D (i.e., the third layout) and still includes main area 408 with speedometer 404 and fuel gauge 406 and side area 410 with current time 402, the application affordances, and dashboard affordance 420. In particular, such user interface elements in frame 400*e* are located in the same locations as in frame 400*d*.

As depicted in FIG. 4E, some changes to main area 408 include that the map and current location indicator 422 are no longer displayed. In some examples, removal of the map and current location indicator 422 indicates that the connection between the vehicle and the user device is not working. In other examples (not illustrated), the map and current location indicator 422 are maintained in frame 400*e* because frame 400*d* is reused for the fifth time when the connection is not working.

In some examples (not illustrated), all content rendered by the user device would not be displayed when there is an error in the connection between the vehicle and the user device. In such examples, such content would not be displayed because there would not be content from the user device that is designated to be displayed at the current time (i.e., the fifth time). For example (not illustrated), the application affordances and dashboard affordance 420 in side area 410 may no longer be displayed. For another example, only user interface elements that are updating at a certain rate (e.g., a predefined rate or a predefined type of user interface element) would no longer be displayed. In such an example, the map and current location indicator 422 may no longer be displayed but the application affordances and dashboard affordance 420 in side area 410 may still be displayed.

As depicted in FIG. 4E, current time 402 has been updated based on time passing (i.e., from 10:03 to 10:04), speedometer 404 has been updated based on a speed of the vehicle (i.e., from to 15 MPH), and signal affordance 412 has been replaced with error affordance 424 (e.g., error affordance 424 is displayed). Error affordance 424 indicates that there is a connection error. Such updates may have been performed by the vehicle, such that the vehicle re-rendered current time 402 and speedometer 404 to reflect current data determined by the vehicle.

Side area 410 in frame 400*e* still includes the other user interface elements described in FIG. 4D. It should be understood that more changes could occur to side area 410 in response to losing connection. Such changes may be determined by the vehicle after detecting that the connection is not working or before the detecting by the vehicle or the user device.

Figure 4F:
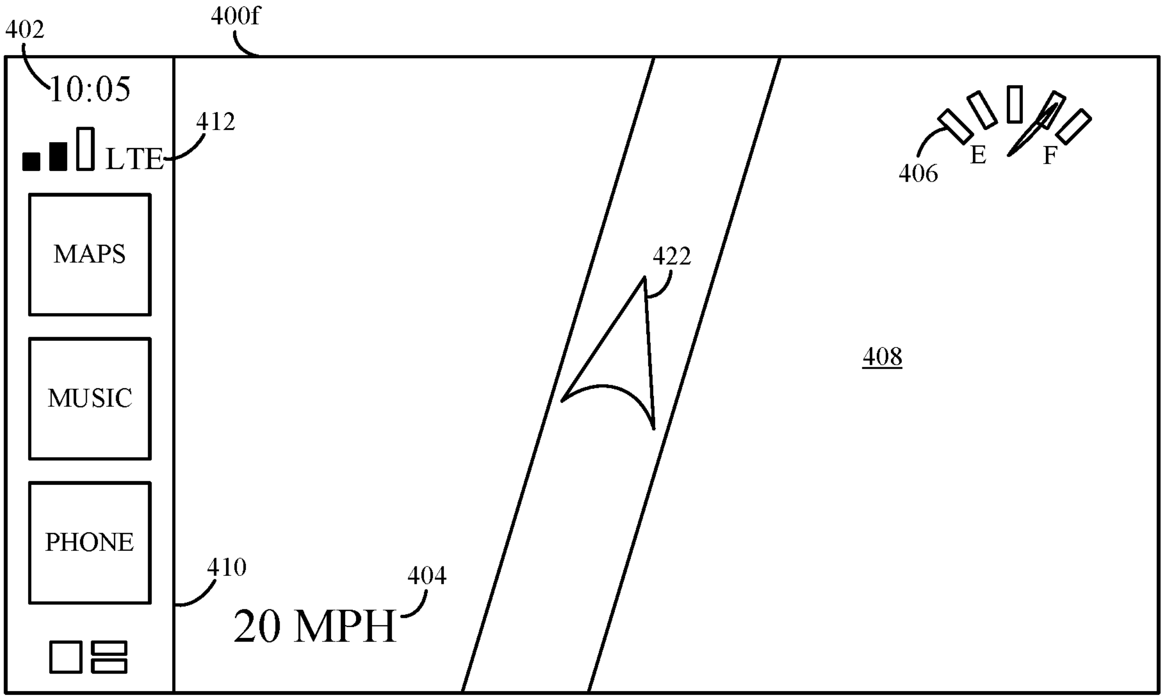

FIG. 4F depicts frame 400*f* and is displayed after the fifth time of FIG. 4E (i.e., a sixth time). Frame 400*f* is displayed after the vehicle reconnects to the user device. Frame 400*f* maintains the layout from frame 400*d* of FIG. 4D (i.e., the third layout) and still includes main area 408 with the map, current location indicator 422, speedometer 404, and fuel gauge 406 and side area 410 with current time 402, the application affordances, and dashboard affordance 420. In particular, such user interface elements in frame 400*e* are located in the same locations as in frame 400*d*.

As depicted in FIG. 4F and compared to FIG. 4E, the map and current location indicator 422 are displayed again, indicating that the map and current location indicator 422 have been received for the current time from the user device. In addition, the map has been updated to reflect a current location of the vehicle.

As depicted in FIG. 4F, current time 402 has been updated based on time passing (i.e., from 10:04 to 10:05), speedometer 404 has been updated based on a speed of the vehicle (i.e., from 15 to 20 MPH), and error affordance 424 has been replaced with signal affordance 412 (e.g., signal affordance 412 is displayed again). In some examples, user interface elements such as current time 402 and/or signal affordance 412 may be rendered by the user device at the sixth time (i.e., FIG. 4F), even if current time 402 was re-rendered by the vehicle at the fifth time while there was no connection (i.e., FIG. 4E).

Side area 410 in frame 400*e* still includes the other user interface elements described in FIG. 4D. It should be understood that more changes could occur to side area 410 in response to regaining connection. Such changes may be determined by the vehicle and/or the user device after detecting that the connection is working or before the detecting by the vehicle or the user device.

Figure 4G:
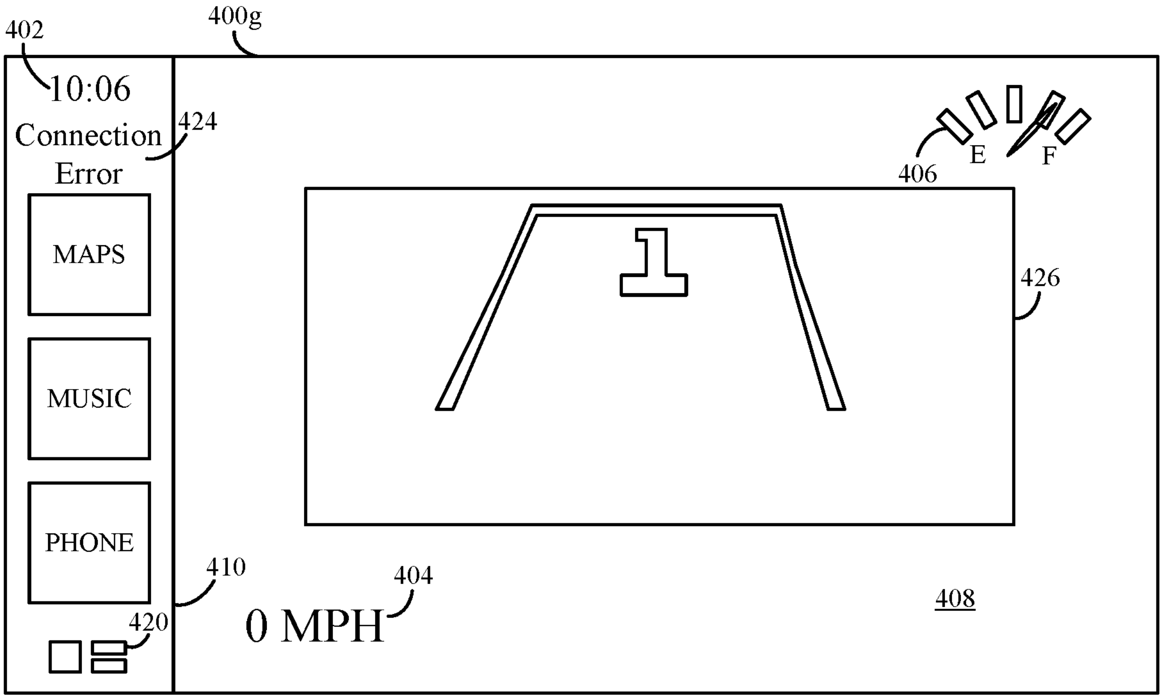

FIG. 4G depicts frame 400*g* and is displayed after the sixth time of FIG. 4D (i.e., a seventh time). Frame 400*g* is displayed after the vehicle shifts into reverse and while there is an error in the connection between the vehicle and the user device. Frame 400*g* does not maintain the layout from frame 400*f* of FIG. 4F (i.e., the third layout) but instead changes to a new layout (i.e., a fourth layout). In some examples, the fourth layout is selected by the vehicle due to the error in the connection between the vehicle and the user device. In other examples, when the connection between the vehicle and the user device is working, a new layout is selected by the user device. In such examples, the new layout might be the same layout selected by the vehicle or a different one. The same layout may be selected because both the vehicle and the user device are selecting from the same set of layouts and the input causing the change in layout (e.g., the vehicle shifting into reverse) results in a particular layout.

The fourth layout still includes main area 408 with speedometer 404 and fuel gauge 406 (in the same location, size, and font) and side area 410 with current time 402, the application affordances, and dashboard affordance 420.

As depicted in FIG. 4G and compared to FIG. 4F, one change to main area 408 is that the map and current location indicator 422 are no longer displayed and instead feed 426 (e.g., an image or a frame of a video) from a rear-view camera is displayed. In some examples, the rear-view camera generates feed 426 and sends to a process of the vehicle for display such that feed 426 is not attempted to be sent to the user device. In such examples, feed 426 may never be sent to the user device and instead maintained locally on the user device even when the connection with the user device is working. It should be recognized that feed 426 is not displayed as a result of the error in the connection between the vehicle and the user device. In some examples, feed 426 is displayed as a result of the vehicle shifting into reverse. In such examples, feed 426 is displayed whenever the vehicle shifts into reverse regardless of a connection status between the vehicle and the user device. In other words, feed 426 would be displayed when (1) the vehicle is connected to the user device and receiving content from the user device to display and (2) the vehicle is not connected to the user device and is displaying content without receiving content from the user device.

Similar to above, current time 402 has again been updated based on time passing (i.e., from 10:05 to 10:05), speedometer 404 has been updated based on a speed of the vehicle (i.e., from 20 to 0 MPH), and signal affordance 412 has been replaced with error affordance 424 (e.g., error affordance 424 is displayed).

Side area 410 in frame 400*e* still includes the other user interface elements described in FIG. 4F. It should be understood that more changes could occur to side area 410 in response to shifting into reverse and/or losing connection. Such changes may be determined by the vehicle after detecting that the connection is not working or before the detecting by the vehicle or the user device.

Figure 4H:
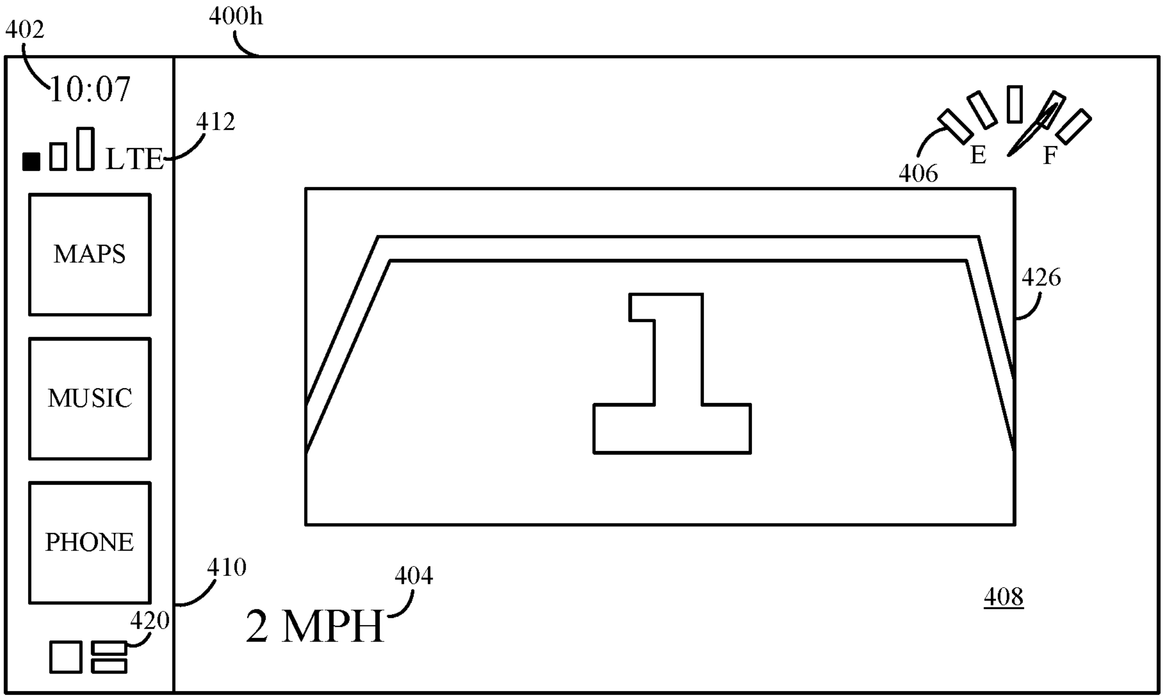

FIG. 4H depicts frame 400*h* and is displayed after the seventh time of FIG. 4G (i.e., an eighth time). Frame 400*h* is displayed after the vehicle reconnects to the user device. Frame 400*h* maintains the layout from frame 400*g* of FIG. 4G (i.e., the fourth layout) and still includes main area 408 with feed 426, speedometer 404, and fuel gauge 406 and side area 410 with current time 402, the application affordances, and dashboard affordance 420.

As depicted in FIG. 4H, current time 402 has been updated based on time passing (i.e., from 10:06 to 10:07), speedometer 404 has been updated based on a speed of the vehicle (i.e., from to 2 MPH), feed 426 has been updated based on what is received from the rear-view camera, and error affordance 424 has been replaced with signal affordance 412 (e.g., signal affordance 412 is displayed).

Side area 410 in frame 400*e* still includes the other user interface elements described in FIG. 4G. It should be understood that more changes could occur to side area 410 in response to regaining connection. Such changes may be determined by the vehicle and/or the user device.

FIGS. 5A-5H are flow diagrams illustrating different operations by vehicle 500 (e.g., vehicle 302) and user device 502 (e.g., user device 320). The operations are illustrative of what occurs on the various devices to result in the examples described in FIGS. 4A-4H.

The flow diagrams in FIGS. 5A-5H include operations performed by vehicle 500 on the left side of the vertical line and operations performed by user device 502 on the right side of the vertical line. Operations on both sides of the vertical line may be performed by either or both devices. Operations in boxes of dotted lines represent optional operations. Such optional operations are not performed in some examples. It should be recognized that other operations may be optional and some operations may be performed by different devices than depicted.

In some examples, vehicle 500 is any means in or by which a person travels or an object is carried or conveyed. Examples of vehicle 500 include a motor vehicle (e.g., a motorcycle, a car, a truck, a bus, a plane, a boat, etc.) and a railed vehicle (e.g., a train or a tram). In some examples, user device 502 is an electronic device owned and/or operated by a user. Examples of user device 502 include a mobile or other handheld device (e.g., a smart phone, a tablet, a laptop, or a smart accessory (e.g., a smart watch)).

Figure 5A:
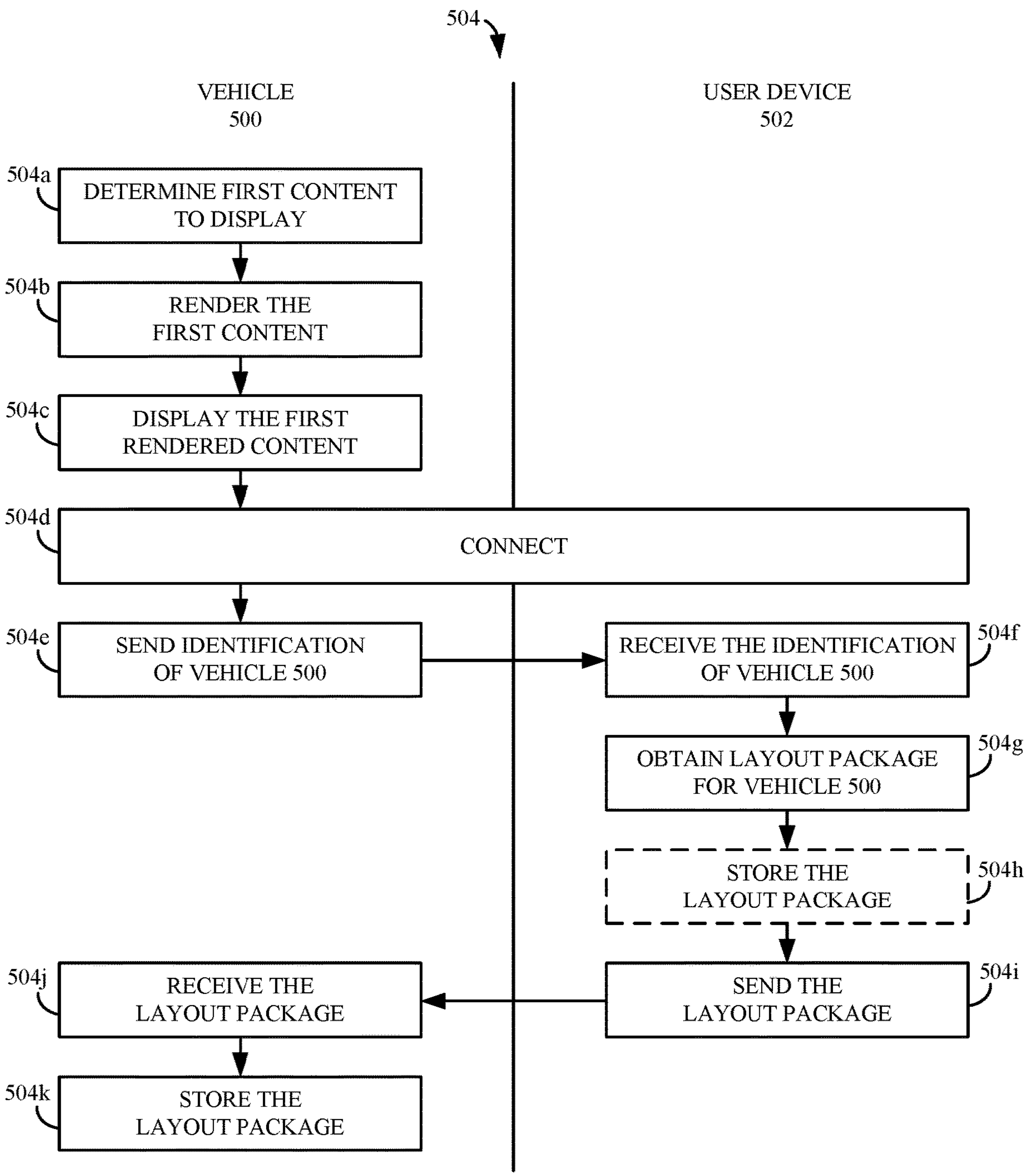
FIGS. 5A-5H are flow diagrams illustrating different operations before by a vehicle and a user device.

FIG. 5A is a flow diagram illustrating method 504 for establishing layout packages on both vehicle 500 and user device 502. Some operations in method 504 are, optionally, combined, the orders of some operations are, optionally, changed, and some operations are, optionally, omitted.

At 504*a*, method 504 includes vehicle 500 determining first content to display. In some examples, 504*a* occurs after vehicle 500 turns on and before vehicle 500 connects to user device 502. In some examples, 504*a* occurs before any communications (e.g., pairing and/or discovery) between vehicle 500 and user device 502. The first content that vehicle 500 determines to display is determined based on information accessible by vehicle 500 (e.g., not information received from user device 502).

An example of the first content is depicted in FIG. 4A, including current time 402, speedometer 404, and fuel gauge 406. For example, vehicle 500 may determine what time to display in current time 402, what speed to display in speedometer 404, and what fuel to display in fuel gauge 406. In some examples, the determined first content also includes a layout to use to display the first content, the layout identifying which user interface elements to display and how to display those user interface elements (e.g., locations of the user interface elements within a frame). In some examples, the layout is stored by vehicle 500, such as stored at manufacture time or through an update at a time after manufacture.

At 504*b*, method 504 includes vehicle 500 rendering (e.g., the process of generating an image from a 2D or 3D model by means of a software process) the first content. The rendering is performed by a renderer executing on a computer system of vehicle 500 (e.g., vehicle renderer 306 or integration renderer 310). An example of the rendered first content is frame 400*a*, as depicted in FIG. 4A.

At 504*c*, method 504 includes vehicle 500 displaying the first content. The displaying is on a display of vehicle 500, such as a touch-sensitive display, a heads-up display, a surface through a projector, or a screen. In some examples, vehicle 500 displays different content on different displays of vehicle 500.

At 504*d*, method 504 includes establishing a connection between vehicle 500 and user device 502. In some examples, the connection is initiated by vehicle 500 or user device 502. The connection may be hard wired (e.g., through one or more wires) or wireless (e.g., through a wireless communication channel, such as Bluetooth or WiFi). If vehicle 500 supports a hard wired connection using a port of vehicle 500, the connection may be established by plugging one side of a cord into the port of vehicle 500 and another side of the cord into a port of user device 502. If vehicle 500 supports a wireless connection, the connection may be established by turning on a wireless network on both vehicle 500 and user device 502 and navigating to a user interface on either vehicle 500 or user device 502 to select the other device for connecting. The connecting may include pairing the two devices together to establish one or more secure connections for sending data between vehicle 500 and user device 502. Such pairing would be performed the first time that the devices are connecting and not be necessary subsequent times.

At 504*e*, method 504 includes vehicle 500 sending an identification of vehicle 500 to user device 502. In some examples, the identification is a unique identifier specific to vehicle 500 (e.g., a vehicle identification number (VIN)) or specific to a component of vehicle 500 (e.g., an identifier for a display of vehicle 500) or a non-unique identifier specific to vehicle 500 (e.g., a make and/or model of vehicle 500) or specific to a component of vehicle 500 (e.g., a brand or model number of the component). The identification of vehicle 500 may be sent while establishing the connection at 504*d* or via the connection established at 504*d* (i.e., after the connection is establishing using the established connection). In some examples, the identification of vehicle 500 is sent via a first connection (e.g., using a first communication technology, such as Bluetooth) and subsequent communications of data (e.g., receiving a layout package at 504*j*) are sent via a second connection (e.g., using a second communication technology, such as WiFi) that is established using the first connection. At 504*f*, method 504 includes user device 502 receiving the identification of vehicle 500.

At 504*g*, method 504 includes user device 502 obtaining a layout package for vehicle 500. The layout package includes definitions of one or more layouts for vehicle 500. In some examples, a layout defines an initial location for one or more user interface elements within a frame. In such examples, the layout may be used to identify where to render particular user interface elements within a frame. In some examples, the initial location for a user interface element may be modified, though the initial location provides a starting point and/or expected location of the user interface element. The layout package may further include one or more rendered user interface elements and/or scripts for rendering user interface elements. In some examples, some of the rendered user interface elements in the layout package are rendered and added to the layout package by user device 502 such that those rendered user interface elements are not included in the layout package received by user device 502.

In some examples, the layout package is obtained using the identification of vehicle 500. For example, user device 502 may send a request for a current layout package for vehicle 500 to a remote device, the request including the identification of vehicle 500. The remote device may then send the layout package to user device 502. In such an example, at 504*h*, method 504 includes user device 502 storing the layout packaged received from the remote device. In some examples, the storage location of the layout package is local to user device 502 such that user device 502 is able to access the layout package when not able to communicate with the remote device. For another example, user device 502 may already store one or more layout packages and, using the identification of vehicle 500, identify which layout package to use with respect to vehicle 500.

At 504*i*, method 504 includes user device 502 sending the layout package to vehicle 500. In some examples, the layout package is sent via the connection established at 504*d*. At

504*j*, method 504 includes vehicle 500 receiving the layout package and, at 504*k*, storing the layout package. In some examples, the storage location of the layout package is local to vehicle 500 such that vehicle 500 is able to access the layout package when not connected to user device 502. In some examples, by having the layout package stored on both vehicle 500 and user device 502, both devices are able to identify where user interface elements are to be placed in a frame and identify where the other device may place user interface elements. In addition, less data is needed to be communicated between the devices when attempting to display content; and vehicle 500 is able to continue to operate and display content even when a connection with user device 502 is not working.

Figure 5B:
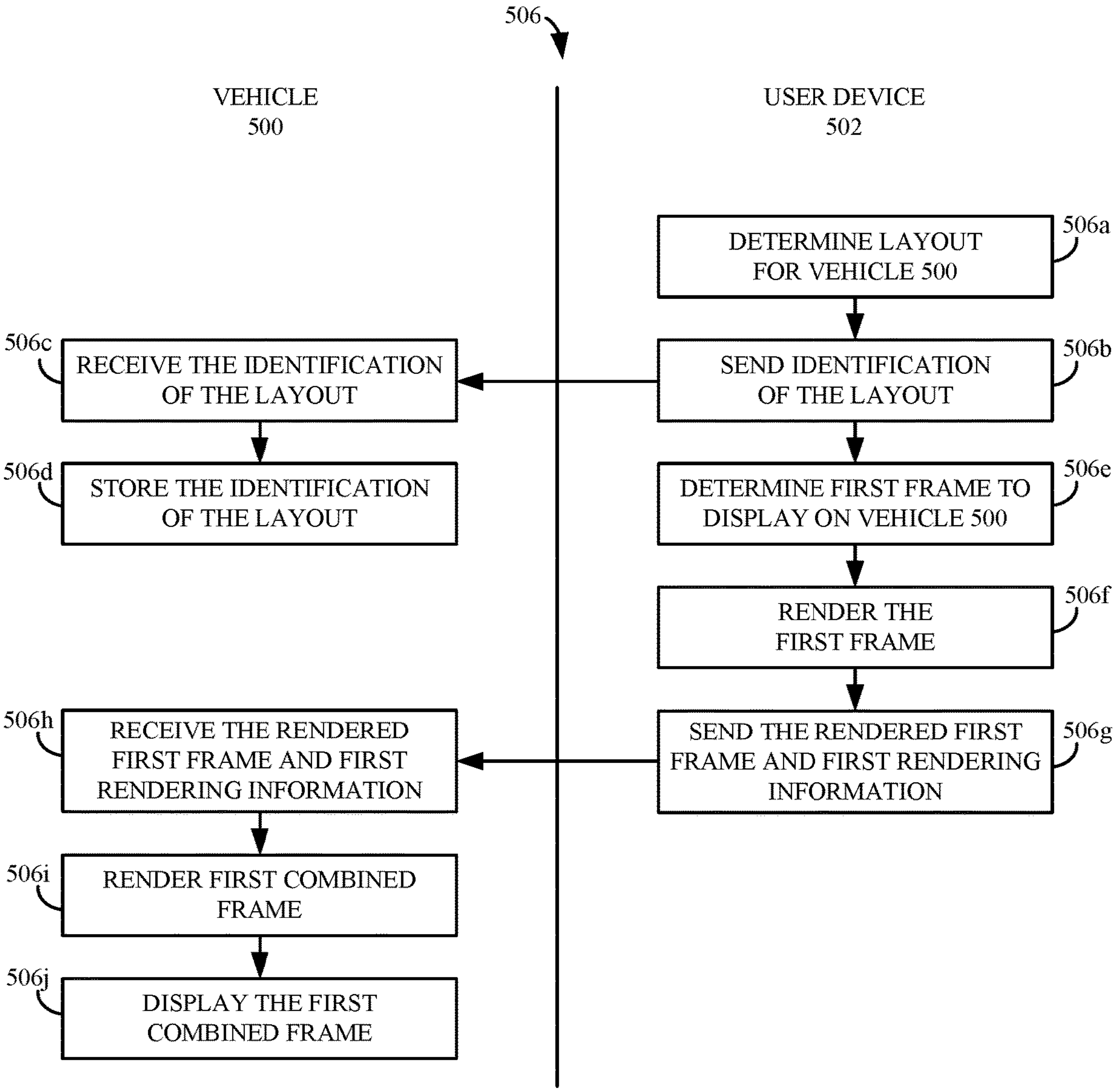

FIG. 5B is a flow diagram illustrating method 506 for vehicle 500 displaying a frame including content rendered by both vehicle 500 and user device 502. Some operations in method 506 are, optionally, combined, the orders of some operations are, optionally, changed, and some operations are, optionally, omitted. In some examples, method 506 occurs after method 504 of FIG. 5A.

At 506*a*, method 506 includes user device 502 determining a layout to use for vehicle 500. In some examples, the layout is from the layout package obtained by user device 502 at 504*g* of method 504. The layout may be determined based on a context of vehicle 500 and/or user device 502, such as what is currently being displayed by vehicle 500 and/or what is to be displayed by vehicle 500 in the future.

At 506*b*, method 506 includes user device 502 sending an identification of the layout to vehicle 500. The identification of the layout may be sent via the connection established at 504*d* of method 504 or a subsequent connection. In some examples, the identification of the layout may be sent via a connection configured for sending metadata and control information while a different connection is configured to stream content between the devices (e.g., the rendered first frame sent at 506*g*). At 506*c*, method 506 includes vehicle 500 receiving the identification of the layout and, at 506*d*, storing the identification of the layout. In some examples, the storage location of the identification of the layout is local to vehicle 500 such that vehicle 500 is able to access the identification of the layout when not connected to user device 502. By storing the identification of the layout, vehicle 500 is able to determine how to combine frames received from user device 502 with user interface elements rendered by vehicle 500. In other examples, the identification of the layout may be sent along with any content sent as metadata to the content.

At 506*e*, method 506 includes user device 502 determining a first frame to be displayed by vehicle 500. In some examples, the determining is based on a context of vehicle 500 and/or user device 502, such as what is currently being displayed by vehicle 500 and/or what is to be displayed by vehicle 500 in the future. In such examples, the determining may be performed by an application executing on user device 502 that is pushing content to be displayed by vehicle 500.

At 506*f*, method 506 includes user device 502 rendering the first frame and, at 506*g*, sending the rendered first frame and first rendering information to vehicle 500. In some examples, the rendered first frame and the first rendering information are sent to vehicle 500 separately, such as through different communication channels. For example, the rendered first frame may be sent through a streaming connection for sending frames and the first rendering information may be sent outside of the streaming connection in a message addressed to vehicle 500. The first rendering information may include data to assist vehicle 500 in combining user interface elements with the first frame and/or in displaying the first frame (e.g., a time when to display the first frame). In some examples, the first rendering information includes instructions to modify an appearance of a user interface element rendered by vehicle 500 and/or a location of where to include the user interface element within the first frame (i.e., different from the layout being used for the first frame).

At 506*h*, the method includes vehicle 500 receiving the rendered first frame and the first rendering information and, at 506*i*, rendering a first combined frame. In some examples, the first combined frame is rendered by combining the rendered first frame with one or more user interface elements stored and/or rendered (e.g., previously rendered before receiving the rendered first frame or rendered on top of the rendered first frame) by vehicle 500. In such examples, the combination may be based on the first rendering information, such as modifying how the combination is performed in accordance with one or more instructions included with the first rendering information.

At 506*j*, the method includes vehicle 500 displaying the first combined frame. An example of the first combined frame is frame 400*b*, depicted in FIG. 4B. In the example, the rendered first frame includes all of the user interface elements in frame 400*b* except for speedometer 404 and fuel gauge 406, both of which may be rendered by vehicle 500 based on data detected by sensors of vehicle 500.

Figure 5C:
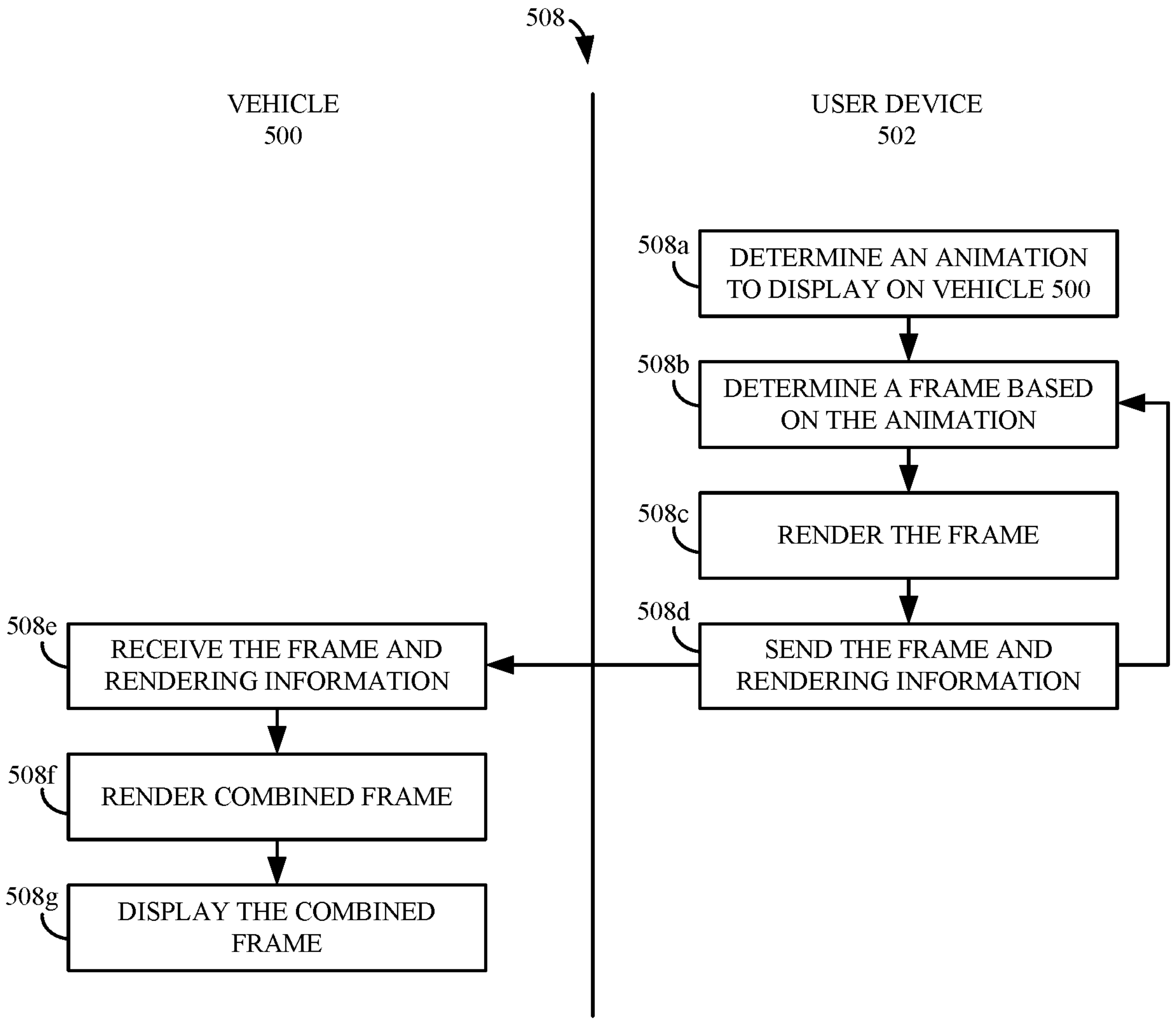

FIG. 5C is a flow diagram illustrating method 508 for user device 502 orchestrating display of an animation by vehicle 500. Some operations in method 508 are, optionally, combined, the orders of some operations are, optionally, changed, and some operations are, optionally, omitted. In some examples, method 508 occurs after method 506 of FIG. 5B.

At 508*a*, method 508 includes user device 502 determining an animation to display on vehicle 500. In some examples, the animation is determined based on a context of vehicle 500 and/or user device 502, such as what is currently being displayed by vehicle 500 and/or what is to be displayed by vehicle 500 in the future. In such examples, the determining may be performed by an application executing on user device 502 that is pushing content to be displayed by vehicle 500. The animation may define what is to be displayed in multiple frames by vehicle 500, including, for example, modifications to a layout over time.

At 508*b*, method 508 includes user device 502 determining a frame based on the animation. In some examples, the frame is further based on a context of vehicle 500 and/or user device 502, such as what is currently being displayed by vehicle 500 and/or what is to be displayed by vehicle 500 in the future.

At 508*c*, method 508 includes user device 502 rendering the frame and, at 508, sending the frame and rendering information to vehicle 500 (similar to 506*f* and 506*g* of FIG. 5B). Method 506 may continue to perform 508*b*, 508*c*, and 508*d* until the animation is complete (e.g., multiple frames may be determined based on the animation, rendered, and sent to vehicle 500).

At 508*e*, the method 508 includes vehicle 500 receiving the frame and the rendering information and, at 508*f*, rendering a combined frame (similar to 506*h* and 506*i* of FIG. 5B). The method 508 then includes, at 508*g*, vehicle 500 displaying the combined frame (similar to 506*j* of FIG. 5B). Method 508 may continue to perform 508*e*, 508*f*, and 508*g* for each frame received from user device 502. An example of different frames of an animation displayed by vehicle 500 are frames 400*b*-400*c* with speedometer 404 moving from the center of main area 408 to the bottom left, as depicted in FIGS. 4B-4C.

Figure 5D:
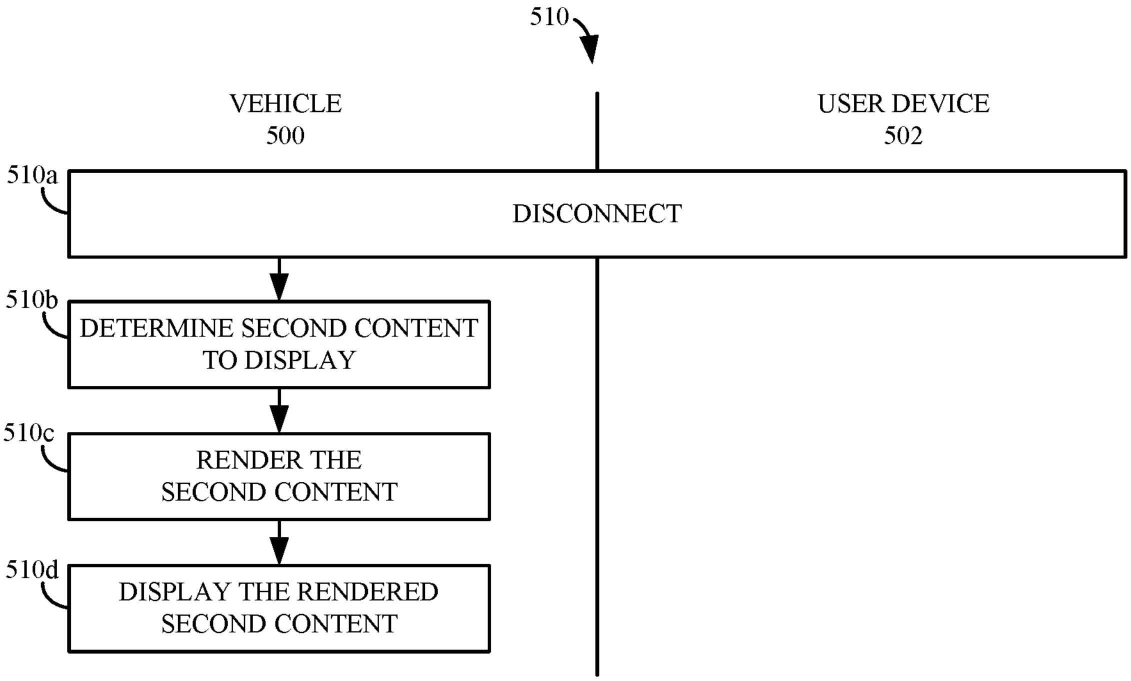

FIG. 5D is a flow diagram illustrating method 510 for vehicle 500 disconnecting from user device 502. Some operations in method 510 are, optionally, combined, the orders of some operations are, optionally, changed, and some operations are, optionally, omitted. In some examples, method 510 occurs after method 508 of FIG. 5C, method 506 of FIG. 5B, and/or method 504 of FIG. 5A.

At 510*a*, method 510 includes vehicle 500 disconnecting from user device 502. In some examples, the disconnection occurs as a result of a cord being unplugged from vehicle 500 and/or user device 502. In other examples, the disconnection occurs as a result of a loss of a wireless connection between vehicle 500 and user device 502, either intentionally or unintentionally.

Method 510 includes vehicle 500 determining second content to display at 510*b* (similar to 504*a* of FIG. 5A), rendering the second content at 510*c* (similar to 504*c* of FIG. 5A), and displaying the rendered second content at 510*d* (similar to 504*d* of FIG. 5A). An example of the second content is frame 400*e*, depicted in FIG. 4E. One difference between when vehicle 500 and user device 502 are connected (e.g., method 506 of FIG. 5B and method 508 of FIG. 5C) and when vehicle 500 and user device 502 are disconnected (e.g., method 510 of FIG. 5D) is which device is setting up what to be displayed. For example, when vehicle 500 and user device 502 are connected, user device 502 is determining a frame to be displayed (e.g., 506*e* in FIGS. 5B and 506*b* in FIG. 5C), such as identifying multiple user interface elements and where to place those user interface elements. On the other hand, when vehicle 500 and user device 502 are disconnected, vehicle 500 is determining a frame to be displayed (e.g., 510*b* in FIG. 5D). This difference is because vehicle 500 no longer has input from user device 502, causing vehicle 500 to make at least one decision (e.g., where, what, or how to display a particular user interface element within a frame) that user device 502 would make if the connection was working.

In some examples, the second content is based on a layout used by vehicle 500 before (e.g., immediately before) disconnecting from user device 502. In other examples, the second content is based on a layout determined by vehicle 500 in response to detecting the loss of connection from user device 502. In some examples, the layout may be based on a context of vehicle 500, such as what vehicle 500 is about to display.

Figure 5E:
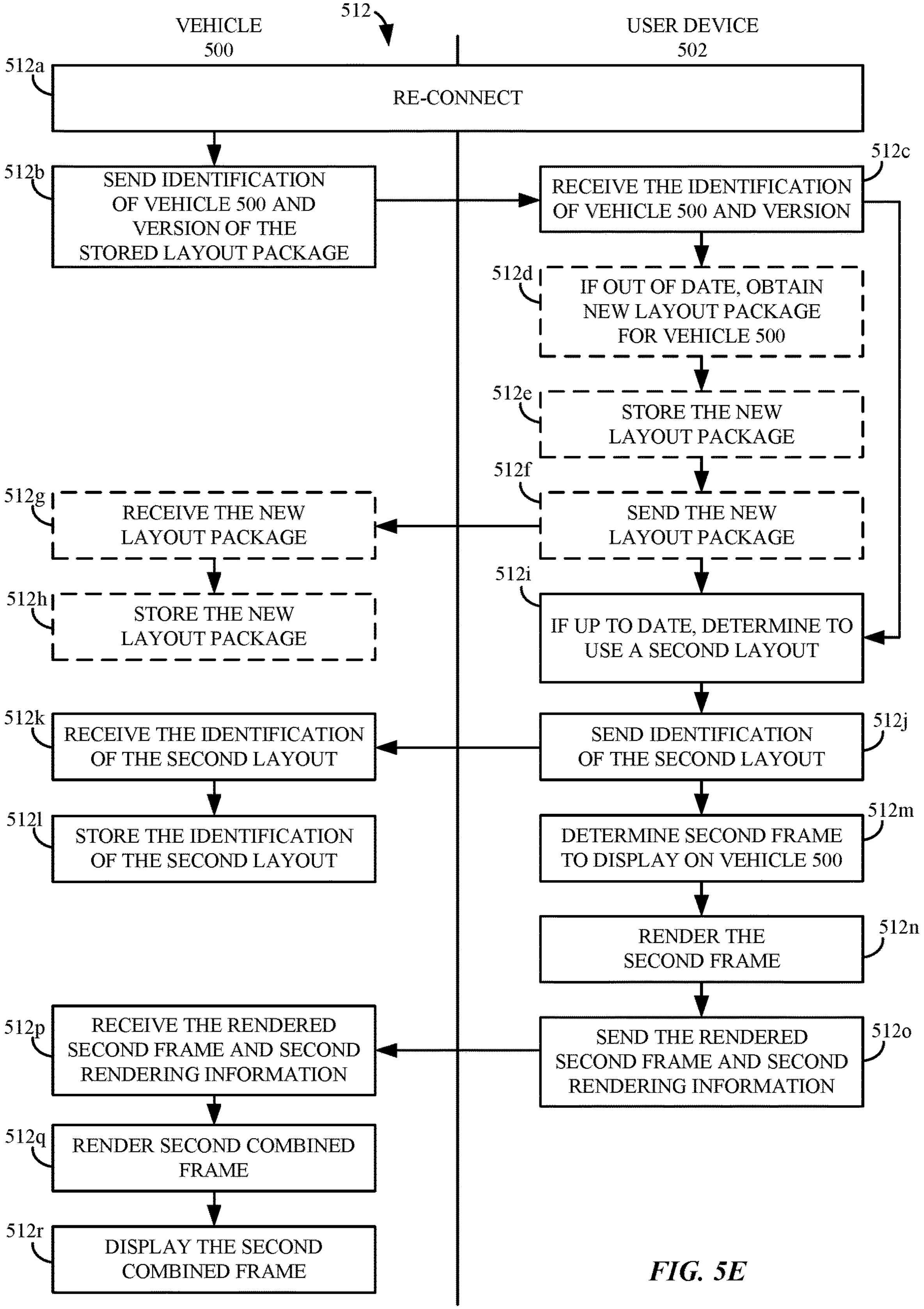

FIG. 5E is a flow diagram illustrating method 512 for vehicle 500 reconnecting with user device 502. Some operations in method 512 are, optionally, combined, the orders of some operations are, optionally, changed, and some operations are, optionally, omitted. In some examples, method 512 occurs after method 510 of FIG. 5D.

At 512*a*, method 512 includes vehicle 500 reconnecting with user device 502. The reconnection may be initiated by vehicle 500 or user device 502. The reconnection may be hard wired (e.g., through one or more wires) or wireless (e.g., through a wireless communication channel, such as Bluetooth or WiFi), as described above at 504*d* of FIG. 5A.

At 512*b*, method 512 includes vehicle 500 sending an identification of vehicle 500 (similar to the identification sent in 504*e* in FIG. 5A) and an identification of version of a stored layout package to user device 502. The stored layout package may be the layout package stored at 504*h* in FIG. 5A and the version may be information included with the stored layout package. In some examples, the identification of vehicle 500 and the identification of the version of the stored layout package is sent via the connection established at 512*a*. At 512*c*, method 512 includes user device 502 receiving the identification of vehicle 500 and the identification of the version.

After receiving the two identifications, user device 502 may determine whether the version is the current version for vehicle 500. If the version is out of date (i.e., not the current version for vehicle 500), method 512 proceeds to 512*d*. If the version is up to date (i.e., the current version for vehicle 500), method 512 proceeds to 512*i*.

At 512*d*, method 504 includes, user device 502 obtaining a new layout package for vehicle 500. As further discussed below, obtaining the new layout package may include sending a request for the new layout package or accessing the new layout package already stored by user device 502. The new layout package may include at least one difference from the layout package stored by vehicle 500. In some examples, the new layout package includes differences from the layout package stored by vehicle 500 such that only the differences are transmitted to vehicle 500 and not the entire layout package.

In some examples, the new layout package is obtained using the identification of vehicle 500 and/or the identification of the version. For example, user device 502 may send a request for a current layout package for vehicle 500 to a remote device, the request including the identification of vehicle 500 and/or the identification of the version. The remote device may then send the new layout package to user device 502. In such an example, at 512*e*, method 512 includes user device 502 storing the new layout packaged received from the remote device. In some examples, the storage location of the new layout package is local to user device 502 such that user device 502 is able to access the new layout package when not able to communicate to the remote device.

At 512*f*, method 512 includes user device 502 sending the new layout package to vehicle 500. In some examples, the new layout package is sent via the connection established at 512*a*. At 512*g*, method 512 includes vehicle 500 receiving the new layout package and, at 512*h*, storing the new layout package. In some examples, the storage location of the new layout package is local to vehicle 500 such that vehicle 500 is able to access the new layout package when not connected to user device 502.

In some examples, after (e.g., in response to) user device 502 obtains or stores the new layout package, method 512 proceeds to 512*i*. In other examples, after (e.g., in response to) user device 502 sends the new layout package, method 512 proceeds to 512*i*.

At 512*i*, method 512 includes user device 502 determining to use a second layout. The second layout is optionally different from a layout being used before reconnecting at 512*a* or being used immediately before most-recently disconnecting. The second layout may be determined based on a context of vehicle 500 and/or user device 502, such as what is currently being displayed by vehicle 500 and/or what is to be displayed by vehicle 500 in the future.

At 512*j*, method 512 includes user device 502 sending an identification of the second layout to vehicle 500. In some examples, the identification of the second layout is sent via the connection established at 512*a* (or a subsequent connection). In such examples, the second layout may be sent with or separate from the new layout package.

At 512*k* and 5121, method 512 includes vehicle 500 receiving and storing the identification of the second layout. In some examples, the storage location of the identification of the second layout is local to vehicle 500 such that vehicle 500 is able to access the identification of the second layout when not connected to user device 502. By storing the identification of the second layout, vehicle 500 is able to determine how to combine frames received from user device 502 with user interface elements rendered by vehicle 500.

After (e.g., in response to) determining to use the second layout or sending the identification of the second layout, method 512 may proceed to 512*m*. At 512*m*, method 512 includes user device 502 determining a second frame to be displayed by vehicle 500. In some examples, the determining is based on a context of vehicle 500 and/or user device 502, such as what is currently being displayed by vehicle 500 and/or what is to be displayed by vehicle 500 in the future. In such examples, the determining may be performed by an application executing on user device 502 that is pushing content to be displayed by vehicle 500.

At 512*n*, method 506 includes user device 502 rendering the second frame and, at 512*o*, sending the rendered second frame and second rendering information to vehicle 500. At 512*p*, the method includes vehicle 500 receiving the rendered second frame and the second rendering information and, at 512*q*, rendering a second combined frame. In some examples, the second combined frame is rendered by combining the rendered second frame with one or more user interface elements stored by vehicle 500. In such examples, the combination may be based on the second rendering information, such as modifying how the combination is performed in accordance with one or more instructions included with the second rendering information.

At 512*r*, the method includes vehicle 500 displaying the second combined frame. An example of the second combined frame is frame 400*f*, depicted in FIG. 4F.

Figure 5F:
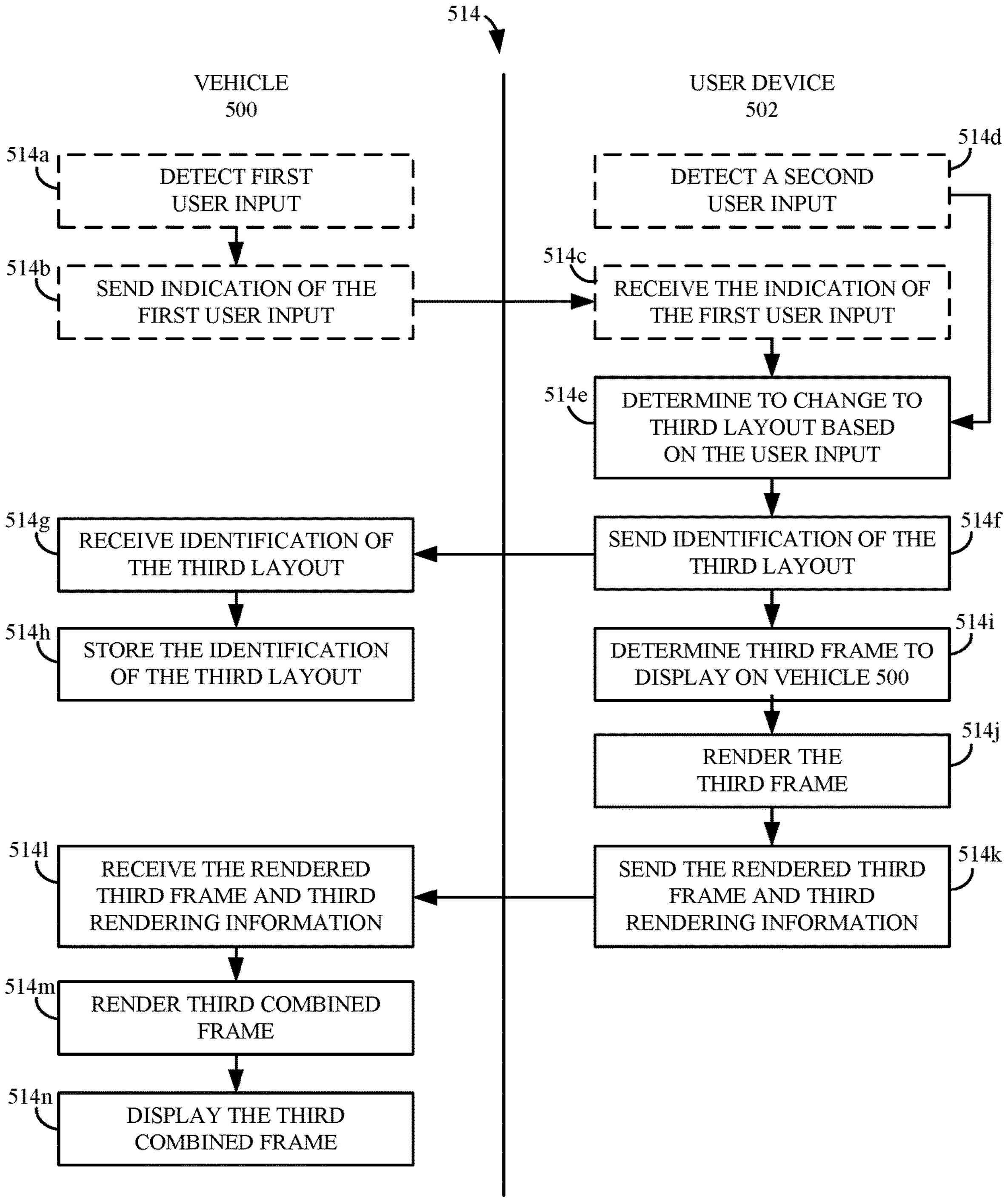

FIG. 5F is a flow diagram illustrating method 514 for responding to user input detected by vehicle 500 or user device 502. Some operations in method 514 are, optionally, combined, the orders of some operations are, optionally, changed, and some operations are, optionally, omitted. In some examples, method 512 occurs after method 512 of FIG. 5E, method 508 of FIG. 5C, method 506 of FIG. 5B, or method 504 of FIG. 5A.

At 514*a*, method 512 includes vehicle 500 detecting first user input. In some examples, the first user input is detected by a component of vehicle 500, such as a sensor of vehicle 500. Examples of the component include a physical button, a touch-sensitive surface, a camera, a microphone, and any other component of vehicle 500 able to detect user input. In response to vehicle 500 detecting the first user input, method 514 proceeds to 514*b*. At 514*b*, vehicle 500 sends an indication of the first user input to user device 502 and, at 504*c*, user device 502 receives the indication of the first user input.

In other examples, instead of vehicle 500 detecting the first user input, user device 502 may detect second user input at 514*d*. In such examples, the second user input is used to determine to change to the third layout without any communication with vehicle 500 (e.g., vehicle 500 does not detect a user input and does not send an indication of the user input to user device 502). In some examples, the second user input is detected by a component of user device 502, such as a sensor of user device 502. Examples of the component include a physical button, a touch-sensitive surface, a camera, a microphone, and any other component of user device 502 able to detect user input.

After determining to change to the third layout, the rest of the operations of method 514 (i.e., 514*f*-514*n*) are similar to 506*b*-506*j* in method 506 of FIG. 5B. An example of the third combined frame of 514*n* is frame 400*d*, depicted in FIG. 4D.

Figure 5G:
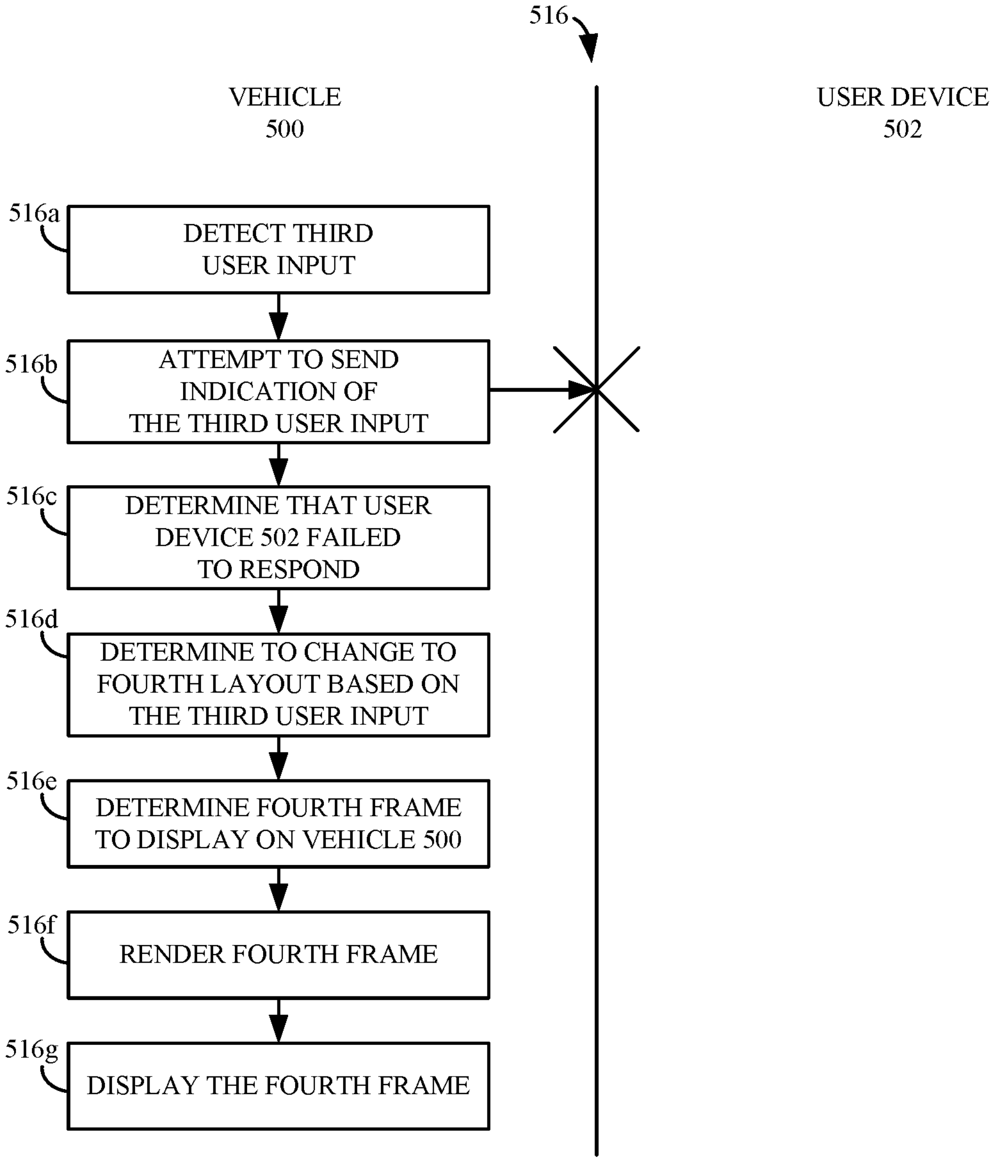

FIG. 5G is a flow diagram illustrating method 516 for recovering from an issue with communication between vehicle 500 and user device 502. Some operations in method 516 are, optionally, combined, the orders of some operations are, optionally, changed, and some operations are, optionally, omitted. In some examples, method 516 occurs after method 514 of FIG. 5F, method 512 of FIG. 5E, method 508 of FIG. 5C, method 506 of FIG. 5B, or method 504 of FIG.

At 516*a*, method 516 includes vehicle 500 detecting third user input and, at 516*b*, attempting to send an indication of the third user input to user device 502. The third user input may be similar to the first user input discussed above at 514*a* in FIG. 5F. In some examples, vehicle 500 attempts to the send the indication via the connection established at 512*a* in FIG. 5E, when sending after FIG. 5E, or via the connection established at 504*d* in FIG. 5A, when sending after FIG. 5A, 5B, or 5C.

At 516*c*, method 516 includes vehicle 500 determining that user device 502 failed to respond to the indication. In some examples, such determining is based on determining that a connection to send the indication to user device 502 is not working. In other examples, such determining is based on determining that a predefined amount of time has expired after attempting to send or sending the indication of the third user input. In other examples, such determining is based on determining that a remaining time to when to display content is reached a threshold that vehicle 500 can no longer wait for user device 502.

At 516*d*, method 516 includes vehicle 500 determining to change to a fourth layout based on the third user input. In some examples, the determining occurs after determining that user device 502 failed to respond to the indication.

At 516*e*, method 516 includes vehicle 500 determining a fourth frame to display on vehicle 500. In some examples, the fourth frame is determined without input from user device 502. In other words, vehicle 500 attempted to receive input from user device 502 and, when the input was not received in time, vehicle 500 determined what to display (similar to as described above with respect to method 510 of FIG. 5D). If the user device 502 had responded, vehicle 500 would use a frame received from user device 502.

At 516*f* and 516*g*, method 516 includes vehicle 500 rendering the fourth frame and displaying the rendered fourth frame. An example of the fourth frame is frame 400*g*, depicted in FIG. 4G.

Figure 5H:
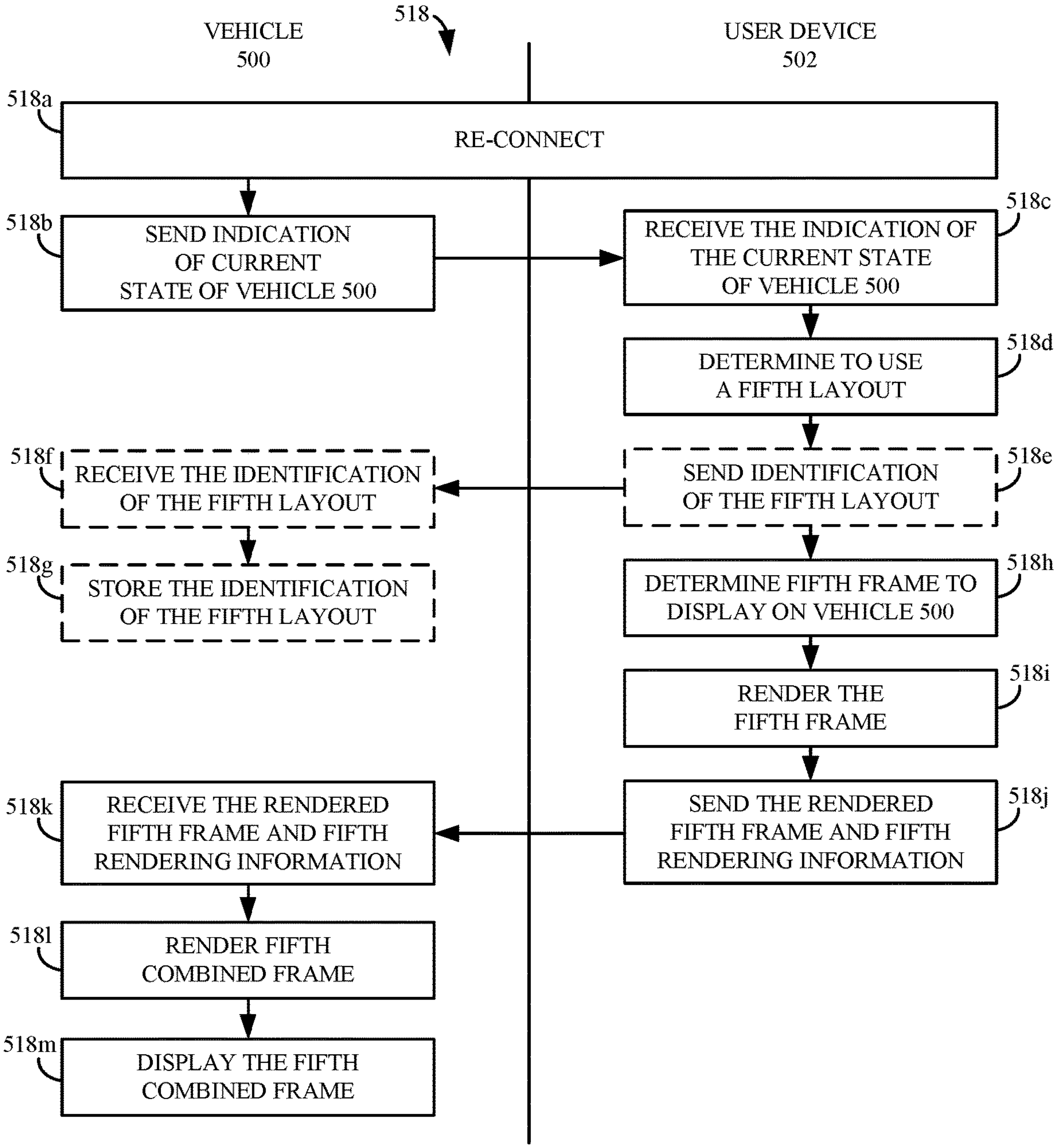

FIG. 5H is a flow diagram illustrating method 518 for when vehicle 500 reconnects to user device 502 after recovering from an issue with communication. Some operations in method 518 are, optionally, combined, the orders of some operations are, optionally, changed, and some operations are, optionally, omitted. In some examples, method 518 occurs after method 516 of FIG. 5G.

At 518*a*, method 516 includes vehicle 500 reconnecting with user device 502. In some examples, the reconnection is initiated by vehicle 500 or user device 502. The reconnection may be hard wired (e.g., through one or more wires) or wireless (e.g., through a wireless communication channel, such as Bluetooth or WiFi), as described above at 504*d* of FIG. 5A.

At 518*b*, method 518 includes vehicle 500 sending an identification of a current state of vehicle 500 and, at 518*c*, user device 502 receiving the identification. The identification of the current state may include information to help user device 502 determine what to cause to be displayed by vehicle 500. For example, the identification may include an identification of a layout being used by vehicle 500, an indication of an input signal detected by vehicle 500 (e.g., the indication of the third user input from 516*a* in FIG. 5G), an indication of one or more user interface elements included in a frame displayed by vehicle 500, or any combination thereof. In some examples, vehicle 500 also sends an identification of vehicle 500 and an identification of version of a stored layout package to user device 502, similar to the identifications sent in 512*b* in FIG. 1*n* such examples, method 518 may include operations 512*c*-512*h* if the stored layout package is out of date.

At 518*d*, method 518 includes user device 502 determining to use a fifth layout based on the current state of vehicle 500. The fifth layout may be the same or different from a current layout being used by vehicle 500. In examples that the fifth layout is different, user device 502 sends an identification of the fifth layout to vehicle 500 (at 518*e*) and vehicle 500 receives and stores the identification of the fifth layout (at 518*f* and 518*g*).

The remaining steps of method 518 are similar to 506*e*-506*j* in FIG. 5B. An example of the fifth combined frame of 518*m* is frame 400*h*, depicted in FIG. 4H.

Figure 6:
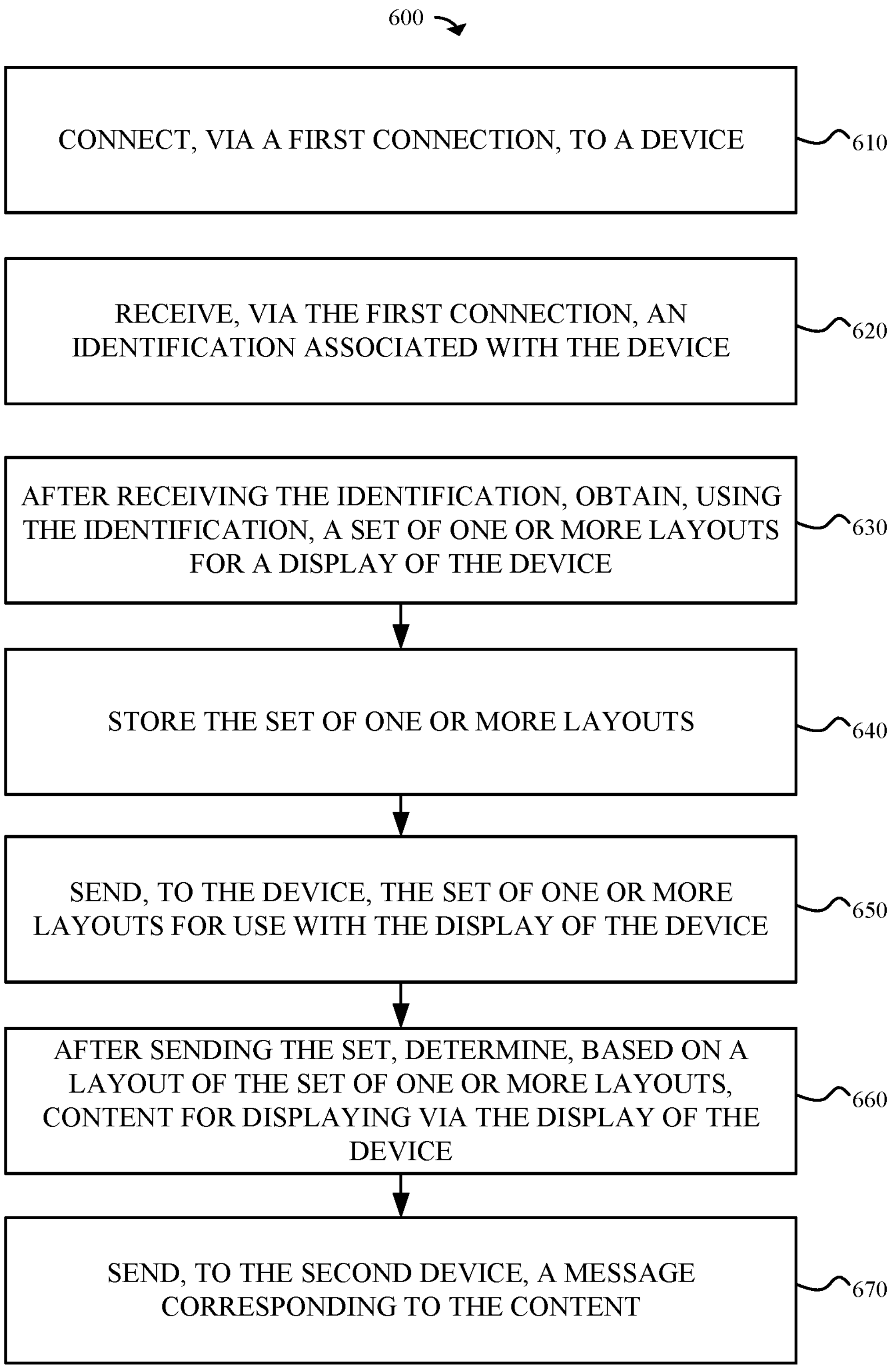
FIG. 6 is a flow diagram illustrating a method for establishing a layout on multiple devices for synchronized rendering.

FIG. 6 is a flow diagram illustrating method 600 for establishing a layout on multiple devices for synchronized rendering. Some operations in method 600 are, optionally, combined, the orders of some operations are, optionally, changed, and some operations are, optionally, omitted.

In some examples, method 600 is performed at a first device (e.g., compute system 100, device 200, user device 320, or user device 502) (in some examples, the first device is a user device, such as a portable electronic device; in some examples, the first device is logged into a user account that the second device is or is not logged into; in some examples, any combination of an operating system module and/or an application module may perform the steps of method 600).

At 610, method 600 includes connecting, via a first connection (e.g., 504*d*), to a second device (e.g., compute system 100, device 200, vehicle 302, or vehicle 500) (in some examples, the second device is a vehicle, such as a computer system configured to display content on a display of the vehicle) different (e.g., separate) from the first device (in some examples, the connecting is included in a pairing process between the first device and the second device; in some examples, the connecting occurs after a pairing process; in some examples, the connecting is via a wired or wireless connection).

At 620, method 600 includes receiving, via the first connection, an identification associated with the second device (e.g., 504*f*) (in some examples, the identification refers to a display or a type of the display of the second device; in some examples, the identification refers to a type of the second device; in some examples, the identification refers to a set of one or more layouts compatible with a display of the second device).

At 630, method 600 includes, after receiving the identification associated with the second device, obtaining, using the identification, a set of one or more layouts for a display (e.g., 504*g*) (e.g., a screen or other visual output device) of the second device (in some examples, the obtaining is through a device other than the second device; in some examples, a layout is not displayed by the display but instead used to identify a location of particular content; in some examples, a layout includes one or more dimensions of the display; in some examples, a layout includes a resolution of the display). In some examples, the set of one or more layouts includes a plurality of layouts (e.g., a plurality of different layouts).

At 640, method 600 includes storing (e.g., in a memory of the first device) the set of one or more layouts (e.g., 504*h*).

At 650, method 600 includes sending (in some examples, the sending is via the first connection), to the second device, the set of one or more layouts for use with the display of the second device (e.g., 504*i*).

At 660, method 600 includes after sending the set, determining, based on a layout of the set of one or more layouts stored at the first device (in some examples, the layout is determined by the first device), content for displaying via the display of the second device (e.g., 506*e*, 508*b*, 512*m*, 514*i*, or 518*h*) (in some examples, the determining includes rendering (e.g., locally rendering) the content on the first device (e.g., 506*f*, 508*c*, 512*n*, 514*j*, or 518*i*); in some examples, the determining includes obtaining rendered content from a remote device). In some examples, the layout includes a definition of an initial location of at least one user interface element (in some examples, the at least one user interface element is rendered by the first device; in some examples, the at least one user interface element is rendered by the second device).

At 670, method 600 includes sending (in some examples, the sending is via the first connection), to the second device, a message corresponding to the content (e.g., 506*g*, 508*d*, 512*o*, 514*k*, or 518*j*) (in some examples, the message includes the content; in some examples, the content includes a portion (e.g., a placeholder) intended for the second device to render a user interface element and add to the portion; in some examples, the message includes an indication that is used by the second device to obtain the content, such as stored locally on the second device or a device remote from the second device; in some examples, the message includes data used to generate content on the second device).

In some examples, method 600 further includes, while the first device is connected to the second device (in some examples, while the first device is connected to the second device via the first connection or a different (e.g., subsequent) connection): receiving an indication of a user input (e.g., 514*c*, 514*d*, or 518*c*) (in some examples, the indication of the user input is an indication of a virtual assistant (e.g., an indication provided by the virtual assistant in response to the virtual assistant receiving an indication from a user; in some examples, the virtual assistant is hosted by the first device or the second device); in response to receiving the indication of the user input, determining to change a layout being used by the second device to a new layout (e.g., 514*e* or 518*d*) (in some examples, the method further comprises, at the first device, determining that the user input corresponds to a request to change a layout (e.g., a current layout)); and sending, to the second device, a message indicating the new layout (e.g., 514*f* or 518*e*) (in some examples, the message identifies the new layout; in some examples, the message includes the new layout; in some examples, the new layout is included in the set of one or more layouts; in some examples, the message includes an indication of a modification to the layout). In some examples, the user input corresponds to activation of a physical button of the second device (in some examples, the physical button is embedded in the second device). In some examples, the user input corresponds to a touch input detected via a touch-sensitive display of the second device (in some examples, the touch input corresponds to selection of an affordance (e.g., a user interface element, such as a button) displayed by the touch-sensitive display). In some examples, the user input corresponds to user input detected via a sensor of the first device (in some examples, the sensor includes a microphone (e.g., through a virtual assistant), a camera (e.g., through a virtual assistant), a touch-sensitive display, or a sensor detecting activation of a physical button of the first device). In some examples, the user input corresponds to voice input detected via a microphone (in some examples, the voice input corresponds to an audible request to change the layout; in some examples, the voice input relates to a virtual assistant; in some examples, the voice input causes another application (e.g., a virtual assistant application) to execute and return control to changing the layout after the other application determines an output (e.g., the user input); in some examples, the user input corresponds to a gesture detected via a camera; in some examples, the microphone is of the first device or the second device).

In some examples, the set of one or more layouts is a first version (in some examples, an identification of the first version was sent to the second device with (or separately from) the set of one or more layouts). In such examples, method 600 further includes after the first connection is disconnected: connecting, via a second connection (e.g., 512*a* or 518*a*) (in some examples, the second connection is the same as or different from the first connection), to the second device; receiving, via the second connection, a second identification (e.g., 512*c*) (in some examples, the second identification is the same as the identification) associated with the second device (in some examples, the second identification refers to a display or a type of the display of the second device; in some examples, the second identification refers to a type of the second device; in some examples, the second identification refers to a set of one or more layouts compatible with a display of the second device); receiving, via the second connection, an identification of a current version associated with the set of one or more layouts (e.g., 512*c*) (in some examples, the identification of the current version and the second identification are included in a single message; in some examples, the identification of the current version is sent separately (e.g., in a different message) from the second identification); and in accordance with a determination that the current version is the same as the first version: determining, based on a particular layout of the set of one or more layouts (in some examples, the particular layout is determined by the first device), second content for displaying via the display of the second device (e.g., 512*m*) (in some examples, the determining includes rendering (e.g., locally rendering) the second content on the first device (e.g., 512*n*); in some examples, the determining includes obtaining rendered content from a remote device); and sending (in some examples, the sending is via the second connection), to the second device, a second message corresponding to the second content (e.g., 512*o*) (in some examples, the second message includes the second content; in some examples, the second content includes a portion (e.g., a placeholder) intended for the second device to render a user interface element and add to the portion; in some examples, the second message includes an indication that is used by the second device to obtain the second content, such as stored locally on the second device or a device remote from the second device; in some examples, the second message includes data used to generate content on the second device). In some examples, method 600 further includes, in accordance with a determination that the current version is different from the first version, sending, to the second device, a new set of one or more layouts (e.g., 512*f*), wherein the new set is the current version, and wherein the new set is different from the set of one or more layouts (e.g., at least one layout from the new set is different from the set of one or more layouts). In some examples, the particular layout is a last-used layout (e.g., the last-used layout is used during a previous connection between the first device and the second device) by the first device for the second device.

In some examples, method 600 further includes, in addition to sending the set of one or more layouts, sending, to the second device, a script (e.g., a render script) for rendering a user interface element (e.g., 504*i* or 512*f*) (in some examples, the script includes one or more instructions, when executed, renders the user interface element (e.g., an image, including one or more pixel values); in some examples, the script is sent in a message with the set of one or more layouts; in some examples, the script is sent in a different message from a message with the set of one or more layouts).

In some examples, method 600 further includes, in addition to sending the set of one or more layouts, sending, to the second device, rendered content (e.g., 504*i* or 512*f*) (e.g., a bitmap or an image, sometimes referred to as a render) (in some examples, the rendered content is sent in a message with the set of one or more layouts; in some examples, the rendered content is sent in a different message from a message with the set of one or more layouts).

Note that details of the processes described below with respect to methods 700 (i.e., FIG. 7), 800 (i.e., FIG. 8), 900 (i.e., FIG. 9), 1000 (i.e., FIG. 10), and 1100 (i.e., FIG. 11) are also applicable in an analogous manner to method 600 of FIG. 6. For example, method 600 optionally includes one or more of the characteristics of the various methods described below with reference to method 700, such as the message sent at 670 of method 600 may be the rendered frame received at 710 of method 700. For another example, method 600 optionally includes one or more of the characteristics of the various methods described below with reference to method 800, such as the message sent at 670 of method 600 may be the rendered frame received at 810 of method 800. For another example, method 600 optionally includes one or more of the characteristics of the various methods described below with reference to method 900, such as the message sent at 670 of method 600 may be the first frame sent at 940 of method 900. For another example, method 600 optionally includes one or more of the characteristics of the various methods described below with reference to method 1000, such as the connection at 610 of method 600 may be the connection at 1020 of method 1000. For another example, method 600 optionally includes one or more of the characteristics of the various methods described below with reference to method 1100, such as the message sent at 670 of method 600 may be the second message received from the device at 1140 of method 1100.

Figure 7:
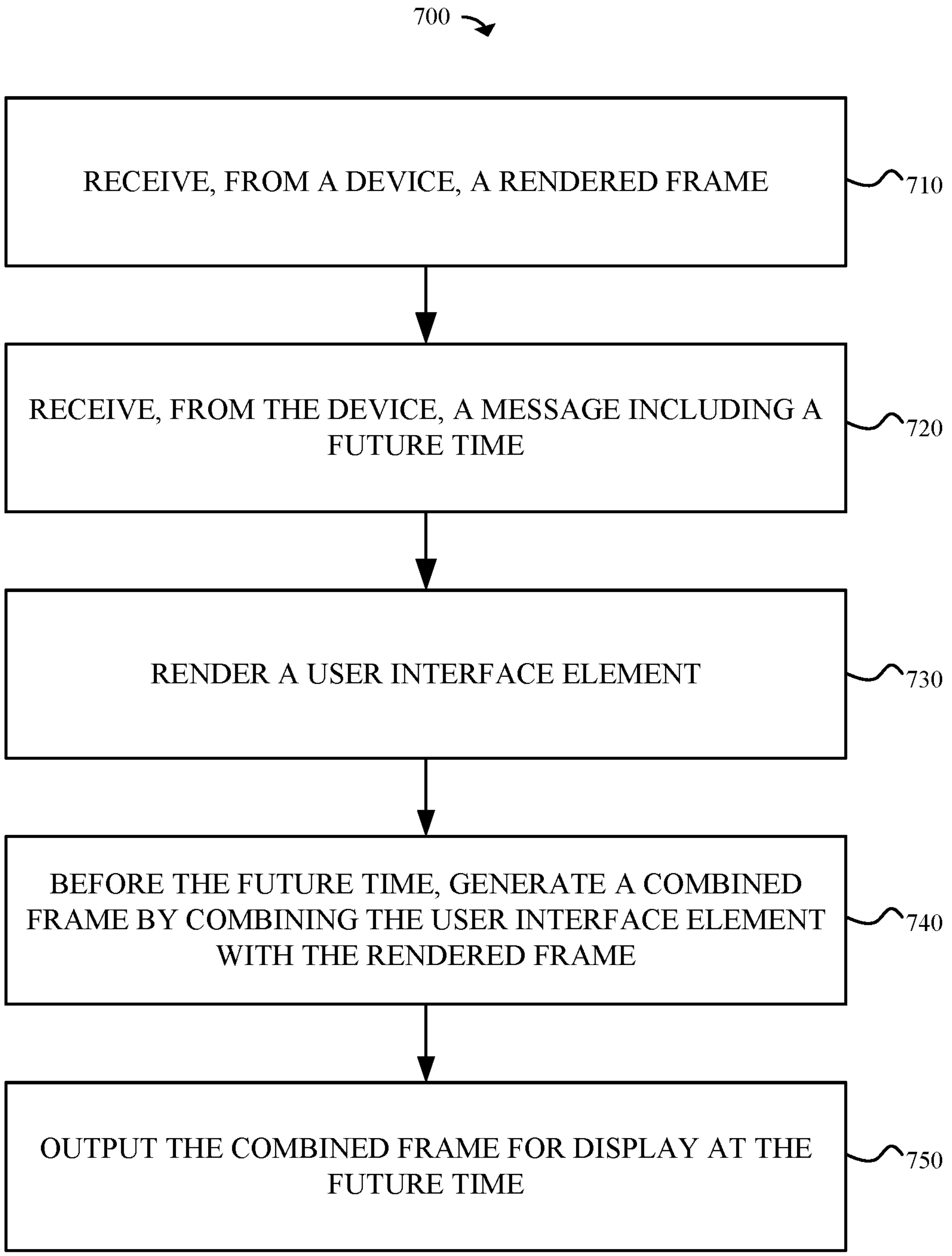
FIG. 7 is a flow diagram illustrating a method for time-based rendering synchronization.

FIG. 7 is a flow diagram illustrating method 700 for time-based rendering synchronization. Some operations in method 700 are, optionally, combined, the orders of some operations are, optionally, changed, and some operations are, optionally, omitted.

In some examples, method 700 is performed at a first device (e.g., compute system 100, device 200, vehicle 302, or vehicle 500) (in some examples, the first device is a vehicle, such as a computer system configured to display content on a display of the vehicle; in some examples, any combination of an operating system module and/or an application module may perform the steps of method 700).

At 710, method 700 includes receiving, from a second device (in some examples, the second device is a user device, such as a portable electronic device; in some examples, the second device is logged into a user account that the first device is or is not logged into) different from the first device, a rendered frame (e.g., 506*h*, 508*e*, 512*p*, 5141, or 518*k*) (e.g., a photo, an image, a portion of a video, or pixel information) (in some examples, the first device is wired or wirelessly connected to the second device, such as via Bluetooth or WiFi, and the rendered frame is received through the connection; in some examples, before receiving the rendered frame, the first device and the second device establishing a streaming connection (e.g., 504*d*, 512*a*, 518*a*), where the streaming connection is configured to send data from at least one device (e.g., the second device) to another device (e.g., the first device); in some examples, the rendered frame is rendered by the second device (e.g., 506*f*, 508*c*, 512*n*, 514*j*, 518*i*); in some examples, the rendered frame is rendered by a device other than the second device and provided to the second device for sending to the first device). In some examples, the rendered frame is rendered (e.g., locally rendered) by the second device. In some examples, the rendered frame received from the second device includes a placeholder portion (in some examples, the placeholder portion does not include content rendered by the second device; in some examples, the placeholder portion includes (in some examples, only includes) background content; in some examples, the placeholder portion does not include a user interface element rendered by the second device; in some examples, the placeholder portion does not include a user interface element other than background content rendered by the second device; in some examples, the placeholder portion does not include a user interface element unique to the placeholder portion as compared to the rest of the rendered frame (e.g., other than other placeholder portions); in some examples, the placeholder portion is only used by the second device to generate the message sent to the first device and no indication of the placeholder portion is sent to the first device separate from a layout), and wherein the combined frame includes the user interface element at a location corresponding to the placeholder portion (e.g., the location is the placeholder portion).

At 720, method 700 further includes, at a first time, receiving, from the second device, a message including a second time (e.g., 506*h*, 508*e*, 512*p*, 5141, 518*k*) (e.g., a future time, a time after a current time, or a time in the future) (in some examples, the message includes an indication other than time in which the combined frame should be displayed (e.g., a next possible time)), wherein the second time is after the first time (in some examples, the message is received via the same channel as the rendered frame; in some examples, the message is received via a different channel than the rendered frame, such as a channel configured to send smaller amounts of data (e.g., Bluetooth compared to WiFi); in some examples, the rendered frame is received after the first time but before the second time such that the second device sends the message before sending the rendered frame). In some examples, the rendered frame is received at the first device after (e.g., separate from) the message is received at the first device (e.g., the rendered frame is included in a different message from the message). In some examples, the message includes an identification of a version of the user interface element (in some examples, multiple versions of the user interface element are stored on the first device, such as a light and a dark version of the user interface element). In some examples, the message includes a modification (in some examples, the modification includes a change in font, size, color, or opacity, such as to make more readable to a user; in some examples, the modification is determined by the user device based on settings of the user device (e.g., accessibility settings), settings of the a application, etc.; in some examples, text and font size are specified by the layout rather than in the message), other than to a location within the rendered frame (e.g., other than to where the user interface element is to be placed within the user interface element), to the user interface element. In some examples, the message includes a location of the user interface element within the rendered frame (in some examples, the location refers to where the user interface element is to be placed with respect to the rendered frame).

At 730, method 700 further includes rendering (e.g., locally rendering) a user interface element (e.g., 506*i*, 508*f*, 512*q*, 514*m*, or 518*l*) (in some examples, the user interface element is rendered before or after receiving the message; in some examples, rendering includes executing a computer program to generate an image from a 2D or 3D model; in some examples, rendering includes modifying content stored by the first device (e.g., pre-rendered content); in some examples, the rendered content is a bitmap; in some examples, the content was stored by the first device before receiving the message and/or the rendered frame; in some examples, rendering includes accessing a script for the user interface element and executing the script; in some examples, rendering is performed by a graphics processing unit (GPU) of the first device).

At 740, method 700 further includes, before the second time, generating a combined frame by combining the user interface element with the rendered frame (e.g., 506*i*, 508*f*, 512*q*, 514*m*, or 518*l*) (in some examples, the combined frame is generated in response to receiving the message (in some examples, in response to refers to occurring without any further user input); in some examples, generating the combined frame includes rendering (e.g., locally rendering) the user interface element, such that the rendering is not separate from the combining). In some examples, combining the user interface element with the rendered frame includes placing (e.g., underlying or overlaying) the user interface element on (e.g., on bottom of (e.g., under) or on top of) the rendered frame (in some examples, the user interface element is placed to appear in front of content included in the rendered frame; in some examples, the rendered frame includes an area without content for where the user interface element is placed; in some examples, the rendered frame includes a portion that includes a higher opacity than another portion of the rendered frame such that the user interface element is placed behind the rendered frame in line with the portion so to be visible with the rendered frame).

At 750, method 700 further includes outputting (e.g., sending to another component or device or displaying) the combined frame for display at the second time (e.g., 506*j*, 508*g*, 512*r*, 514*n*, or 518*m*).

In some examples, method 700 further includes receiving rendered content (e.g., a bitmap or an image, sometimes referred to as a render) corresponding to the user interface element (e.g., 504*j* or 512*g*) (e.g., the rendered content is rendered by a device other than the first device, such as the second device) (in some examples, the rendered content is a version of the user interface element, the version different from the user interface element rendered at the first device), wherein the rendered content is received at the first device before the message is received at the first device (in some examples, the rendered content is received in response to the first device connecting with the second device; in some examples, the rendered content is received at the first device via a previous connection between the first device and the second device, the previous connection occurring before a connection used to receive the rendered frame; in some examples, the rendered content is received via a different connection (e.g., a different connection with the second device or a different connection with a device other than the second device) than a connection used to receive the rendered frame; in some examples, rendering the user interface element includes modifying the rendered content).

In some examples, method 700 further includes receiving a script (e.g., 504*j* or 512*g*) (e.g., a render script) for rendering the user interface element (in some examples, the script includes one or more instructions, when executed, renders the user interface element (e.g., an image, including one or more pixel values)), wherein the script is received at the first device before the message is received at the first device (in some examples, the script is received in response to the first device connecting with the second device; in some examples, the script is received at the first device via a previous connection between the first device and the second device, the previous connection occurring before a connection used to receive the rendered frame; in some examples, the script is received via a different connection (e.g., a different connection with the second device or a different connection with a device other than the second device, such as provisioned on the first device during manufacture, received from a server via a firmware update or an over-the-air update, etc.) than a connection used to receive the rendered frame; in some examples, rendering the user interface element includes executing the script at the first device).

In some examples, method 700 further includes displaying, at the second time, the combined frame (e.g., 506*j*, 508*g*, 512*r*, 514*n*, or 518*m*).

In some examples, method 700 further includes detecting, via a sensor (in some examples, the sensor is a speedometer, tachometer, odometer, trip odometer, oil pressure gauge, coolant temperature gauge, battery/charging system sensor, low oil pressure sensor, airbag sensor, coolant overheat sensor, hand-brake sensor, door ajar sensor, high beam sensor, on-board diagnosis indicator (e.g., check engine sensor), fuel gauge, low fuel sensor, hand brake indicator, turn light, engine service indicator, seat belt indicator, or a camera) of the first device, first data (in some examples, the first data includes a location, speed, distance, oil pressure, coolant temperature, an amount of oil pressure, whether an airbag is active, whether coolant is overheating, whether a sensor is on or off, whether a sensor is active, an amount of fuel, whether a particular turn light is active, whether a seat belt is engaged, or an image), wherein rendering the user interface element is based on the first data (in some examples, data is derived (e.g., determined) based on the first data, such as the first data is an input to a model, table, heuristic, rule-based system, etc.; in such examples, the data derived based on the first data is used when rendering the user interface element). In some examples, the user interface element is rendered in response to detecting the first data (in some examples, the user interface element is rendered in response to deriving (e.g., determining) data based on the first data).

In some examples, method 700 further includes after receiving the rendered frame, receiving, from the second device, a second rendered frame (e.g., 508*e*) (in some examples, the second rendered frame is the same or different from the rendered frame; in some examples, the second rendered frame is not received but rather an identification to repeat a previous frame (e.g., the rendered frame) received from the second device); at a third time, receiving, from the second device, a second message including a fourth time (e.g., a future time, a time after a current time, or a time in the future) (in some examples, the message includes an indication other than time in which the combined frame should be displayed (e.g., a next possible time); in some examples, the third time is after the first and/or second time; in some examples, the fourth time is after the first and/or second time), wherein the fourth time is after the third time; and outputting (e.g., sending to another component or device or displaying) a frame corresponding to the second rendered frame (in some examples, the frame is the second rendered frame; in some examples, the frame is a combined frame of the second rendered frame and a user interface element; in some examples, the frame is the same or different from the combined frame) for display at the fourth time.

Note that details of the processes described above and below with respect to methods 600 (i.e., FIG. 6), 800 (i.e., FIG. 8), 900 (i.e., FIG. 9), 1000 (i.e., FIG. 10), and 1100 (i.e., FIG. 11) are also applicable in an analogous manner to method 700 of FIG. 7. For example, method 700 optionally includes one or more of the characteristics of the various methods described above with reference to method 600, such as the combined frame generated at 740 of method 700 may be based on the layout from 660 of method 600. For another example, method 700 optionally includes one or more of the characteristics of the various methods described below with reference to method 800, such as the second time received at 720 of method 700 may be when the combined frame is output at 860 of method 800. For another example, method 700 optionally includes one or more of the characteristics of the various methods described below with reference to method 900, such as the message received at 720 of method 700 may include the first frame and/or the indication of the location sent at 940 of method 900. For another example, method 700 optionally includes one or more of the characteristics of the various methods described below with reference to method 1000, such as the message received at 720 of method 700 may be the user-defined preference received at 1020 of method 1000. For another example, method 700 optionally includes one or more of the characteristics of the various methods described below with reference to method 1100, such as the combined frame output at 750 of method 700 may be the content displayed at 1140 of method 1100.

Figure 8:
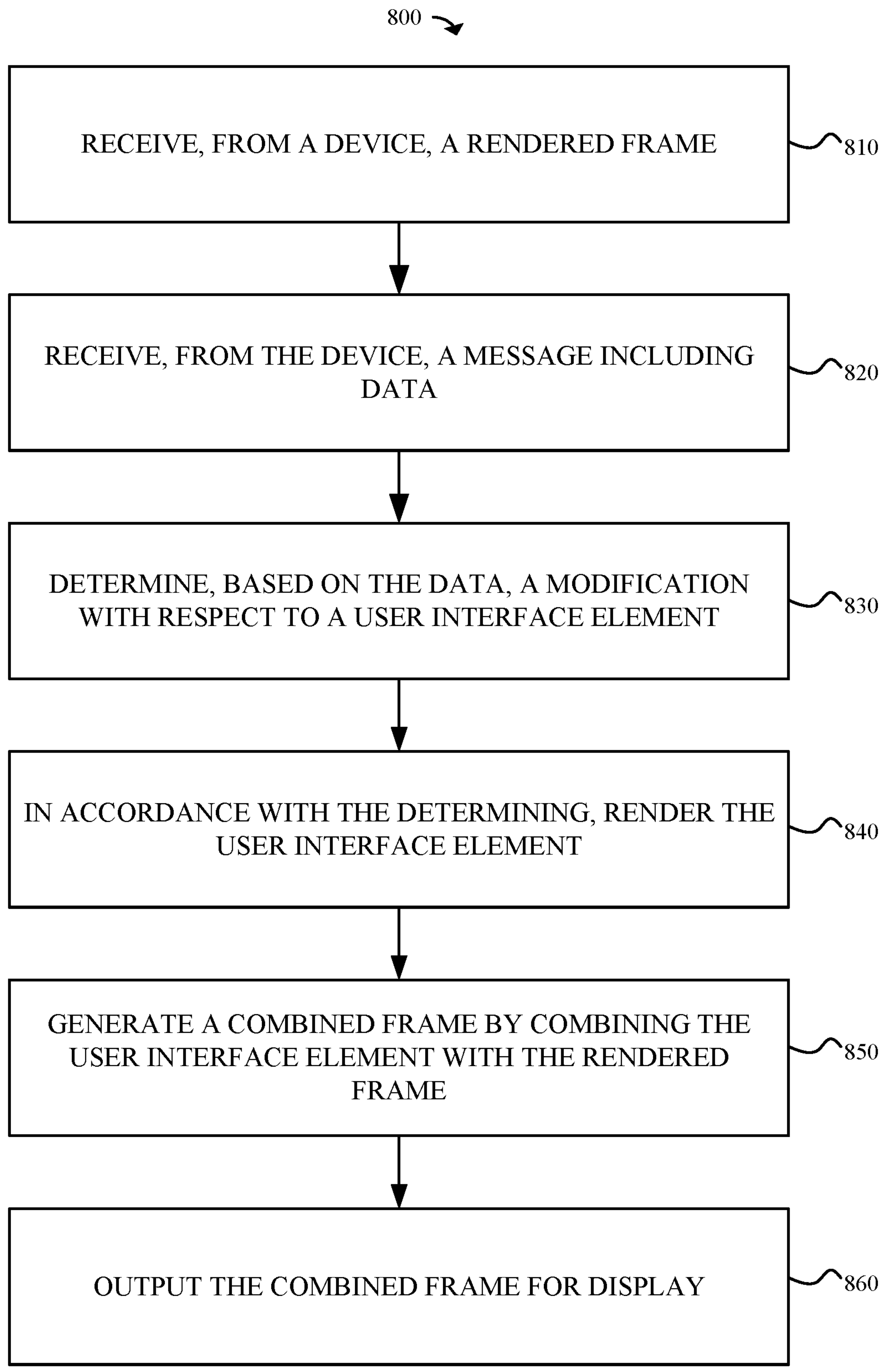
FIG. 8 is a flow diagram illustrating a method for controlling rendering by another device.

FIG. 8 is a flow diagram illustrating method 800 for controlling rendering by another device (e.g., controlling rendering by another device). Some operations in method 800 are, optionally, combined, the orders of some operations are, optionally, changed, and some operations are, optionally, omitted.

In some examples, method 800 is performed at a first device (e.g., compute system 100, device 200, vehicle 302, or vehicle 500) (in some examples, the first device is a vehicle, such as a computer system configured to display content on a display of the vehicle; in some examples, any combination of an operating system module and/or an application module may perform the steps of method 800).

At 810, method 800 includes receiving, from a second device (in some examples, the second device is a user device, such as a portable electronic device; in some examples, the second device is logged into a user account that the first device is or is not logged into) different from the first device, a rendered frame (e.g., 506*h*, 508*e*, 512*p*, 5141, or 518*k*) (e.g., a photo, an image, a portion of a video, or pixel information) (in some examples, the first device is wired or wirelessly connected to the second device, such as via Bluetooth or WiFi, and the rendered frame is received through the connection; in some examples, before receiving the rendered frame, the first device and the second device establishing a streaming connection (e.g., 504*d*, 512*a*, or 518*a*), where the streaming connection is configured to send data from at least one device (e.g., the second device) to another device (e.g., the first device); in some examples, the rendered frame is rendered by the second device (e.g., 506*f*, 508*c*, 512*n*, 514*j*, or 518*i*); in some examples, the rendered frame is rendered by a device other than the second device and provided to the second device for sending to the first device). In some examples, the rendered frame is rendered (e.g., locally rendered) by the second device. In some examples, the rendered frame received from the second device includes a placeholder portion (in some examples, the placeholder portion does not include content rendered by the second device; in some examples, the placeholder portion includes (in some examples, only includes) background content; in some examples, the placeholder portion does not include a user interface element rendered by the second device; in some examples, the placeholder portion does not include a user interface element other than background content rendered by the second device; in some examples, the placeholder portion does not include a user interface element unique to the placeholder portion as compared to the rest of the rendered frame (e.g., other than other placeholder portions)), and wherein the combined frame includes the user interface element at a location corresponding to the placeholder portion (e.g., the location is the placeholder portion).

At 820, method 800 further includes receiving, from the second device, a message including data (e.g., 506*h*, 508*e*, 512*p*, 5141, or 518*k*) (e.g., an instruction) (in some examples, the message is received via the same channel as the rendered frame; in some examples, the message is received via a different channel than the rendered frame, such as a channel configured to send smaller amounts of data (e.g., Bluetooth compared to WiFi); in some examples, the rendered frame is received after the first time but before the second time such that the second device sends the message before sending the rendered frame; in some examples, the data indicates a location). In some examples, the message is received at the first device before the rendered frame is received at the first device. In some examples, the data includes an indication (e.g., an identification) of a size (e.g., a text size) of the user interface element (in some examples, the indication is a change of the size). In some examples, the data includes an indication (e.g., an identification) of a location within the rendered frame (in some examples, the location corresponds to the user interface element, such that the location is where the first device is to place the user interface element on the rendered frame). In some examples, the data includes an indication (e.g., an identification) of an opacity (in some examples, the indication is a change of the opacity; in some examples, the opacity is for the user interface element). In some examples, the data includes an indication (e.g., an identification) of a color (in some examples, the indication is a change of the color; in some examples, the color is for the user interface element).

At 830, method 800 further includes determining, based on the data, a modification with respect to a user interface element (e.g., 506*i*, 508*f*, 512*q*, 514*m*, or 518*l*) (in some examples, the determining does not relate to when to render the user interface element; in some examples, the determining includes determining, for the user interface element, a size, a color, an opacity, or any combination thereof; in some examples, the determining includes determining that there will be no change to how the user interface element will be rendered and instead a location of the user interface element within the rendered frame will be changed based on the data; in some examples, the modification includes a change in text size or font).

At 840, method 800 further includes, in accordance with the determining, rendering (e.g., locally rendering) the user interface element (e.g., 506*i*, 508*f*, 512*q*, 514*m*, or 518*l*) (in some examples, the rendering is performed in response to receiving the message; in some examples, rendering includes executing a computer program to generate an image from a 2D or 3D model; in some examples, rendering includes modifying content stored by the first device (e.g., pre-rendered content); in some examples, the rendered content is a bitmap; in some examples, the content was stored by the first device before receiving the message and/or the rendered frame; in some examples, rendering includes accessing a script for the user interface element and executing the script; in some examples, rendering is performed by a graphics processing unit (GPU) of the first device).

At 850, method 800 further includes generating a combined frame by combining the user interface element with the rendered frame (e.g., 506*i*, 508*f*, 512*q*, 514*m*, or 518*l*) (in some examples, the combined frame is generated at the second time instead of before the second time; in some examples, generating the combined frame includes rendering (e.g., locally rendering) the user interface element, such that the rendering is not separate from the combining).

At 860, method 800 further includes outputting (e.g., sending to another component or device or displaying) the combined frame for display (e.g., 506*j*, 508*g*, 512*r*, 514*n*, or 518*m*).

In some examples, method 800 further includes receiving rendered content (e.g., 504*j* or 512*g*) (e.g., a bitmap or an image, sometimes referred to as a render) corresponding to the user interface element (e.g., the rendered content is rendered by a device other than the first device, such as the second device) (in some examples, the rendered content is a version of the user interface element, the version different from the user interface element rendered at the first device), wherein the rendered content is received at the first device before the message is received at the first device (in some examples, the rendered content is received in response to the first device connecting with the second device; in some examples, the rendered content is received at the first device via a previous connection between the first device and the second device, the previous connection occurring before a connection used to receive the rendered frame; in some examples, the rendered content is received via a different connection (e.g., a different connection with the second device or a different connection with a device other than the second device) than a connection used to receive the rendered frame; in some examples, rendering the user interface element includes modifying the rendered content).

In some examples, method 800 further includes receiving a script (e.g., 504*j* or 512*g*) (e.g., a render script) for rendering the user interface element (in some examples, the script includes one or more instructions, when executed, renders the user interface element (e.g., an image, including one or more pixel values)), wherein the script is received at the first device before the message is received at the first device (in some examples, the script is received in response to the first device connecting with the second device; in some examples, the script is received at the first device via a previous connection between the first device and the second device, the previous connection occurring before a connection used to receive the rendered frame; in some examples, the script is received via a different connection (e.g., a different connection with the second device or a different connection with a device other than the second device) than a connection used to receive the rendered frame; in some examples, rendering the user interface element includes executing the script at the first device).

In some examples, method 800 further includes, after receiving the rendered frame, receiving, from the second device, a second rendered frame (e.g., 508*e*) (in some examples, the second rendered frame is the same or different from the rendered frame; in some examples, the second rendered frame is not received but rather an identification to repeat a previous frame (e.g., the rendered frame) received from the second device); at a third time, receiving, from the second device, a second message including a fourth time (e.g., 508*e*) (e.g., a future time, a time after a current time, or a time in the future) (in some examples, the message includes an indication other than time in which the combined frame should be displayed (e.g., a next possible time); in some examples, the third time is after the first and/or second time; in some examples, the fourth time is after the first and/or second time), wherein the fourth time is after the third time; and outputting (e.g., sending to another component or device or displaying) a frame corresponding to the second rendered frame (e.g., 508*g*) (in some examples, the frame is the second rendered frame; in some examples, the frame is a combined frame of the second rendered frame and a user interface element; in some examples, the frame is the same or different from the combined frame) for display at the fourth time.

Note that details of the processes described above and below with respect to methods 600 (i.e., FIG. 6), 700 (i.e., FIG. 7), 900 (i.e., FIG. 9), 1000 (i.e., FIG. 10), and 1100 (i.e., FIG. 11) are also applicable in an analogous manner to method 800 of FIG. 8. For example, method 800 optionally includes one or more of the characteristics of the various methods described above with reference to method 600, such as the modification determined at 830 of method 800 may be to the layout from 660 of method 600. For another example, method 800 optionally includes one or more of the characteristics of the various methods described above with reference to method 700, such as the data received at 820 of method 800 further include the second time referred to at 720 of method 700. For another example, method 800 optionally includes one or more of the characteristics of the various methods described below with reference to method 900, such as the modification determined at 830 of method 800 may be to a location corresponding to the indication of the location sent at 940 of method 900. For another example, method 800 optionally includes one or more of the characteristics of the various methods described below with reference to method 1000, such as the combined frame output at 860 of method 800 may be the second frame displayed at 1030 of method 1000. For another example, method 800 optionally includes one or more of the characteristics of the various methods described below with reference to method 1100, such as the combined frame output at 860 of method 800 may be the content displayed at 1140 of method 1100.

Figure 9:
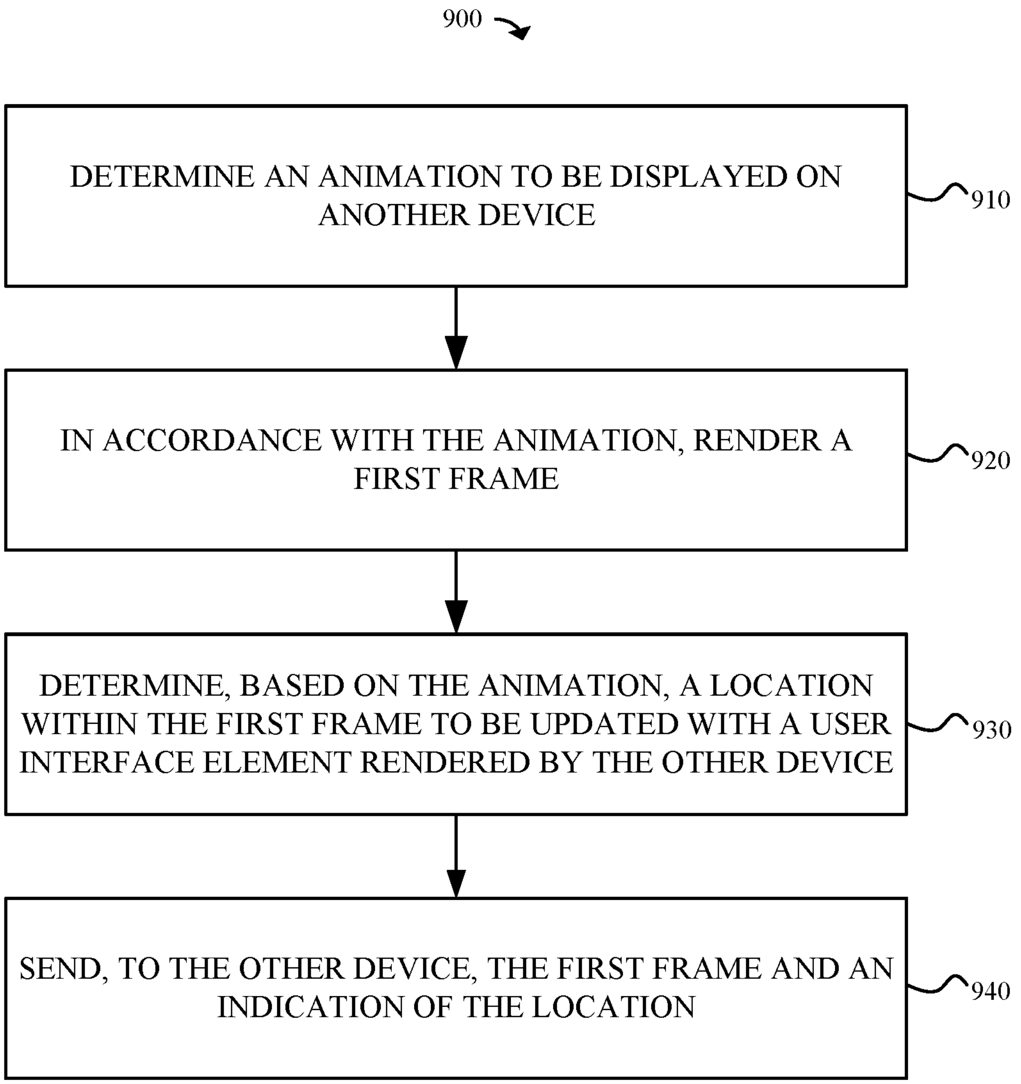
FIG. 9 is a flow diagram illustrating a method for rendering an animation across multiple devices.

FIG. 9 is a flow diagram illustrating method 900 for rendering an animation across multiple devices. Some operations in method 900 are, optionally, combined, the orders of some operations are, optionally, changed, and some operations are, optionally, omitted.

In some examples, method 900 is performed at a first device (e.g., compute system 100, device 200, user device 320, or user device 502) (in some examples, the first device is a user device, such as a portable electronic device; in some examples, the first device is logged into a user account that the second device is or is not logged into; in some examples, any combination of an operating system module, an application module, a remote device or system (e.g., through an application programming interface (API) call), or the like may perform the steps of method 900).

At 910, method 900 includes determining an animation (e.g., 508*a*) (in some examples, the animation is across at least three frames) to be displayed on a second device (e.g., compute system 100, device 200, vehicle 302, or vehicle 500) different from the first device (in some examples, the animation is determined after sending one or more frames to the second device (e.g., 506*g*); in some examples, the animation is determined after establishing a connection between the first device and the second device (e.g., 504*d*); in some examples, the animation is determined based on content that the first device determined to display on the second device (e.g., 508*a*). In some examples, the first device is a user device and the second device is a vehicle.

At 920, method 900 further includes, in accordance with the animation, rendering (e.g., locally rendering) a first frame (e.g., 508*c*) (in some examples, the rendering is performed in response to determining the animation; in some examples, rendering includes executing a computer program to generate an image from a 2D or 3D model; in some examples, rendering includes modifying content stored by the first device (e.g., pre-rendered content); in some examples, the rendered content is a bitmap; in some examples, rendering includes accessing a script for the user interface element and executing the script; in some examples, rendering is performed by a graphics processing unit (GPU) of the first device). In some examples, the first frame includes a placeholder image at the location.

At 930, method 900 further includes determining, based on the animation, a location within the first frame to be updated with a user interface element (e.g., 508*b*) (in some examples, the user interface element is a vehicle instrument) rendered by the second device (in some examples, the animation is determined after sending a frame to be displayed by the second device; in some examples, based on the animation: the placeholder is in (1) a first location in the first frame and (2) a second location in a second frame, wherein the second location is different from the first location, and wherein the second frame is configured to be displayed after (e.g., subsequent to, such as immediately after) the first frame; in some examples, the location is determined before rendering the first frame; in some examples, the location is used to render the first frame; in some examples, the location is metadata of the first frame).

At 940, method 900 further includes sending, to the second device, the first frame and an indication of the location (e.g., 508*d*) (in some examples, the indication is metadata of the first frame; in some examples, the indication is separate from the first frame; in some examples, the method is performed by an operating system of the first device; in some examples, the method is performed by an application (e.g., an application downloaded to the first device), other than an operating system, executing on the first device; in such examples, an operating system of the first device or the application may determine the animation; in some examples, some of the steps of the method are performed by an application executing on the first device calling one or more operating system APIs (e.g., the application may call a single API to perform the determining and rendering steps) (e.g., the application may call a first API for the determining and a second API for the rendering); in some examples, the application executing on the first device calls a different application for determining the location; in some examples, the application itself determines the location).

In some examples, method 900 further includes determining, based on a characteristic associated with the second device, a time to display the first frame; and sending, to the second device, an indication of the time (e.g., 508*d*).

In some examples, method 900 further includes determining a current layout of a display of the second device, wherein determining the animation is based on the current layout (e.g., 508*a*).

In some examples, method 900 further includes determining a modification to a user interface to be rendered by the second device at the location (e.g., 508*a* or 508*b*); and sending, to the second device, an indication of the modification (e.g., 508*d*). In some examples, the modification includes a change to a characteristic of the user interface element selected from the group consisting of location, opacity, color, font, size, and shape.

In some examples, method 900 further includes, before determining the animation, establishing a streaming connection with the second device to be used to send multiple frames corresponding to the animation (e.g., 504*d*).

In some examples, method 900 further includes, in accordance with the animation, rendering (e.g., locally rendering) a second frame different from the first frame (e.g., 508*c*) (in some examples, the rendering is performed in response to determining the animation; in some examples, rendering includes executing a computer program to generate an image from a 2D or 3D model; in some examples, rendering includes modifying content stored by the first device (e.g., pre-rendered content); in some examples, the rendered content is a bitmap; in some examples, rendering includes accessing a script for the user interface element and executing the script; in some examples, rendering is performed by a graphics processing unit (GPU) of the first device); and sending, to the second device, the second frame.

In some examples, method 900 further includes determining, based on the animation, a second location within the first frame to be updated with a second user interface element (e.g., 508*a* or 508*b*) (in some examples, the user interface element is a vehicle instrument) rendered by the second device (in some examples, the animation is determined after sending a frame to be displayed by the second device; in some examples, based on the animation: the placeholder is in (1) a first location in the first frame and (2) a second location in a second frame, wherein the second location is different from the first location, and wherein the second frame is configured to be displayed after (e.g., subsequent to, such as immediately after) the first frame; in some examples, the location is determined before rendering the first frame; in some examples, the location is used to render the first frame; in some examples, the location is metadata of the first frame), wherein the second location is different from the first location, and wherein the second user interface element is different from the user interface element; and sending, to the second device, an indication of the second location (e.g., 508*d*).

Note that details of the processes described above and below with respect to methods 600 (i.e., FIG. 6), 700 (i.e., FIG. 7), 800 (i.e., FIG. 8), 1000 (i.e., FIG. 10), and 1100 (i.e., FIG. 11) are also applicable in an analogous manner to method 900 of FIG. 9. For example, method 900 optionally includes one or more of the characteristics of the various methods described above with reference to method 600, such as the first frame sent at 940 of method 900 may be the content sent at 670 of method 600. For another example, method 900 optionally includes one or more of the characteristics of the various methods described above with reference to method 700, such as the animation determined at 920 of method 900 may be used to determine the second time received at 720 of method 700. For another example, method 900 optionally includes one or more of the characteristics of the various methods described above with reference to method 800, such as the animation determined at 920 of method 900 may be used to generate the data received at 820 of method 800. For another example, method 900 optionally includes one or more of the characteristics of the various methods described below with reference to method 1000, such as the animation determined at 920 of method 900 may be used to determine the user-defined preference that is received at 1020 of method 1000. For another example, method 900 optionally includes one or more of the characteristics of the various methods described below with reference to method 1100, such as a frame rendered in accordance with the animation at 920 of method 900 may be the content in the first layout displayed at 1110 of method 1100.

Figure 10:
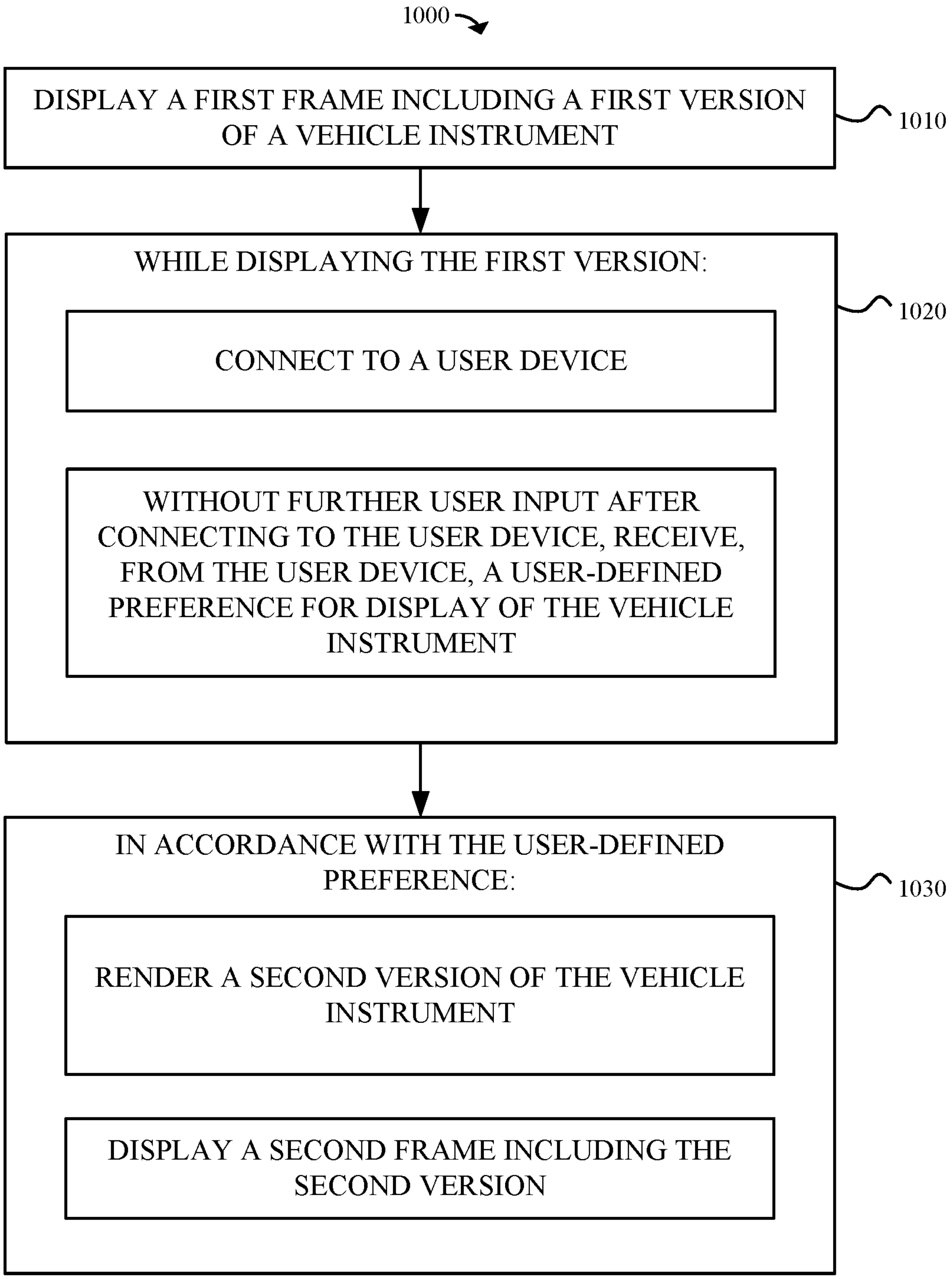
FIG. 10 is a flow diagram illustrating a method for customizing vehicle controls when connecting to a user device.

FIG. 10 is a flow diagram illustrating method 1000 for customizing vehicle controls when connecting to a user device (e.g., in response to connecting, sometimes referred to as on connection). Some operations in method 1000 are, optionally, combined, the orders of some operations are, optionally, changed, and some operations are, optionally, omitted.

In some examples, method 1000 is performed at a computer system of a vehicle (e.g., compute system 100, device 200, vehicle 302, or vehicle 500), the computer system in communication with a display component (in some examples, any combination of an operating system module and/or an application module may perform the steps of method 1000).

At 1010, method 1000 includes displaying, via the display component, a first frame (e.g., 504*c*) (e.g., a display frame) (in some examples, the first frame is an image; in some examples, the first frame is a frame in a series of animation frames) including a first version of a vehicle instrument (in some examples, the vehicle instrument is a speedometer, tachometer, odometer, trip odometer, oil pressure gauge, coolant temperature gauge, battery/charging system sensor, low oil pressure sensor, airbag sensor, coolant overheat sensor, hand-brake sensor, door ajar sensor, high beam sensor, on-board diagnosis indicator (e.g., check engine sensor), fuel gauge, low fuel sensor, hand brake indicator, turn light, engine service indicator, or seat belt indicator; in some examples, the vehicle instrument is a user interface element indicating a state of a component of the vehicle; in some examples, the vehicle instrument is a user interface element indicating data detected by a sensor of the vehicle) wherein the first version has a first appearance in the first frame (in some examples, the first appearance is a reference to a color, shape, or location of the first version within the first frame). In some examples, the first version is digital or analog, and wherein the second version is not the same version (e.g., digital or analog version) as the first version (in some examples, the first version is digital and the second version is analog; in some examples, the first version is analog and the second version is digital; in some examples, the second version is defined in the user-defined preference).

At 1020, method 1000 further includes, while displaying the first version: connecting to a user device (e.g., 504*d*) (e.g., establishing a first connection between the user device and the vehicle) (in some examples, the connecting is via a wired (e.g., a cable connecting to a USB port of the vehicle and a lightning port of the user device) or wireless (e.g., Bluetooth or WiFi) channel); and without further user input after connecting to the user device, receiving, from the user device, a user-defined preference for display of the vehicle instrument (e.g., 504*j*, 506*c*, 506*h*, 512*g*, 512*k*, 514*g*, or 518*f*) (in some examples, the user device sends the user-defined preference to the vehicle in response to connecting to the vehicle; in some examples, the user-defined preference includes a text size or font).

At 1030, method 1000 further includes, in accordance with the user-defined preference: rendering a second version of the vehicle instrument (e.g., 506*i*, 508*f*, 512*q*, 514*m*, or 518*l*) (in some examples, the rendering is based on the user-defined preference; in some examples, the second version is the same as the first version; in some examples, the second version is different from the first version; in some examples, the rendering is not based on the user-defined preference; in some examples, the second version is rendered based on data received from a sensor of the vehicle, such as a sensor to detect a speed of the vehicle); and displaying, via the display component, a second frame including the second version, wherein the second version has a second appearance in the second frame, and wherein the second appearance is different from the first appearance (in some examples, the second frame is rendered based on the user-defined preference; in some examples, rendering the second version and displaying the second frame are performed without any additional user input after connecting to the user device; in some examples, the second appearance is a reference to a color, shape, or location of the second version within the second frame; in some examples, displaying the second frame includes changing from the first frame to the second frame). In some examples. the second version includes a different color as compared to the first version (in some examples, the different color is defined in the user-defined preference). In some examples, the second version is located at a different location within a frame from the first version (in some examples, a location of the second version is defined in the user-defined preference).

In some examples, method 1000 further includes, before rendering the second version, sending, to the user device, an identification of a set of one or more layouts stored by the vehicle (e.g., 512*b*) (in some examples, the set of one or more layouts was received by the vehicle from the user device while the vehicle and the user device were previously connected (e.g., 504*j*); in some examples, the set of one or more layouts are separately stored by both the vehicle and the user device); in accordance with a determination that the set of one or more layouts is out of date (in some examples, the determination that the set of one or more layouts is out of date is made by the user device), receiving, from the user device, a new set of one or more layouts (e.g., 512*g*) (in some examples, the new set includes at least one different layout from the set), wherein, after receiving the new set, rendering the second version (e.g., 512*q*, 514*m*, 516*f*, or 518*l*) and displaying the second frame (e.g., 512*r*, 514*n*, 516*g*, or 518*m*) is in accordance with a layout of the new set of one or more layouts (in some examples, the layout is selected from the new set by the user device; in some examples, the second version is modified based on the layout of the new set; in some examples, the second frame is arranged based on the layout of the new set (e.g., locations of one or more user interface elements in the second frame are defined in the layout of the new set)); and in accordance with a determination that the set of one or more layouts is up to date (in some examples, the determination that the set of one or more layouts is up to date is made by the user device), receiving an indication that the set is up to date (e.g., 512*k* or 512*p*); wherein after receiving the indication that the set is up to date, rendering the second version (e.g., 512*q*, 514*m*, 516*f*, or 518*l*) and displaying the second frame (e.g., 512*r*, 514*n*, 516*g*, or 518*m*) is in accordance with a layout of the set of one or more layouts (in some examples, the layout is selected from the set by the user device; in some examples, the second version is modified based on the layout of the set; in some examples, the second frame is arranged based on the layout of the set (e.g., locations of one or more user interface elements in the second frame are defined in the layout of the set)).

In some examples, method 1000 further includes detecting disconnection of the user device (e.g., 510*a* or 516*b*) (e.g., disconnection a connection between the user device and the vehicle), wherein a third version of the vehicle instrument is being displayed via the display component immediately before detecting disconnection of the user device (in some examples, the third version is the second version); and after detecting disconnection of the user device, displaying a fourth version of the vehicle instrument (e.g., 510*d* or 516*g*) (in some examples, the fourth version is displayed in response to detecting disconnection of the user device), wherein the fourth version is different from the third version (in some examples, the fourth version is the first version).

In some examples, method 1000 further includes, while connected to the user device (e.g., while the vehicle is connected to the user device), detecting, by a sensor of the vehicle, user input (e.g., 514*a*); in response to detecting the user input, sending, to the user device, an indication of the user input (e.g., 514*b*); after sending the indication of the user input, receiving, from the user device, an indication of a modification corresponding to the vehicle instrument (e.g., 514*g* or 514*l*), wherein the modification is determined based on the indication of the user input (in some examples, the modification is determined by the user device; in some examples, the modification causes modification of the vehicle instrument; in some examples, the modification causes a different placement of the vehicle instrument within a displayed frame); rendering, based on the indication of the modification, a third frame including the vehicle instrument (e.g., 514*m*); and displaying, via the display component, the third frame (e.g., 514*n*). In some examples, the sensor is a physical button (in some examples, the physical button is embedded in the vehicle), and wherein the user input corresponds to activation of the physical button. In some examples, the sensor is a touch-sensitive display, and wherein the user input corresponds to a touch input detected via the touch-sensitive display (in some examples, the touch input corresponds to selection of an affordance (e.g., a user interface element, such as a button) displayed by the touch-sensitive display). In some examples, the sensor is a microphone, and wherein the user input corresponds to voice input detected via the microphone (in some examples, the voice input corresponds to an audible request to change the layout; in some examples, the voice input relates to a virtual assistant; in some examples, the voice input causes another application (e.g., a virtual assistant application) to execute and return control to changing the layout after the other application determines an output (e.g., the user input); in some examples, the user input corresponds to a gesture detected via a camera).

Note that details of the processes described above and below with respect to methods 600 (i.e., FIG. 6), 700 (i.e., FIG. 7), 800 (i.e., FIG. 8), 900 (i.e., FIG. 9), and 1100 (i.e., FIG. 11) are also applicable in an analogous manner to method 1000 of FIG. 10. For example, method 1000 optionally includes one or more of the characteristics of the various methods described above with reference to method 600, such as the second version rendered at 1030 of method 1000 may be placed at a particular location in a frame based on a layout sent at 650 of method 600. For another example, method 1000 optionally includes one or more of the characteristics of the various methods described above with reference to method 800, such as the second version rendered at 1030 of method 1000 may correspond to the user interface element rendered at 730 of method 700. For another example, method 1000 optionally includes one or more of the characteristics of the various methods described above with reference to method 900, such as the second version rendered at 1030 of method 1000 may correspond to the user interface element rendered at 840 of method 800. For another example, method 1000 optionally includes one or more of the characteristics of the various methods described below with reference to method 1000, such as the user-defined preference received at 1020 of method 1000 may be the indication of the location sent at 940 of method 900. For another example, method 900 optionally includes one or more of the characteristics of the various methods described below with reference to method 1100, such as the second frame displayed at 1030 of method 1000 may be the content in the first layout displayed at 1110 of method 1100.

Figure 11:
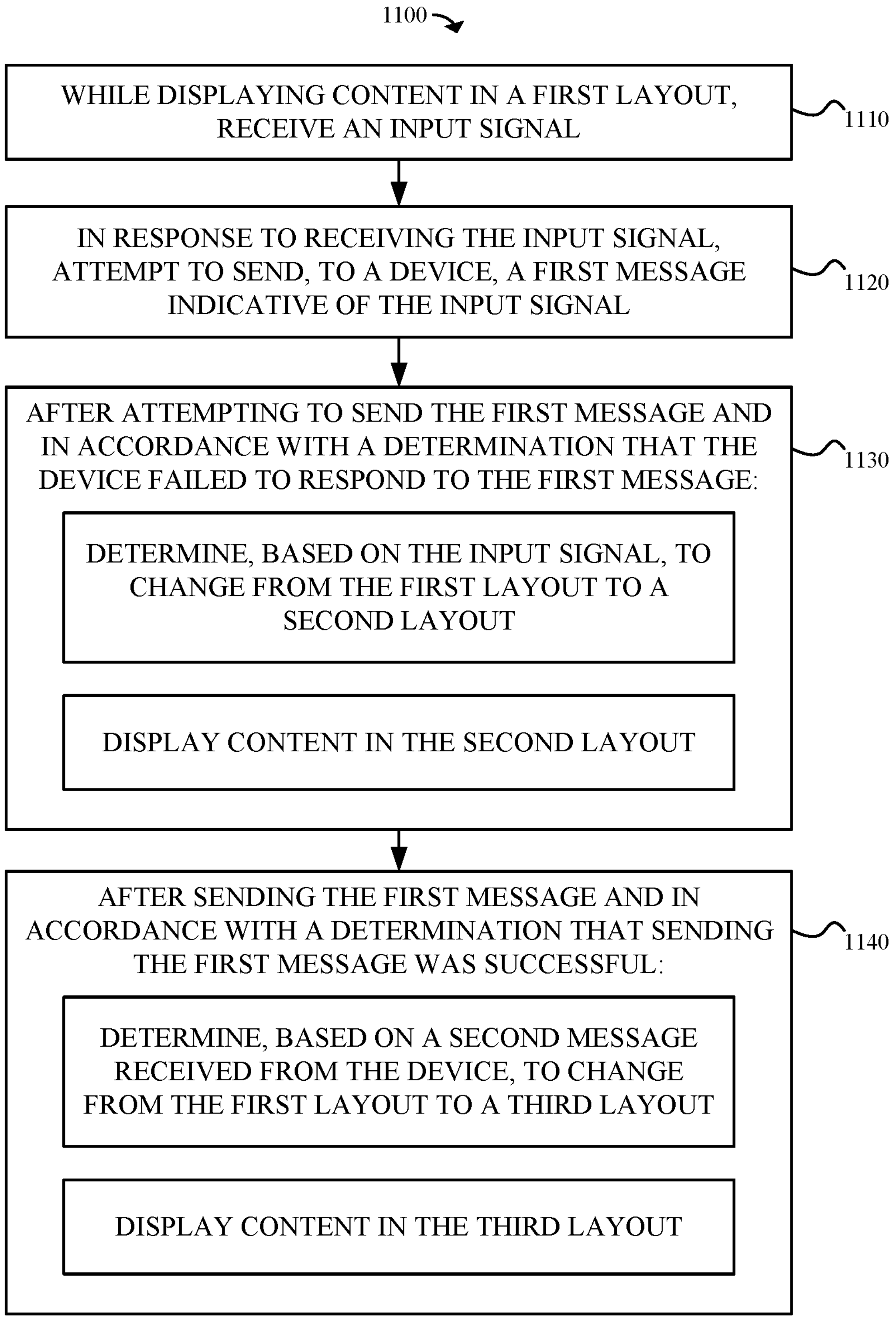
FIG. 11 is a flow diagram illustrating a method for changing layouts used during synchronized rendering in case of a connection loss.

FIG. 11 is a flow diagram illustrating method 1100 for changing layouts used during synchronized rendering in case of a connection loss. Some operations in method 1100 are, optionally, combined, the orders of some operations are, optionally, changed, and some operations are, optionally, omitted.

In some examples, method 1100 is performed at a first device (e.g., compute system 100, device 200, vehicle 302, or vehicle 500) (in some examples, the first device is a vehicle, such as a computer system configured to display content on a display of the vehicle; in some examples, any combination of an operating system module and/or an application module may perform the steps of method 1100).

At 1110, method 1100 includes, while displaying content in a first layout (e.g., 514*n*) (in some examples, a layout represents where one or more elements are placed in a frame displayed by the first device; in some examples, the displaying is on a display component of the first device), receiving an input signal (e.g., 516*a*) (in some examples, the input signal is a message sent by a component of the first device; in some examples, the input signal represents an indication of user input with respect to a component of the first device; in some examples, the input signal is received from a different device remote from the first device, such as a server), wherein the first layout is selected by a second device (e.g., compute system 100, device 200, user device 320, or user device 502) (in some examples, the second device is a user device, such as a portable electronic device; in some examples, the second device is logged into a user account that the first device is or is not logged into) different (e.g., separate) from the first device (in some examples, the connecting is included in a pairing process between the first device and the second device (e.g., 504*d*); in some examples, the connecting occurs after a pairing process; in some examples, the connecting is via a wired or wireless connection; in some examples, the first layout is from a set of layouts; in some examples, the content is a combination of content rendered by the first device and content rendered by the second device; in some examples, the content includes one or more images).

At 1120, method 1100 further includes, in response to receiving the input signal, attempting to send, to the second device, a first message indicative of the input signal (e.g., 516*b*) (in some examples, the first message is attempted to be sent via a first channel established before displaying the content in the first layout (e.g., 504*d* or 512*a*); in some examples, the first message includes an indication of the input signal; in some examples, the first message includes an identification of a component that detected the input signal).

At 1130, method 1100 further includes, after attempting to send the first message: in accordance with a determination that the second device failed to respond to the first message (e.g., 516*c*) (in some examples, the determination that the second device failed to respond to the first message includes a determination that the first device did not receive an acknowledgement message from the second device, the acknowledgement message indicating that the second device received the first message; in some examples, the determination that the second device failed to respond to the first message includes a determination that a predefined amount of time has passed since attempting to send the first message without receiving a response from the second device; in some examples, the determination that the second device failed to respond to the first message includes a determination that a channel for sending messages between the first device and the second device is no longer connected): determining, based on the input signal, to change from the first layout to a second layout (e.g., 516*d*) (in some examples, determining to change to the second layout is not based on the first message; in some examples, the second layout is from the set of layouts; in some examples, determining to change to the second layout is not based on a message received from the second device after sending the first message; in some examples, the second layout is stored on the first device); and displaying content in the second layout (e.g., 516*g*) (in some examples, the displaying is on a display component of the first device, such as the display that displayed the content in the first layout; in some examples, the content in the second layout includes different content from the content in the first layout; in some examples, the content in the second layout is a combination of content rendered by the first device and content rendered by the second device; in some examples, the content in the second layout only includes content rendered by the second device; in some examples, the content in the second layout only includes content rendered by the second device or stored by the second device before sending the first message; in some examples, the content includes one or more images).

At 1140, method 1100 further includes, after attempting to send the first message: in accordance with a determination that sending the first message was successful (e.g., 518*a* or 518*f*): determining, based on a second message received from the second device (e.g., 518*f*), to change from the first layout to a third layout (in some examples, the second message includes an indication of the third layout; in some examples, determining to change to the third layout is not based on the input signal; in some examples, the third layout is from the set of layouts); and displaying content in the third layout (e.g., 518*m*) (in some examples, the content in the third layout includes different content from the content in the first layout; in some examples, the content in the third layout includes the same content as the content in the second layout; in some examples, the content in the third layout is a combination of content rendered by the first device and content rendered by the second device (e.g., 518*l*); in some examples, the content in the third layout includes content rendered by the first device that is also included in the content in the second layout, such that one difference between the content in the second layout and the content in the third layout is that the content in the third layout includes content rendered by the second device that is not included in the content in the second layout; in some examples, the content in the third layout includes one or more images).

In some examples, method 1100 further includes, in accordance with a determination that the second device failed to respond to the first message, the content in the second layout includes placeholder content and does not include content received by the first device after the first device sent the first message (in some examples, the content in the second layout includes content received from the second device before attempting to send the first message, such as content received when receiving the second layout or when connecting to the second device (e.g., 504*j*, 512*g*, or 514*l*); in some examples, the placeholder content is included at a first location), in accordance with a determination that sending the first message was successful, the content in the third layout includes content received by the first device after the first device sent the first message (in some examples, the content received by the first device after the first device sent the first message is included at the first location, where the placeholder content is located when sending the first message failed; in some examples, the content in the third layout does not include the placeholder content), and the third layout is the same as the second layout. In some examples, the content in the second layout includes media (e.g., an image or a video) captured by a camera of the first device, the content in the third layout includes the media, the content in the third layout further includes additional content (in some examples, the additional content is received and/or rendered by the second device), and the content in the second layout does not include the additional content.

In some examples, method 1100 further includes, at a first time (in some examples, the first time is after displaying the content in the third layout): in accordance with a determination that the first device received first content from the second device for display at the first time, displaying the first content (in some examples, the first content is included in a message that includes an indication of the first time); and in accordance with a determination that the first device did not receive content from the second device for display at the first time, displaying second content (e.g., old or previous content) received from the second device for display at a second time, wherein the second time is before the first time (in some examples, the second content is different from the first content; in some examples, the second content is included in a message that includes a first indication of when to display the second content, wherein the first indication includes an indication of the second time and does not include an indication corresponding to the first time (e.g., the first indication does not refer to a time frame that includes the first time).

In some examples, method 1100 further includes, at a third time (in some examples, the first time is after displaying the content in the third layout; in some examples, the third time is after the first time): in accordance with a determination that the first device received third content from the second device for display at the third time, displaying the third content (in some examples, the third content is included in a message that includes an indication of the third time); and in accordance with a determination that the first device did not receive content from the second device for display at the third time, displaying fourth content (e.g., placeholder content) configured to be displayed when a connection between the first device and the second device is not working (in some examples, the fourth content is rendered by the first device or the second device).

In some examples, method 1100 further includes, after receiving the input signal: displaying a user interface element (in some examples, the user interface element is a vehicle instrument); after displaying the user interface element, receiving, from the second device, fifth content (in some examples, the fifth content is in a particular layout); generating combined content by combining the fifth content with the user interface element (in some examples, the combined content is generated using the particular layout); and displaying the combined content (in some examples, the combined content replaces display of the user interface element).

In some examples, method 1100 further includes initiating rendering (e.g., locally rendering) of the user interface element (in some examples, rendering includes executing a computer program to generate an image from a 2D or 3D model; in some examples, rendering includes modifying content stored by the first device (e.g., pre-rendered content); in some examples, the rendered content is a bitmap; in some examples, rendering includes accessing a script for the user interface element and executing the script; in some examples, rendering is performed by a graphics processing unit (GPU) of the first device); after initiating rendering of the user interface element (in some examples, after rending the user interface element; in some examples, before finishing rendering the user interface element), receiving, from the second device, sixth content; generating a combined frame by combining the user interface element with the sixth content; and outputting (e.g., sending to another component or device or displaying) the combined frame for display.

Note that details of the processes described above and below with respect to methods 600 (i.e., FIG. 6), 700 (i.e., FIG. 7), 800 (i.e., FIG. 8), 900 (i.e., FIG. 9), and 1000 (i.e., FIG. 10) are also applicable in an analogous manner to method 1100 of FIG. 11. For example, method 1100 optionally includes one or more of the characteristics of the various methods described above with reference to method 600, such as first and second layout at 1130 of method 1100 may be included in the set of one or more layouts sent at 640 of method 600. For another example, method 1100 optionally includes one or more of the characteristics of the various methods described above with reference to method 700, such as the content in the first layout at 1110 of method 1100 may correspond to the combined frame output at 750 of method 700. For another example, method 1100 optionally includes one or more of the characteristics of the various methods described above with reference to method 800, such as the content in the first layout at 1110 of method 1100 may correspond to the combined frame output at 860 of method 800. For another example, method 1100 optionally includes one or more of the characteristics of the various methods described above with reference to method 900, such as the content in the first layout at 1110 of method 1100 may be the first frame sent at 940 of method 900. For another example, method 1100 optionally includes one or more of the characteristics of the various methods described above with reference to method 1000, such as the content in the first layout at 1110 of method 1100 may be the second frame displayed at 1030 of method 1000.

In some examples, frames sent from one device to another do not includes a placeholder portion but rather the placeholder position is used locally by a sending device to render the frames. In some examples, one or more layouts or assets with a layout are provisioned (1) on a device during manufacture (e.g., at a factory), (2) as part of a firmware update, (3) an over-the-air (OTA) update, or (4) by another device. In such examples, the one or more layouts or the assets with a layout may be generated by a manufacturer of either device (e.g., in accordance with a standard). In some examples, voice input to cause a change in a layout includes particular questions, such as "set to sport mode," "I cannot read the instruments," "show my fuel gage," or "let me know when I need to exit the freeway to charge the car." In some examples, a change in a layout is caused when a sensor of a device detects a particular state (e.g., fuel level is low and a vehicle changes to navigate to a charge station). In some examples, a virtual assistant is running on a user device and/or a vehicle, so that if the user device is disconnected, some virtual assistant intelligence/functionality can still operate (e.g., navigate me to a charging station).

The foregoing description, for purpose of explanation, has been described with reference to specific examples. However, the illustrative discussions above are not intended to be exhaustive or to limit the claims to the precise forms disclosed. Many modifications and variations are possible in view of the above teachings. The examples were chosen and described in order to explain the principles of the techniques and their practical applications. Others skilled in the art are thereby enabled to utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the rendering of content. The present disclosure contemplates that in some instances, this gathered data may include personal information data that uniquely identifies or can be used to identify a specific person and/or a specific location. Such personal information data can include preferences of a person, data stored on a personal device, an image of a person, an image of a location, a reference to a current location of a person, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. In addition, policies and practices should be adapted for the particular types of personal information data being collected and/or accessed and adapted to applicable laws and standards, including jurisdiction-specific considerations. Hence different privacy practices may be maintained for different personal data types in each country.

Moreover, it is the intent of the present disclosure that personal information data should be managed and handled in a way to minimize risks of unintentional or unauthorized access or use. Risk can be minimized by limiting the collection of data and deleting data once it is no longer needed.

What is claimed is:

1. A method, comprising:

at a first device including a display screen:

receiving, from a second device separate from the first device, a rendered frame, wherein the rendered frame received from the second device includes a placeholder portion;

receiving, from the second device, a request to modify rendering of a specific user interface element such that the specific user interface element is rendered with a first appearance, wherein the specific user interface element was rendered with a second appearance before the second device was in communication with the first device, and wherein the second appearance is different from the first appearance;

in response to receiving the request to modify rendering of the specific user interface element, rendering, based on the request to modify rendering of the specific user interface element, the specific user interface element;

generating a combined frame by combining the specific user interface element rendered by the first device with the rendered frame received from the second device, wherein the combined frame includes the specific user interface element at a location corresponding to the placeholder portion; and displaying, via the display screen, the combined frame.

2. The method of claim 1, wherein the rendered frame is rendered by the second device.

3. The method of claim 1, wherein the request is received before the rendered frame is received.

4. The method of claim 1, further comprising:

receiving rendered content corresponding to the specific user interface element, wherein the rendered content is received before the request is received.

5. The method of claim 1, further comprising:

receiving a script for rendering the specific user interface element, wherein the script is received before the request is received.

6. The method of claim 1, wherein the request includes an indication of a size of the specific user interface element.

7. The method of claim 1, wherein the request includes an indication of a location within the rendered frame.

8. The method of claim 1, wherein the request includes an indication of an opacity.

9. The method of claim 1, wherein the request includes an indication of a color.

10. The method of claim 1, further comprising:

after receiving the rendered frame, receiving, from the second device, a second rendered frame;

at a third time, receiving, from the second device, a second request including a fourth time, wherein the fourth time is after the third time; and outputting a frame corresponding to the second rendered frame for display at the fourth time.

11. The method of claim 1, wherein the first device is in wireless communication with the second device.

12. The method of claim 1, wherein the first device is a vehicle, and wherein the second device is a user device.

13. The method of claim 1, wherein the rendered frame is rendered by a renderer of the second device, wherein the specific user interface element is rendered by a renderer of the first device, and wherein the renderer of the second device is separate from the renderer of the first device.

14. The method of claim 1, wherein the display screen is a first display screen, and wherein the second device includes a second display screen separate from the first display screen.

15. A non-transitory computer-readable storage medium storing one or more programs configured to be executed by one or more processors of a first device, wherein the first device includes a display screen, and wherein the one or more programs include instructions for:

receiving, from a second device separate from the first device, a rendered frame, wherein the rendered frame received from the second device includes a placeholder portion;

receiving, from the second device, a request to modify rendering of a specific user interface element such that the specific user interface element is rendered with a first appearance, wherein the specific user interface element was rendered with a second appearance before the second device was in communication with the first device, and wherein the second appearance is different from the first appearance;

in response to receiving the request to modify rendering of the specific user interface element, rendering, based on the request to modify rendering of the specific user interface element, the specific user interface element;

generating a combined frame by combining the specific user interface element rendered by the first device with the rendered frame received from the second device, wherein the combined frame includes the specific user interface element at a location corresponding to the placeholder portion; and displaying, via the display screen, the combined frame.

16. The non-transitory computer-readable medium of claim 15, wherein the rendered frame is rendered by the second device.

17. The non-transitory computer-readable medium of claim 15, wherein the request is received before the rendered frame is received.

18. The non-transitory computer-readable medium of claim 15, the one or more programs further include instructions for:

receiving rendered content corresponding to the specific user interface element, wherein the rendered content is received before the request is received.

19. The non-transitory computer-readable medium of claim 15, the one or more programs further include instructions for:

receiving a script for rendering the specific user interface element, wherein the script is received before the request is received.

20. The non-transitory computer-readable medium of claim 15, wherein the request includes an indication of a size of the specific user interface element.

21. The non-transitory computer-readable medium of claim 15, wherein the request includes an indication of a location within the rendered frame.

22. The non-transitory computer-readable medium of claim 15, wherein the request includes an indication of an opacity.

23. The non-transitory computer-readable medium of claim 15, wherein the request includes an indication of a color.

24. The non-transitory computer-readable medium of claim 15, the one or more programs further include instructions for:

after receiving the rendered frame, receiving, from the second device, a second rendered frame;

at a third time, receiving, from the second device, a second request including a fourth time, wherein the fourth time is after the third time; and outputting a frame corresponding to the second rendered frame for display at the fourth time.

25. The non-transitory computer-readable medium of claim 15, wherein the first device is in wireless communication with the second device.

26. The non-transitory computer-readable medium of claim 15, wherein the first device is a vehicle, and wherein the second device is a user device.

27. The non-transitory computer-readable medium of claim 15, wherein the rendered frame is rendered by a renderer of the second device, wherein the specific user interface element is rendered by a renderer of the first device, and wherein the renderer of the second device is separate from the renderer of the first device.

28. The non-transitory computer-readable medium of claim 15, wherein the display screen is a first display screen, and wherein the second device includes a second display screen separate from the first display screen.

29. A first device comprising:

a display screen;

one or more processors; and memory storing one or more programs configured to be executed by the one or more processors, the one or more programs including instructions for receiving, from a second device separate from the first device, a rendered frame, wherein the rendered frame received from the second device includes a placeholder portion;

receiving, from the second device, a request to modify rendering of a specific user interface element such that the specific user interface element is rendered with a first appearance, wherein the specific user interface element was rendered with a second appearance before the second device was in communication with the first device, and wherein the second appearance is different from the first appearance;

in response to receiving the request to modify rendering of the specific user interface element, rendering, based on the request to modify rendering of the specific user interface element, the specific user interface element;

generating a combined frame by combining the specific user interface element rendered by the first device with the rendered frame received from the second device, wherein the combined frame includes the specific user interface element at a location corresponding to the placeholder portion; and displaying, via the display screen, the combined frame.

30. The first device of claim 29, wherein the rendered frame is rendered by the second device.

31. The first device of claim 29, wherein the request is received before the rendered frame is received.

32. The first device of claim 29, the one or more programs further including instructions for:

receiving rendered content corresponding to the specific user interface element, wherein the rendered content is received before the request is received.

33. The first device of claim 29, the one or more programs further including instructions for:

receiving a script for rendering the specific user interface element, wherein the script is received before the request is received.

34. The first device of claim 29, wherein the request includes an indication of a size of the specific user interface element.

35. The first device of claim 29, wherein the request includes an indication of a location within the rendered frame.

36. The first device of claim 29, wherein the request includes an indication of an opacity.

37. The first device of claim 29, wherein the request includes an indication of a color.

38. The first device of claim 29, the one or more programs further including instructions for:

after receiving the rendered frame, receiving, from the second device, a second rendered frame;

at a third time, receiving, from the second device, a second request including a fourth time, wherein the fourth time is after the third time; and outputting a frame corresponding to the second rendered frame for display at the fourth time.

39. The first device of claim 29, wherein the first device is in wireless communication with the second device.

40. The first device of claim 29, wherein the first device is a vehicle, and wherein the second device is a user device.

41. The first device of claim 29, wherein the rendered frame is rendered by a renderer of the second device, wherein the specific user interface element is rendered by a renderer of the first device, and wherein the renderer of the second device is separate from the renderer of the first device.

42. The first device of claim 29, wherein the display screen is a first display screen, and wherein the second device includes a second display screen separate from the first display screen.

* * * * *